US012806475B2

(12) United States Patent
Matsimanis et al.

(10) Patent No.: US 12,806,475 B2
(45) Date of Patent: Nov. 24, 2026

(54) DETECTING NEUROMUSCULAR SIGNALS AT A WEARABLE DEVICE TO FACILITATE PERFORMANCE OF PHYSICAL ACTIVITIES, AND METHODS AND SYSTEMS THEREOF

(71) Applicant: Meta Platforms Technologies, LLC, Menlo Park, CA (US)

(72) Inventors: Peter Andrew Matsimanis, Menlo Park, CA (US); Pascal Alexander Bentioulis, Malmo (SE); Tahir Turan Caliskan, Lund (SE); Per-Erik Bergström, Malmo (SE); Igor Gurovski, Mountain View, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 330 days.

(21) Appl. No.: 18/473,957

(22) Filed: Sep. 25, 2023

(65) Prior Publication Data

US 2024/0207682 A1 Jun. 27, 2024

Related U.S. Application Data

(60) Provisional application No. 63/477,152, filed on Dec. 23, 2022.

(51) Int. Cl.
*A61B 5/00* (2006.01)
*A63B 24/00* (2006.01)
(Continued)

(52) U.S. Cl.
CPC ...... *A63B 24/0075* (2013.01); *A63B 71/0622* (2013.01); *G06F 3/015* (2013.01);
(Continued)

(58) Field of Classification Search
CPC ............ A63B 24/0075; A63B 71/0622; A63B 2024/0068; A63B 2220/40;
(Continued)

(56) References Cited

U.S. PATENT DOCUMENTS 9,737,761 B1 * 8/2017 Sivaraj .................. A61B 5/222
10,814,172 B1 * 10/2020 Ilfrey .................. A63B 23/035
(Continued)

FOREIGN PATENT DOCUMENTS

CA 3215760 A1 * 10/2022 ............. G06T 11/26
EP 3614917 B1 * 1/2026 ......... A63B 24/0062
(Continued)

OTHER PUBLICATIONS

International Search Report and Written Opinion for International Application No. PCT/US2023/084639, mailed Jun. 6, 2024, 15 pages.

*Primary Examiner* — May A Abouelela
(74) *Attorney, Agent, or Firm* — Morgan, Lewis & Bockius LLP

(57) ABSTRACT

Systems and methods are described for using such signals detected by neuromuscular-signal sensors of a wearable electronic device when a user is performing an activity. Methods are described for adaptively adjusting a rate of physical activity performed by a user while the user is wearing the wearable electronic device. An example method includes operations for using one or more sensors located at a wearable electronic device in conjunction with detecting that the user is performing a physical activity at a particular activity rate: (i) detecting, using a neuromuscular-signal sensor located at the wearable electronic device, a level of exertion of the user, and (ii) based on a determination that the level of exertion is different than a baseline level of exertion by at least a threshold amount, determining an
(Continued)

adjustment to the particular activity rate while the user is performing the physical activity.

20 Claims, 44 Drawing Sheets

(51) Int. Cl.
*A63B 71/06* (2006.01)
*G06F 3/01* (2006.01)
*G06N 5/022* (2023.01)

(52) U.S. Cl.
CPC ...... *G06N 5/022* (2013.01); *A63B 2024/0068* (2013.01); *A63B 2220/40* (2013.01); *A63B 2220/836* (2013.01); *A63B 2230/04* (2013.01); *A63B 2230/60* (2013.01)

(58) Field of Classification Search
CPC .......... A63B 2220/836; A63B 2230/04; A63B 2230/60; A63B 21/0726; A63B 2022/0079; A63B 2071/0081; A63B 2071/0663; A63B 2071/0666; A63B 2071/0677; A63B 2220/16; A63B 2220/806; A63B 2225/20; A63B 2225/50; A63B 2230/06; A63B 2230/10; A63B 2230/207; A63B 2230/65; A63B 71/0054; G06F 3/015; G06N 5/022; G06V 40/23; G16H 20/30; G16H 20/70; G16H 40/40; G16H 40/63; G16H 40/67; G16H 50/30; A61B 5/0077; A61B 5/1107; A61B 5/1114; A61B 5/7267; A61B 5/02416; A61B 5/1118; A61B 5/1123; A61B 5/1124; A61B 5/222; A61B 5/11; A61B 5/389; A61B 5/397; A61B 5/6803; A61B 5/681; A61B 5/6824; A61B 5/742
See application file for complete search history.

(56) References Cited

U.S. PATENT DOCUMENTS 11,771,863 B1 * 10/2023 Alshan .................. A61M 21/00 705/2
11,779,282 B2 * 10/2023 Chih .................... G06N 3/0464 600/301
12,073,933 B2 * 8/2024 Levy ...................... G16H 20/70
12,337,225 B2 * 6/2025 Casalini ............. A63B 71/0622
12,357,878 B2 * 7/2025 Velo ................... A63B 24/0062
2012/0296455 A1 * 11/2012 Ohnemus ............... G16H 10/60 700/91
2015/0364022 A1 * 12/2015 Dyell ..................... G16H 40/63 340/573.1
2016/0270718 A1 * 9/2016 Heneghan ............ A61B 5/4815
2016/0353995 A1 * 12/2016 Oleson ............... A61B 5/02438
2017/0000399 A1 * 1/2017 Lore ........................ A61B 5/18
2017/0065851 A1 * 3/2017 Deluca ................... G16H 40/63
2017/0127992 A1 * 5/2017 Takahashi ............ A61B 5/4815
2017/0228996 A1 * 8/2017 Theytaz ............. G08B 21/0438
2017/0312576 A1 * 11/2017 Natarajan .............. A61B 5/389
2018/0039745 A1 * 2/2018 Chevalier .............. G16H 50/20
2018/0056131 A1 * 3/2018 Nakazawa ............ A61B 5/1118
2018/0358119 A1 * 12/2018 Bhushan ................ G16H 40/63
2018/0368765 A1 * 12/2018 Srivastava ........... A61B 5/4884
2019/0104955 A1 * 4/2019 Kim ..................... A61B 5/6895
2019/0183412 A1 * 6/2019 Huijbregts ............ A61B 5/1116
2019/0223773 A1 * 7/2019 Galm ..................... A61B 5/165
2019/0247718 A1 * 8/2019 Blevins ..................... G06N 5/02
2019/0290181 A1 * 9/2019 Mrvaljevic ........ A61B 5/02405
2019/0314680 A1 * 10/2019 Hwang ................. A61B 5/1116
2019/0343459 A1 * 11/2019 Korzinov ............. A61B 5/0006
2020/0151595 A1 * 5/2020 Jayalath ............. A63B 21/0442
2021/0008413 A1 * 1/2021 Asikainen ............. G06F 3/0304
2021/0068689 A1 * 3/2021 Ochs ...................... A61B 5/1118
2021/0084999 A1 3/2021 Matsuura et al.
2021/0093915 A1 * 4/2021 Knight ............... A63B 24/0075
2021/0169417 A1 * 6/2021 Burton ................. A61B 5/4815
2021/0178226 A1 * 6/2021 Abecassis .......... A63B 24/0075
2021/0259913 A1 * 8/2021 Sam ........................ A41D 1/005
2021/0321883 A1 * 10/2021 Mcmahan .......... A61B 5/02055
2021/0393192 A1 * 12/2021 Sakaue .................. A61B 5/296
2022/0016482 A1 * 1/2022 Bissonnette ....... A63B 24/0075
2022/0117530 A1 * 4/2022 Fujita ................... A61B 5/0245
2022/0126169 A1 * 4/2022 Mason ............... A63B 24/0087
2022/0217325 A1 * 7/2022 Lee ........................ G06V 40/19
2022/0257149 A1 * 8/2022 Ralston .................. G16H 50/50
2022/0273187 A1 * 9/2022 Rutkove .............. A61B 5/0537
2022/0331658 A1 * 10/2022 Chen .................. A63B 24/0075
2022/0401794 A1 * 12/2022 Bissonnette ........... G06N 20/00
2022/0406453 A1 * 12/2022 Truax ................... A61B 5/4806
2023/0039042 A1 * 2/2023 Mrvaljevic .......... A61B 5/0205
2023/0039903 A1 * 2/2023 Brammer ............... A61B 5/681
2023/0049262 A1 * 2/2023 Ruttenberg .............. A61B 5/68
2023/0084426 A1 * 3/2023 Unakafova ........ A61B 5/02438 482/8
2023/0129375 A1 * 4/2023 Huijbregts ............. A61B 5/222 600/483
2023/0145841 A1 * 5/2023 Bristol ............... A63B 24/0075 482/4
2023/0147505 A1 * 5/2023 Niehaus ................ A61B 5/1118 600/301
2023/0201518 A1 * 6/2023 Ruttenberg ............ G16H 50/30 600/27
2023/0233133 A1 * 7/2023 Messaddeq ............ G16H 50/20 600/301
2023/0260619 A1 * 8/2023 Mrvaljevic ............ A61B 5/296 705/2
2024/0164678 A1 * 5/2024 Vule .................... A61B 5/4815

FOREIGN PATENT DOCUMENTS

WO WO-2008150743 A2 * 12/2008 ......... A63B 24/0087
WO WO-2018029717 A2 * 2/2018 ............. G16H 40/60
WO 2019036389 A1 2/2019
WO WO-2023288026 A1 * 1/2023 ......... A61B 5/02438

* cited by examiner

DETECTING NEUROMUSCULAR SIGNALS AT A WEARABLE DEVICE TO FACILITATE PERFORMANCE OF PHYSICAL ACTIVITIES, AND METHODS AND SYSTEMS THEREOF

This application claims priority to U.S. Prov. App. No. 63/477,152, filed on Dec. 23, 2022, entitled "Detecting Neuromuscular Signals at a Wearable Device to Facilitate Performance of Physical Activities, and Methods and Systems thereof," which is hereby incorporated by reference in its entirety.

TECHNICAL FIELD

Technical Field

This application relates generally to systems that include wearable electronic devices (e.g., wrist-wearable devices, head-wearable devices, leg-wearable devices), including, but not limited to, wearable electronic devices configured to detect neuromuscular signals of users, such as neuromuscular signals that correspond to (i) exertion of a user during a physical activity, (ii) repetitions of a physical activity performed by the user, and/or (iii) an alert gesture performed by the user.

Background

Wearable electronic devices (e.g., smart watches and smart bands) are gaining popularity, and can be configured to detect some aspects of user movement (e.g., an estimation of steps taken), allowing for users to receive data about their health and performance. However, current wearable electronic devices are not able to accurately detect and facilitate users' performances of physical activities. For example, some wearable electronic devices have sensors (e.g., inertial measurement unit (IMU) sensors) that can be configured to detect user movement but are not able to detect other aspects of the user's performance (e.g., exertion levels). This deficiency means that the devices are susceptible to false positives, cannot guide a user's performance, and have limited ability to optimize sensing for higher levels of accuracy and/or battery life. In particular, hand-held sensors (e.g., hand-held heart rate sensors) are susceptible to false readings depending on user physiology and workout habits including how one grips the sensors and/or how sweaty one's hands are.

SUMMARY

The embodiments discussed herein address one or more shortcomings of current wearable electronic devices, e.g., by providing wearable electronic devices with sensors (e.g., electromyography (EMG) sensors, inertial measurement unit sensors) and other means (e.g., machine-learning and/or other forms of artificial intelligence) for determining aspects of users' health and/or physical activities that the user is performing, as well as means (e.g., user interfaces, gesture spaces) for interacting with the wearable electronic device and/or another electronic device that is in communication with the wearable electronic device (such as an electronic workout machine). The systems, devices, and methods described herein facilitate improved man-machine interfaces by providing convenient, efficient, and intuitive control and analysis of physical activities that users are performing.

As one non-limiting example, a wrist-wearable device (e.g., a smart watch) detects that a user is performing a physical activity with a particular level of exertion. Based on detecting the type of activity that the user is performing, power is supplied to one or more sensors (e.g., a subset of sensor channels for a particular type of sensor) of the wrist-wearable device, which is configured to detect neuromuscular signals in a subset of muscles of the user's body, e.g., including primary and/or non-primary muscles. For example, a particular subset of channels of a respective type of neuromuscular-signal sensor (e.g., an EMG) sensor) are configured to detect bicep curls, and a different subset of channels are configured to detect bench presses. Thus, if the user is performing bicep curls, the particular subset is powered on and/or data is collected from the particular subset. If the user is performing bench presses, the different subset is powered on and/or data is collected from the different subset. Each subset can include sensor channels that are not configured to detect a primary muscle group for the particular physical activity but are selected to increase the accuracy of detecting the performance of one or more repetitions of the particular physical activity via non-primary muscle activity.

Continuing the example, the data from the sensors to which power was supplied can be used to determine if the user of the wrist-wearable device is exerting more effort (or less effort) than the user normally exerts during performance of the workout. In such situations, the wrist-wearable device, or another electronic device in electronic communication with the wrist-wearable device, can notify the user about the higher-than-normal level of exertion and/or can actively adjust the activity rate (e.g., resistance level) associated with the physical activity. One potential technical advantage of this example is providing an efficient man-machine interface; which can be particularly helpful when users are performing activities that require them to focus and engage themselves in the physical activity.

Continuing the example, the data from the sensors can also be used in conjunction with other sensor data (e.g., IMU sensor data), to determine a number of repetitions, and/or sets of repetitions of the respective physical activity that the user has performed. Such determinations can have increased accuracy when they include detecting an exertion of particular muscle groups of the user during particular portions of the respective physical activity.

Continuing the example, the user may wish to know if they are sufficiently relaxed (e.g., have less than a threshold level of tenseness) before beginning a physical activity. For instance, a user playing golf (e.g., at a physical golf course or in a virtual golf bay) may want to have a low level of tenseness before taking a swing with the golf club (e.g., performing a repetition of the respective physical activity). The user may also want to know that they have a relatively high level of tenseness throughout performance of other activities (including other physical activities) and/or other portions of the golf activity.

As another example, the wearable electronic device may be configured such that a user can quickly send an alert (e.g., when injured or in danger). The alert may include context information about the user (e.g., the user's physical location, imaging data of the user's surroundings, and/or an audio recording of the user or their surroundings). The alert may be sent to a remote electronic device in response to the user performing an alert gesture. The alert gesture may be a combination of individual sub-gestures (e.g., a pinch sub-gesture accompanied by an eye-movement sub-gesture).

In accordance with some embodiments, a method is provided for determining an adaptive adjustment to a physical activity being performed by a user wearing a wearable electronic device. The method includes using one or more sensors located at a wearable electronic device, in conjunction with detecting that the user is performing a physical activity at a particular activity rate, (i) detecting, using a neuromuscular-signal sensor located at the wearable electronic device, a level of exertion of the user; and (ii) based on a determination that the level of exertion is different than a baseline level of exertion by at least a threshold amount, determining an adjustment to the particular activity rate while the user is performing the physical activity.

In accordance with some embodiments, a method is provided for determining repetitions of a physical activity being performed by a user. The method includes, at a wearable electronic device having one or more sensors, including a neuromuscular-signal sensor, (i) detecting, using the one or more sensors, a physical activity being performed by the user; (ii) in accordance with detecting the physical activity being performed, identifying one or more repetitions of the physical activity using data from the neuromuscular-signal sensor, wherein identifying the one or more repetitions includes identifying at least one of (a) a first level associated with a local maximum exertion for the physical activity, or (b) a second level associated with a local minimum exertion for the physical activity; and (iii) obtaining a number of the one or more repetitions to produce a count of identified repetitions for the physical activity being performed.

In accordance with some embodiments, a method is provided for delivering an alert to a remote device. The method includes, at a wearable electronic device that is in communication with a neuromuscular-signal sensor, determining, based on data from the neuromuscular-signal sensor, that a user is performing an alert gesture. The method also includes, in response to the alert gesture, and without further user input, (i) obtaining context information for the alert gesture, and (ii) causing a notification and the context information to be sent to the remote device.

In accordance with some embodiments, a method is provided for detecting a state of relaxation of a user. The method includes determining, using data from a neuromuscular-signal sensor, an amount of tenseness for a particular muscle group of the user (e.g., a level corresponding to a predefined signal-to-noise ratio). The method further includes, in accordance with a determination that the amount of tenseness meets one or more predefined criteria, causing a notification to be provided to the user indicating that the user is in the relaxed state.

In some embodiments, a computing system (e.g., an artificial-reality (AR) system that includes a wrist-wearable device and/or a head-wearable device) includes one or more processors, memory, one or more programs stored in the memory, and optionally one or more means (e.g., a display or projector) of presenting a user interface. The one or more programs are configured for execution by the one or more processors. The one or more programs include instructions for performing any of the methods described herein (e.g., the methods 900, 1000, 1100, and 1200 described below).

In some embodiments, a non-transitory computer-readable storage medium stores one or more programs configured for execution by a computing device (e.g., a wrist-wearable device or a head-wearable device, or another connected device, such as a smartphone or desktop or laptop computer that is configured to coordinate operations at the wrist-wearable device and the head-wearable device), having one or more processors, memory, and, optionally, a display. The one or more programs include instructions for performing (or causing performance of) any of the methods described herein (e.g., the methods 900, 1000, 1100, and 1200 described below).

Thus, systems and methods are provided for detecting and/or facilitating users' performances of physical activities. Such methods and systems may complement or replace conventional methods and systems for detecting and/or facilitating users' performances of physical activities.

The features and advantages described in the specification are not necessarily all inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not to necessarily be considered limiting, for the description can be applied to other effective features as the person of skill in this art will appreciate upon reading this disclosure.

FIGS. 7A, 7B-1, 7B-2, and 7C illustrate example AR systems in accordance with some embodiments.

In accordance with common practice, the various features illustrated in the drawings are not necessarily drawn to scale, and like reference numerals can be used to denote like features throughout the specification and figures.

DETAILED DESCRIPTION

Figure 1A:
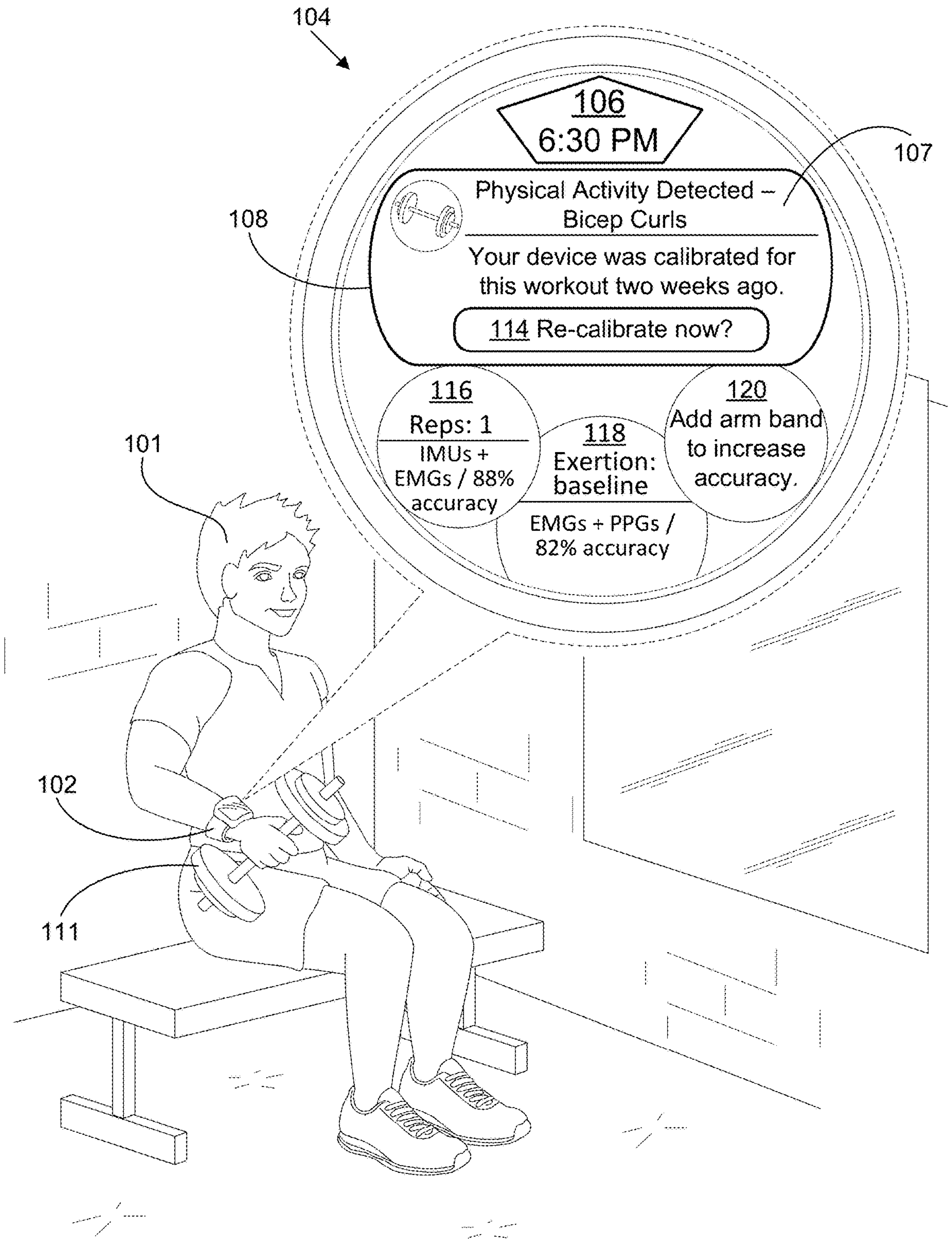
FIGS. 1A-1M illustrate an example user scenario of performing a physical activity while wearing a wearable device in accordance with some embodiments.

Users can have variable performance levels when performing the same or similar physical activities (e.g., exercises, such as bicep curls, bench press, rowing, jogging, golf, chess). For example, the performance levels can vary based on diet, rest, prior exercise, injury, and the like. It is beneficial for users to be able to monitor their levels of fatigue/exertion and adjust their exercising accordingly and otherwise facilitate their goals with respect to the respective activities. As described herein, exertion levels can be monitored via neuromuscular-signal sensor(s) of a wearable device. Based on the exertion levels, parameters of the exercise can be adjusted (e.g., speed, weight, and/or number of repetitions). In this way, users can avoid causing injury while maximizing their workouts.

In addition to detecting exertion levels during exercise, the neuromuscular-signal sensor(s) can detect whether a user is relaxed. For example, the wearable device can determine whether the user has levels of tension that are below certain thresholds based on neuromuscular-signals detected by the sensor(s). In this way, the wearable device can notify a user if they are sufficiently relaxed (e.g., for meditation purposes or in preparation for an exercise). For example, a chess player may associate a particular level of relaxation with a desirable level of clarity. The chess player may wish to know if they are achieving the particular level of relaxation in a timely manner (e.g., thirty seconds, fifteen seconds).

The exertion levels monitored by the neuromuscular-signal sensor(s) can be combined with movement data (e.g., detected via an IMU or visual-tracking sensor) acquired by the wearable device (or an intermediary device in communication with the wearable device). In this way, repetitions of the exercise (e.g., laps around a track, squats, barbell lifts) can be tracked and counted. Moreover, the exercise repetitions can be differentiated from other similar movements to ensure that the counts are accurate. For example, lifting a barbell can be distinguished from the user raising a water bottle or towel to their face.

By monitoring muscular signals, health conditions can be detected, and the user can be alerted. For example, the neuromuscular-signal sensor(s) are able to detect and distinguish between different types of muscle contractions. In this way, the wearable device is able to detect involuntary movements associated with certain health risks and alert a user to seek medical attention. In some embodiments, an AR-based gesture model can be utilized to determine if the user performed an involuntary gesture.

As also described herein, a user suffering from a medical emergency or encountering a dangerous situation is able to signal for help via an alert gesture. For example, the neuromuscular-signal sensor(s) can detect signals corresponding to small hand movements and the wearable device can send an alert to one or more remote persons. Additionally, the wearable device is able to send context information to the remote person(s) so that they can better assist the user. The context information may include images, audio data, location data, health data, and the like. In this way, the user is able to receive help more quickly and efficiently.

Turning now to the figures, FIGS. 1A-1M illustrate an example user scenario of performing a physical activity while wearing a wearable device in accordance with some embodiments. In some embodiments, the wearable device is a component of, or in communication with, a computing system that includes a plurality of electronic devices (e.g., a device constellation), which can include additional wearable devices and/or constituent components thereof (e.g., holding structures, band portions, companion devices, portable computing units, remote servers). In some embodiments, notifications can be provided to the user based on which devices within a device constellation are being used in conjunction with the performance of a particular physical activity.

FIG. 1A shows a user 101 sitting at a fitness bench holding a dumbbell 111. In accordance with some embodiments, neither the fitness bench nor the dumbbell shown in FIGS. 1A-1M include any electronic components. The user 101 is wearing the wrist-wearable device 102 (e.g., a smart watch). In some embodiments, the wrist-wearable device 102 includes some or all of the components of the example wrist-wearable devices shown in FIGS. 6A and 6B. The wrist-wearable device 102 in FIGS. 1A-1M includes a display 104 (e.g., a touch-sensitive display) for displaying user interfaces and respective user interface elements. In some embodiments, the respective user interface elements can be presented on one or more of a plurality of electronic devices.

In FIG. 1A, the display 104 presents a user interface 107 that includes a clock user interface element 106 for displaying the current time (e.g., “6:30 PM”). In some embodiments, an analogous user interface is displayed on another display (e.g., a television and/or a display of a workout machine) in addition to, or alternatively to, displaying the user interface 107 at the wrist-wearable device. The user interface 107 further includes a plurality of user interface elements in addition to the clock user interface element 106. For example, a notification user interface element 108 that includes a textual indicator indicating a type of physical activity that the user 101 is performing (e.g., stating: “Physical Activity Detected—Bicep Curls”). In some embodiments, the type of physical activity is determined by the wrist-wearable device 102 based on signals from one or more sensors of the wrist-wearable device 102 and/or another electronic device in communication with the wrist-wearable device 102. The notification user interface element 108 also includes another textual indication indicating an amount of time since the user 101 calibrated the sensors for the physical activity (e.g., stating: “Your device was calibrated for this workout two weeks ago.”).

The user interface 107 also includes a repetition indicator 116, e.g., represented as a circular user interface element. The repetition indicator 116 includes a number of repetitions of bicep curls that the user 101 has performed during some portion of the activity (e.g., in FIG. 1A the count is one repetition). The repetition indicator 116 includes a predicted accuracy of repetitions, which can be based on combining data from one or more sensor channels of the wrist-wearable device 102 with an AR model. The user interface 107 also includes an exertion indicator 118, e.g., represented as another circular user interface element. The exertion indicator 118 is displaying a current level of exertion (e.g., stating that the user 101 is exerting a baseline level of exertion in FIG. 1A). The user interface 107 also includes an adaptive indicator element 120, e.g., also represented as a circular user interface element. In some embodiments, the adaptive indicator element 120 provides the user 101 with information about devices and/or sensors for monitoring the physical activity. For example, in FIG. 1A the adaptive indicator element 120 provides a recommendation for the user to wear an arm band to improve accuracy. In some embodiments, the adaptive indicator element 120 provides the user 101 with an adaptive indication of how to improve their performance and/or enhance an aspect of the physical activity that the user is performing.

Figure 1B:
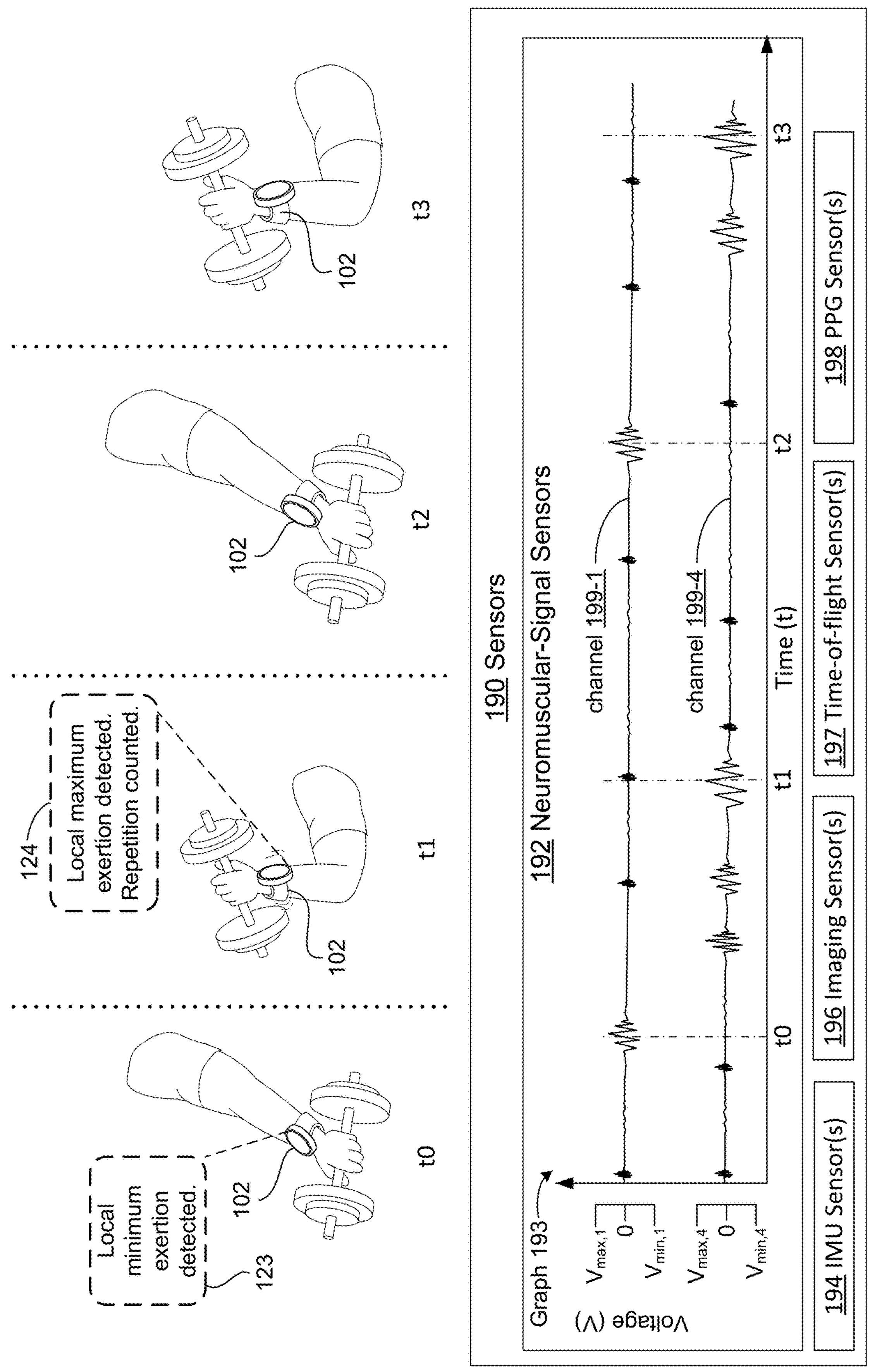

FIG. 1B shows a series of points in time corresponding to the reference numerals t0-t3 while the user 101 is performing a set of bicep curls. While the set of bicep curls is being performed by the user 101, sensors 190 in electronic communication (e.g., located at, wirelessly connected) with the wrist-wearable device 102 detect signals, including neuromuscular signals, and/or other contextual data related to the performance of the physical activity by the user 101. In accordance with some embodiments, the sensors 190 include neuromuscular-signal sensors 192 (e.g., the electrodes shown in FIG. 6A) and, optionally, IMU sensors 194, imaging sensors 196, time-of-flight sensors 197, and photoplethysmography (PPG) sensors 198.

In the example of FIG. 1B, the wrist-wearable device 102 includes a plurality of neuromuscular-signal sensors 192 located on different parts of a band portion, e.g., arranged into different sensor channels. The respective channels (e.g., a channel 199-1, a channel 199-4) can correspond to discrete locations on the wrist-wearable device 102, and/or combinations of discrete locations. In some embodiments, the respective channels are arranged to sense signals at distinct muscles and/or muscle groups. As shown in FIG. 1B, the channels 199-1 and 199-4 output respective voltages during a physical activity. In some embodiments, a spectral power density is determined for each channel. In some embodiments, the voltage data and/or the generated power data is processed (e.g., via an AI or ML model) to determine minimum levels of exertion and maximum levels of exertion that correspond to aspects of repetitions of the physical activity being performed by the user.

As shown in FIG. 1B, the user 101 is performing bicep curls while wearing the wrist-wearable device 102. At time t0, the user 101's arm is straight (e.g., corresponding to a minimum amount of exertion by muscle of the user 101's arm). In accordance with some embodiments, the channel 199-1 is monitoring a muscle that is engaged when the user 101's arm is straight (e.g., a triceps muscle) as indicated in the graph 193. FIG. 1B shows the wrist-wearable device 102 detecting the local minimum at t0, as indicated by notification 123. In some embodiments, the notification 123 is an audio notification, a haptic notification, and/or a visual notification. In some embodiments, the wrist-wearable device 102 detects the local minimum but does not issue a notification. In some embodiments, whether the wrist-wearable device 102 issues a notification is dependent on a user or device setting.

At time t1, the user 101's arm is bent (curled) and the wrist-wearable device 102 detects a local maximum exertion. In accordance with some embodiments, the wrist-wearable device 102 updates a repetition count (e.g., corresponding to repetition indicator 116) in accordance with detecting the local maximum. In accordance with some embodiments, the channel 199-4 is monitoring a muscle that is engaged when the user 101's arm is bent (e.g., a bicep muscle) as indicated in the graph 193. FIG. 1B shows the wrist-wearable device 102 detecting the local maximum at t1, as indicated by notification 124. In some embodiments, the notification 124 is an audio notification, a haptic notification, and/or a visual notification. In some embodiments, the wrist-wearable device 102 detects the local maximum but does not issue a notification.

At time t2, the user 101's arm is straight again. In accordance with some embodiments, the channel 199-1 outputs a voltage that corresponds to the user 101's arm being straight as indicated in the graph 193. At time t3, the user 101's arm is bent and the wrist-wearable device 102 detects a local maximum exertion. In accordance with some embodiments, the channel 199-4 outputs a voltage that corresponds to the user 101's arm being bent as indicated in the graph 193. In some embodiments, the voltage detected by one or more neuromuscular-signal sensor channels of the wrist-wearable device is higher for a subsequent repetition, based on an increased exertion of the user in performing the subsequent repetition, compared to the previous repetition. In some embodiments, an AR model can be used to determine a characteristic increase in exertion of the user from a particular repetition to a subsequent repetition based on previous repetitions performed by the user 101.

Figure 1D:
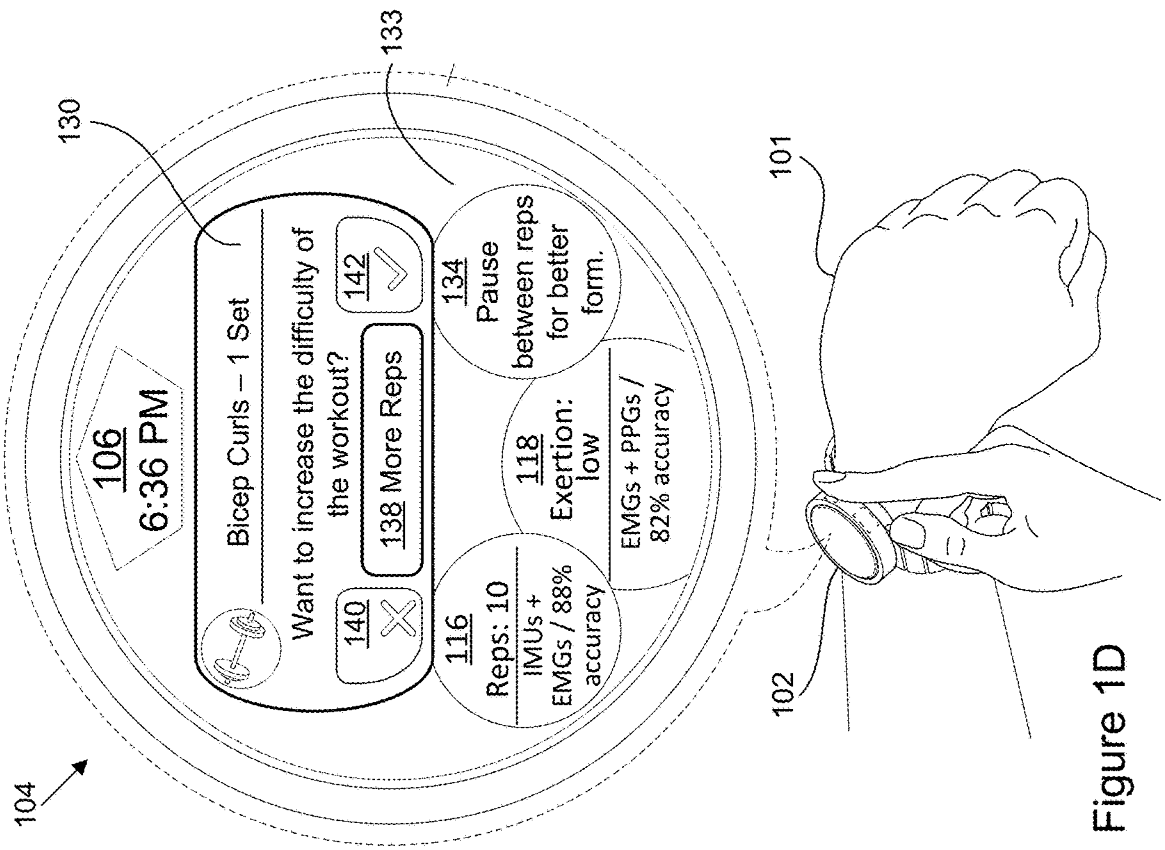
Figure 1C:
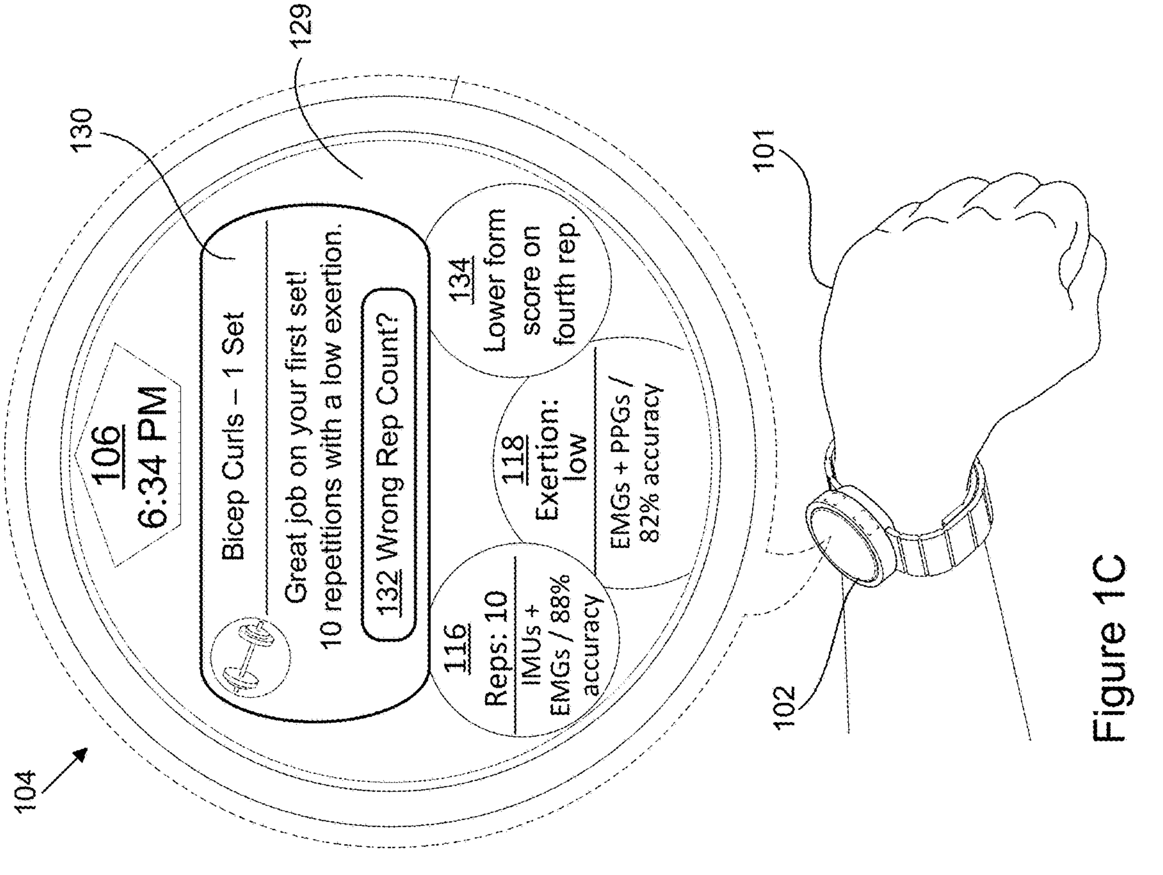

FIG. 1C shows a user interface 129 (e.g., an activity-settings user interface) being displayed at the display 104 of the wrist-wearable device 102 (e.g., after the user 101 has performed a set of repetitions of bicep curls). The user interface 129 includes a user interface element 130 that shows a number of sets (e.g., one set) of bicep curls that the user 101 has performed. In some embodiments, the wrist-wearable device 102 determines that the user 101 has ceased to perform a physical activity (e.g., bicep curls) for at least a threshold amount of time and further determines that the user has performed a set of the physical activity, which can be based on the user ceasing to perform the physical activity for the threshold amount of time. In accordance with some embodiments, the user interface element 130 also includes an adaptive textual prompt based on data detected during the performance of the physical activity (e.g., "Great job on your first set! 10 repetitions with a low exertion."). In some embodiments, the determination that the user 101 has ceased performing the physical activity is based on determining that a level of relaxation of the user 101 is within a preset threshold of a baseline level of exertion. In some embodiments, determining that the level of relaxation of the user 101 is within a preset threshold of the baseline level of exertion is based on a power spectral density measurement calculated based on the voltage measurements from one or more neuromuscular signal channels of the wrist-wearable device 102. The user interface element 130 also includes a button element 132 (stating: "Wrong Rep Count?") configured to, upon being selected by the user (e.g., via an in-air hand gesture), allow the user 101 to calibrate one or more sensors of the wrist-wearable device 102 (e.g., to improve detection of identified repetitions of the physical activity). The user interface 129 also includes the repetition indicator 116 and the exertion indicator 118, with updated values corresponding to updated repetition and exertion detections (e.g., detected via distinct subsets of neuromuscular-signal sensor channels). In some embodiments, a notification is provided if the respective accuracies displayed by the repetition indicator 116 and/or the exertion indicator 118 have changed by a threshold amount. The user interface 129 also includes an adaptive indicator 134 that provides a notification to the user 101 related to the performance of the previous set of the physical activity (e.g., feedback related to a user's form during the activity).

FIG. 1D shows a user interface 133 that is the same as the user interface 129 except that the user interface 133 includes different text and buttons within the user interface element 130 and different text within the adaptive indicator 134. In FIG. 1D, the user interface element 130 includes a textual prompt that asks: "Want to increase the difficulty of the workout?" In some embodiments, the textual prompt provided within the user interface element 130 is based on the detected level of exertion of the user 101 compared to the normal level of exertion of the user 101 for the physical activity they are performing, including the number of sets and/or repetitions that the user 101 has performed of the physical activity. The user interface element 130 in FIG. 1D also includes selectable buttons 138, 140, and 142 for adaptively increasing the rate of the physical activity. In some embodiments, the adaptive adjustments suggested to the user 101 are based on applying an AR model to data from one or more sensors and/or one or more sensor channels of the wrist-wearable device 102. The adaptive indicator 134 in FIG. 1D states: "Pause between reps for better form." The user interface 133 provides an alternative to the user interface 129 in accordance with some embodiments.

Figure 1E:
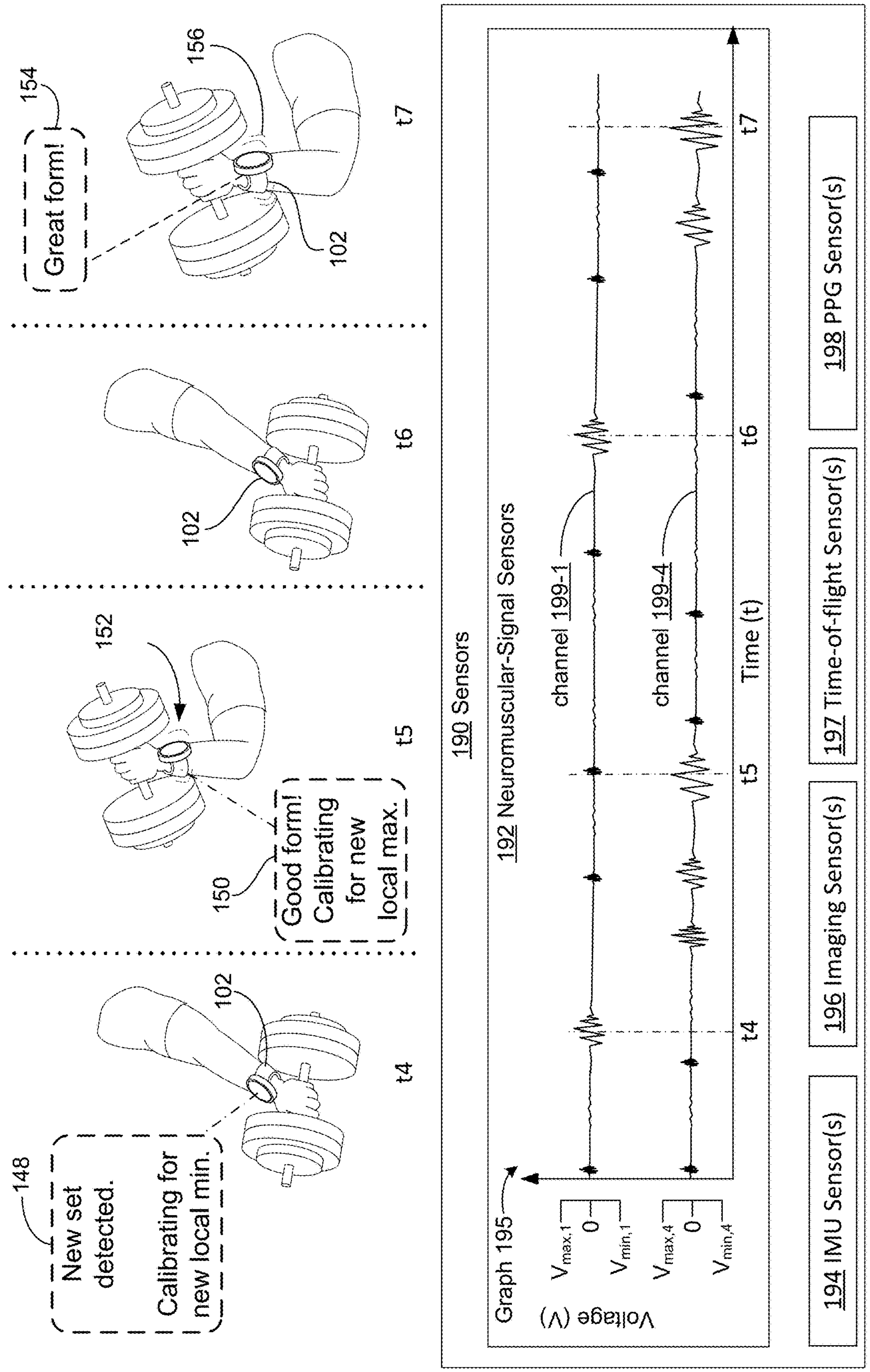

FIG. 1E shows a series of points in time corresponding to the reference numerals t4-t7 while the user 101 is performing another set of bicep curls. Similar components and elements are referenced to those in FIG. 1B. In some embodiments, the neuromuscular-signal sensors 192 and the IMU sensors 194 of the wrist-wearable device 102 are used in conjunction to determine that the user has started the performance of the physical activity. In some embodiments, the imaging sensors 196 are used, e.g., in accordance with a sensor calibration model of the wrist-wearable device 102 indicating that it would improve accuracy of detection of a repetition. In some embodiments, the wrist-wearable device 102 calculates a new local minimum and/or maximum exertion value when the user 101 begins a new set of performance of a physical activity, as the exertion levels can increase or decrease as a user proceeds through the performance of a physical activity.

As shown in FIG. 1E, the user 101 is performing bicep curls while wearing the wrist-wearable device 102. At time t4, the user's arm is straight (e.g., corresponding to a minimum amount of exertion by muscle of the user's arm). In accordance with some embodiments, the channel 199-1 is monitoring a muscle that is engaged when the user's arm is straight (e.g., a triceps muscle) as indicated in the graph 195. FIG. 1E shows the wrist-wearable device 102 detecting a set being performed, as indicated by notification 148, e.g., stating "New set detected. Calibrating for new local min." In some embodiments, the notification 148 is an audio notification, a haptic notification, and/or a visual notification. In some embodiments, the wrist-wearable device 102 does not issue a notification in accordance with detecting the new set and/or detecting a local minimum for the set.

At time t5, the user's arm is bent (curled) and the wrist-wearable device 102 provides a corresponding notification 150 (e.g., stating "Good Form! Calibrating for new local max"). In accordance with some embodiments, the channel 199-4 is monitoring a muscle that is engaged when the user's arm is bent (e.g., a bicep muscle) as indicated in the graph 195. At time t6, the user's arm is straight again. In accordance with some embodiments, the channel 199-1 outputs a voltage that corresponds to the user's arm being straight as indicated in the graph 195. At time t7, the user's arm is bent and the wrist-wearable device 102 provides a corresponding notification 154, e.g., stating "Great Form!" In accordance with some embodiments, the channel 199-4 outputs a voltage that corresponds to the user's arm being bent as indicated in the graph 193. In some embodiments, the notifications 150 and 154 provide feedback to the user based on an analysis of the user's form while the user is performing the physical activity.

Figure 1F:
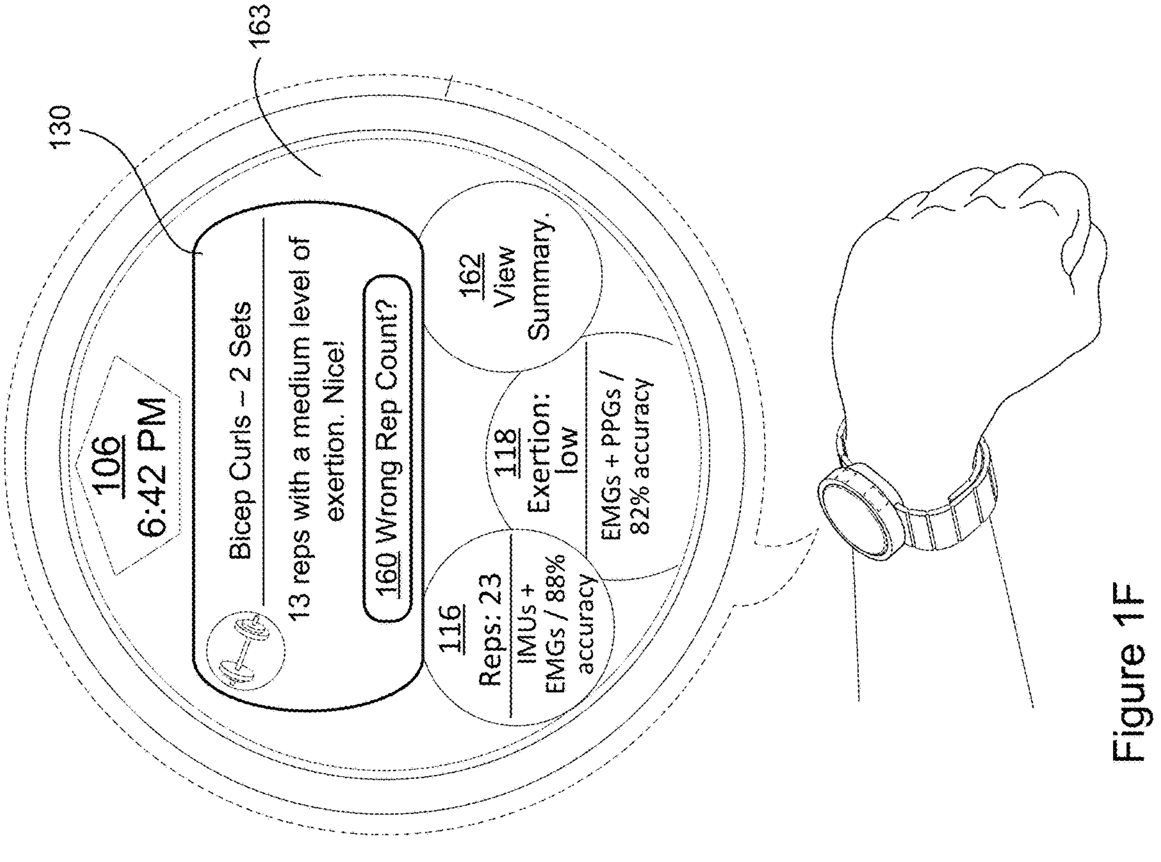

FIG. 1F shows an activity user interface 163 being displayed at the display 104 of the wrist-wearable device 102, e.g., after the user 101 has performed a set of repetitions of bicep curls. The user interface element 130 in FIG. 1F indicates that the user 101 has completed two sets of repetitions of bicep curls. The user interface element 130 also includes a textual element that states: "13 reps with a medium level of exertion. Nice!" The user interface element 130 also includes a selectable button 160, stating: "Wrong Rep Count?" In some embodiments, the text and buttons presented within the user interface element 130 are based on an assessment of the user's exertion and/or form while performing the physical activity. The activity user interface 163 also includes an adaptive indicator element 162, stating: "View Summary." In some embodiments, the adaptive indicator element 162 is displayed after the wrist-wearable device 102 determines that the user 101 has completed a set. In some embodiments, selection of the adaptive indicator element 162 causes presentation of a summary user interface (e.g., in place of the user interface 163 or overlaid with the user interface 163).

Figure 1G:
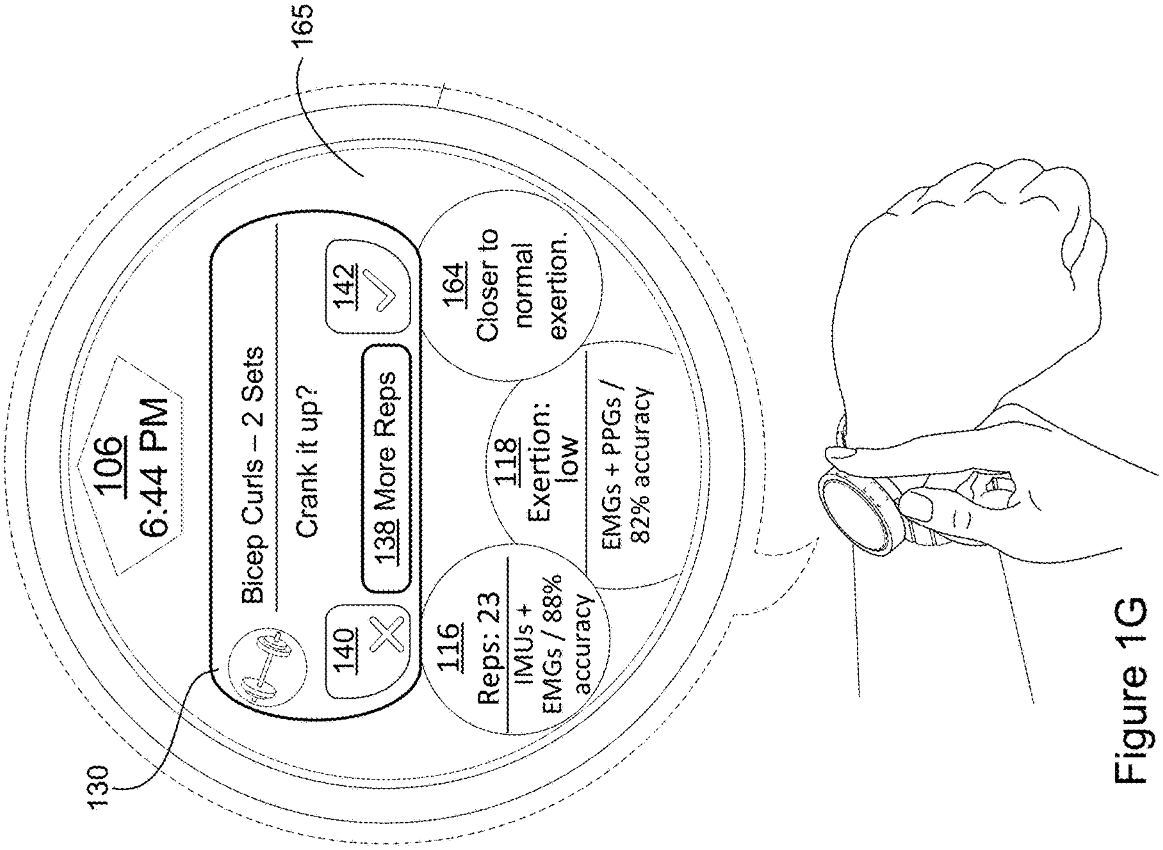

FIG. 1G shows an activity user interface 165 being displayed at the display 104 of the wrist-wearable device 102, e.g., after the user 101 performed a set of repetitions of bicep curls. In the user interface 165, the user interface element 130 includes a textual prompt, stating: "Crank it up?" (e.g., asking the user 101 if they would like to increase the difficulty of the physical activity they are performing). In some embodiments, the user interface 165 is presented to the user 101 in accordance with a determination that the user's exertion is below a preset threshold. In some embodiments, the user interface 163 is presented to the user 101 in accordance with a determination that the user's exertion is above the preset threshold. The activity user interface 165 also includes an adaptive indicator element 164, stating: "Closer to normal exertion" in accordance with exertion data from one or more neuromuscular-signal sensors.

Figure 1H:
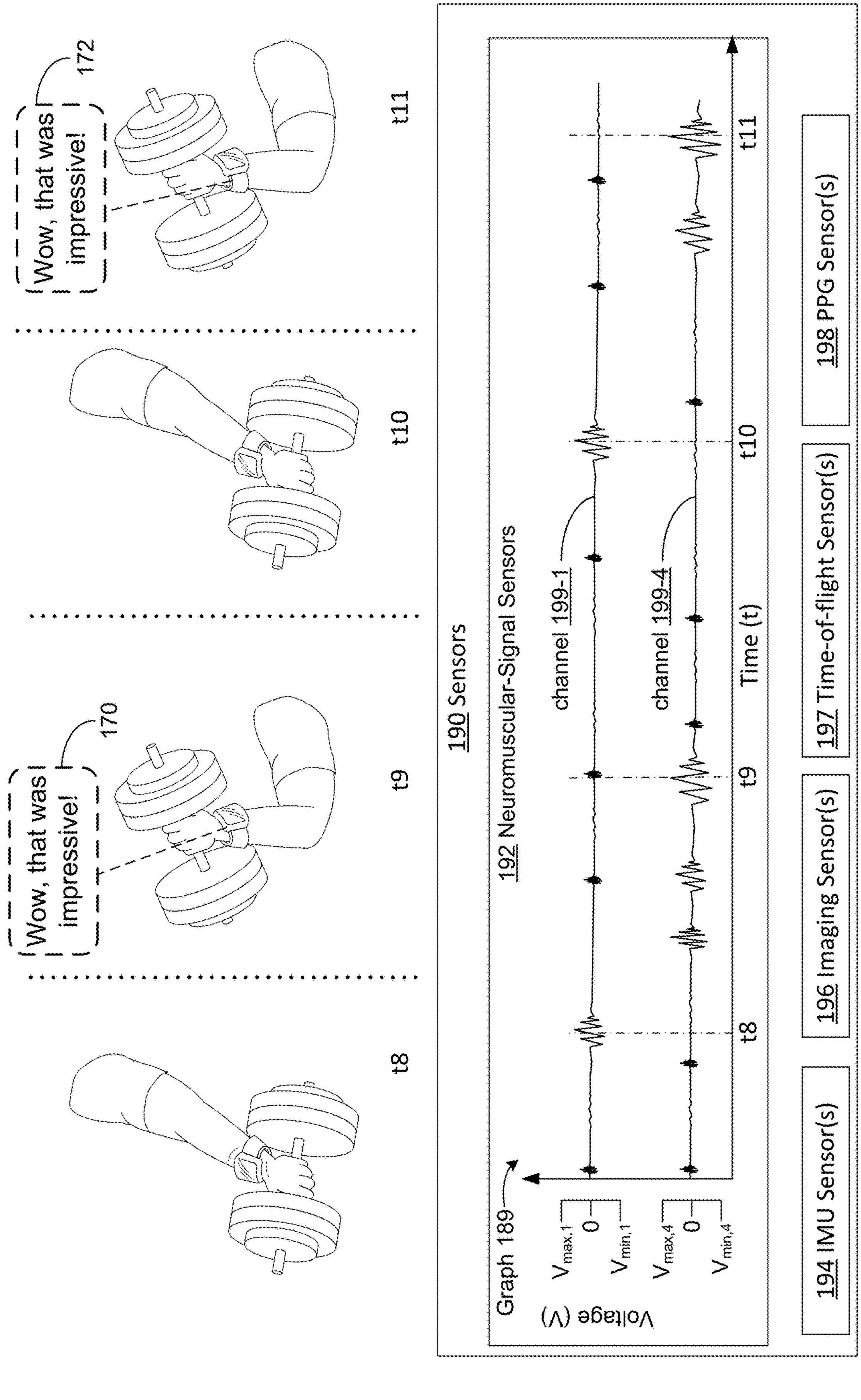

FIG. 1H shows a series of points in time corresponding to the reference numerals t8 to t11 while the user 101 is performing another set of bicep curls. Similar components and elements in FIGS. 1B and 1D are referenced to those. Based on an assessment of the user's form while performing the bicep curls, the wrist-wearable device 102 provides notifications 170 and 172 (e.g., indicating good form).

Figure 1I:
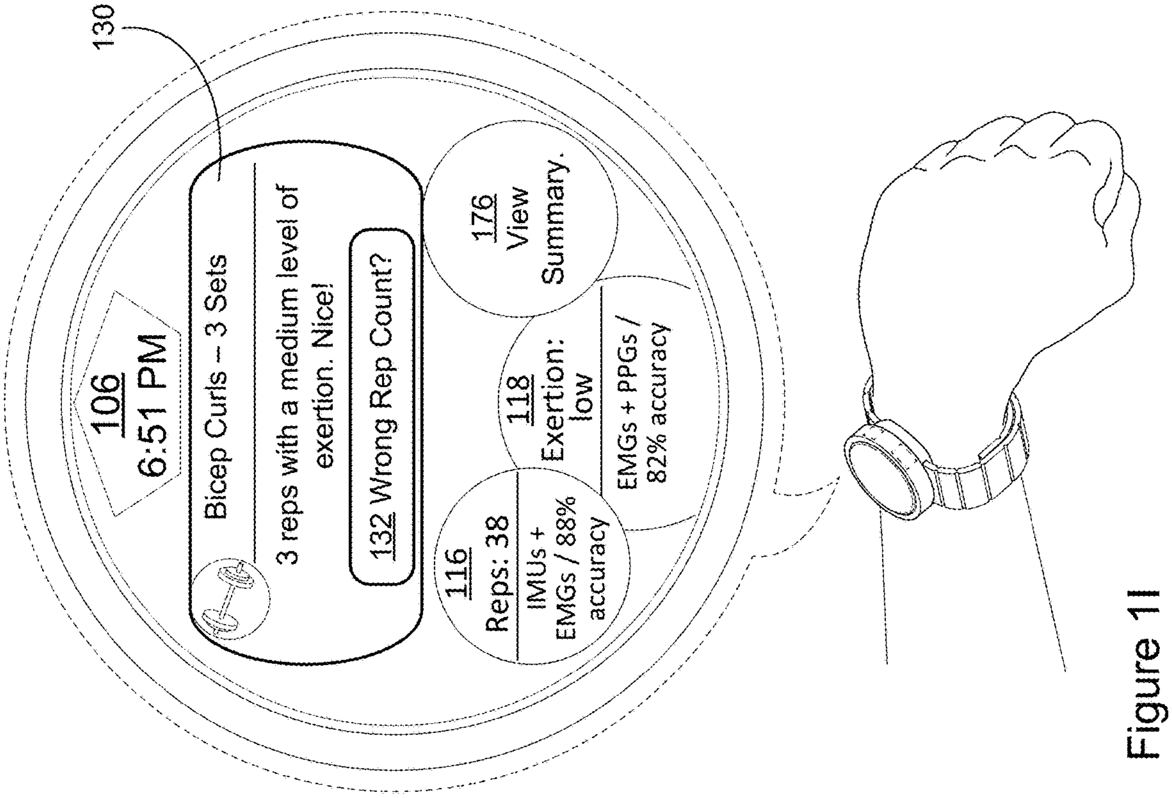

FIG. 1I shows different textual elements and buttons being displayed at the user interface element 130, compared to the user interface element 130 shown in FIG. 1F. The user interface element 130 in FIG. 1I indicates that the user 101 has completed three sets of repetitions of bicep curls. The user interface element 130 in FIG. 1I also includes a selectable button element 132, prompting the user 101 to indicate whether a wrong repetition count was detected by the sensors of the wrist-wearable device 102. In some embodiments, the button element 132 is presented in accordance with a determination that the previous set had a different number of repetitions than expected (e.g., a different number than specified in a workout routine set by the user and/or a different number than a prior set).

Figure 1J:
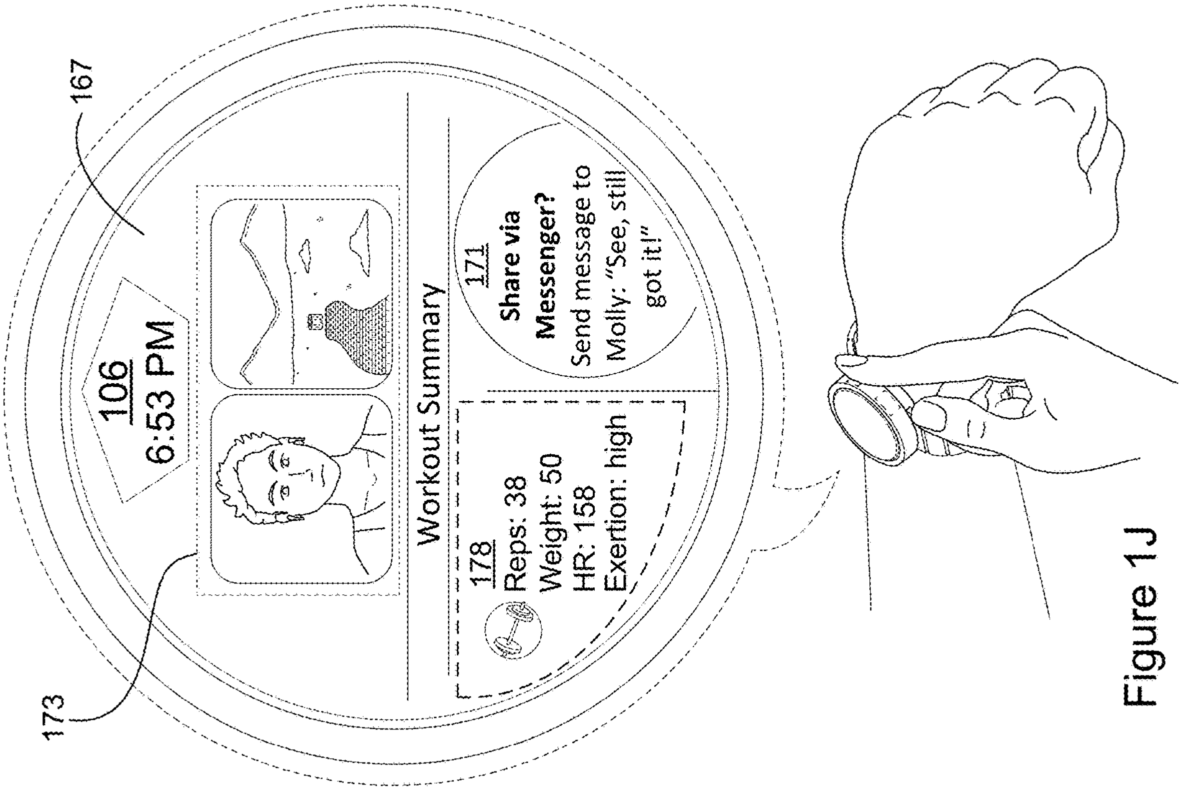

FIG. 1J shows a user interface 167 that includes elements related to sharing information about the physical activity. The user interface 167 includes information 178 about the physical activity. In some embodiments, the user interface 167 is displayed in response to a user selection of the user interface element 176 in FIG. 1I. For example, the user interface 167 includes a user interface element 173 showing a plurality of data items that were captured during the performance of the physical activity. In some embodiments, the wrist-wearable device 102 is configured to capture images based on criteria associated with data detected from the sensors during performance of the physical activity (e.g., notifying the user 101 to capture a selfie image while the neuromuscular-signal sensors detect that the user 101 is in a relaxed state). The user interface 167 further includes a user interface element 171 for sharing information with other people. In the example of FIG. 1J, selection of the user interface element 171 causes a message to be sent to a remote person named "Molly" with information about the user's workout.

Figure 1K:
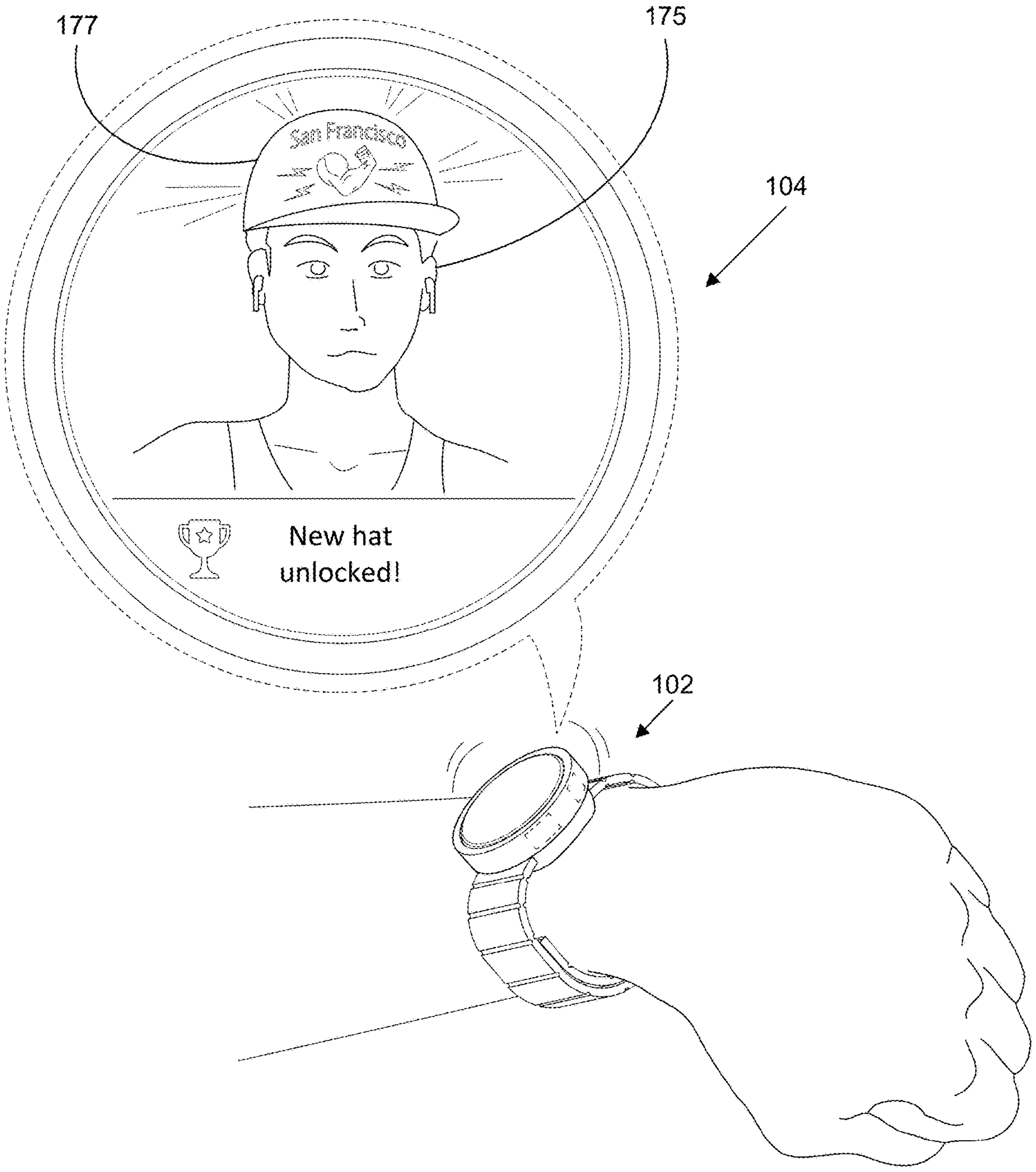

FIG. 1K shows the display 104 of the wrist-wearable device 102 displaying an avatar user interface element 175. The avatar user interface element 175 includes an avatar accessory item 177 (e.g., a virtual hat with a logo based on contextual data related to the performance of the physical activity). For example, the avatar accessory item 177 includes a flexing arm in accordance with the user 101 having performed an arm-related workout. In accordance with some embodiments the accessory item 177 includes textual information, e.g., stating: "San Francisco," indicating a geographical location associated with the user's performance of the physical activity. In some embodiments, the avatar user interface element is provided in conjunction with an option to share the avatar user interface element 175, including and/or alternatively a summary of the physical activity performed by the user 101.

Figure 1L:
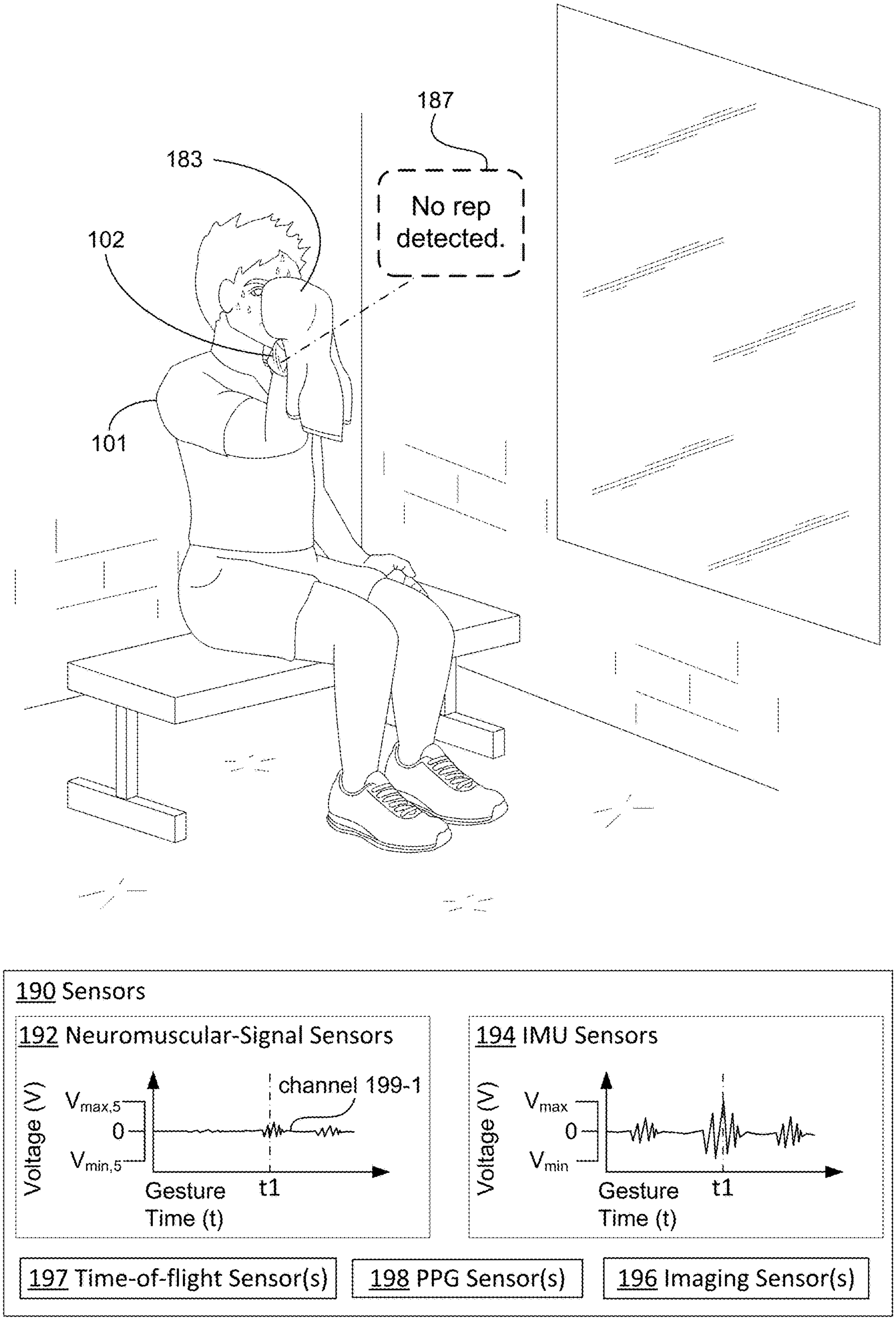

FIG. 1L shows the user lifting a towel to their face. The motion in FIG. 1L has a similar motion profile to that of a bicep curl. The IMU sensors 194 in FIG. 1L detect a signature motion that corresponds to a repetition of a bicep curl, but the neuromuscular-signal sensors 192 do not recognize a similar exertion profile to a repetition of a bicep curl (e.g., a voltage output of a corresponding neuromuscular-signal sensor is below a voltage threshold for a bicep curl). In some embodiments, the exertion profile is based on EMG data generated during the sets of the physical activity (e.g., shown in FIGS. 1B, 1E, and 1H). In accordance with a determination that the user 101 is not performing a bicep curl, the wrist-wearable device 102 in FIG. 1L is presenting a notification 187 (stating: "No rep detected."). In some embodiments, the notification 187 is an audio and/or visual notification. In some embodiments, the wrist-wearable device 102 does not present a notification in accordance with a determination that the user is not performing a repetition. In some embodiments, a notification is provided prompting the user 101 to indicate whether a repetition of the physical activity has been performed, and/or if the user 101 would like to calibrate one or more sensors of the wrist-wearable device for performance of the particular physical activity.

Figure 1M:
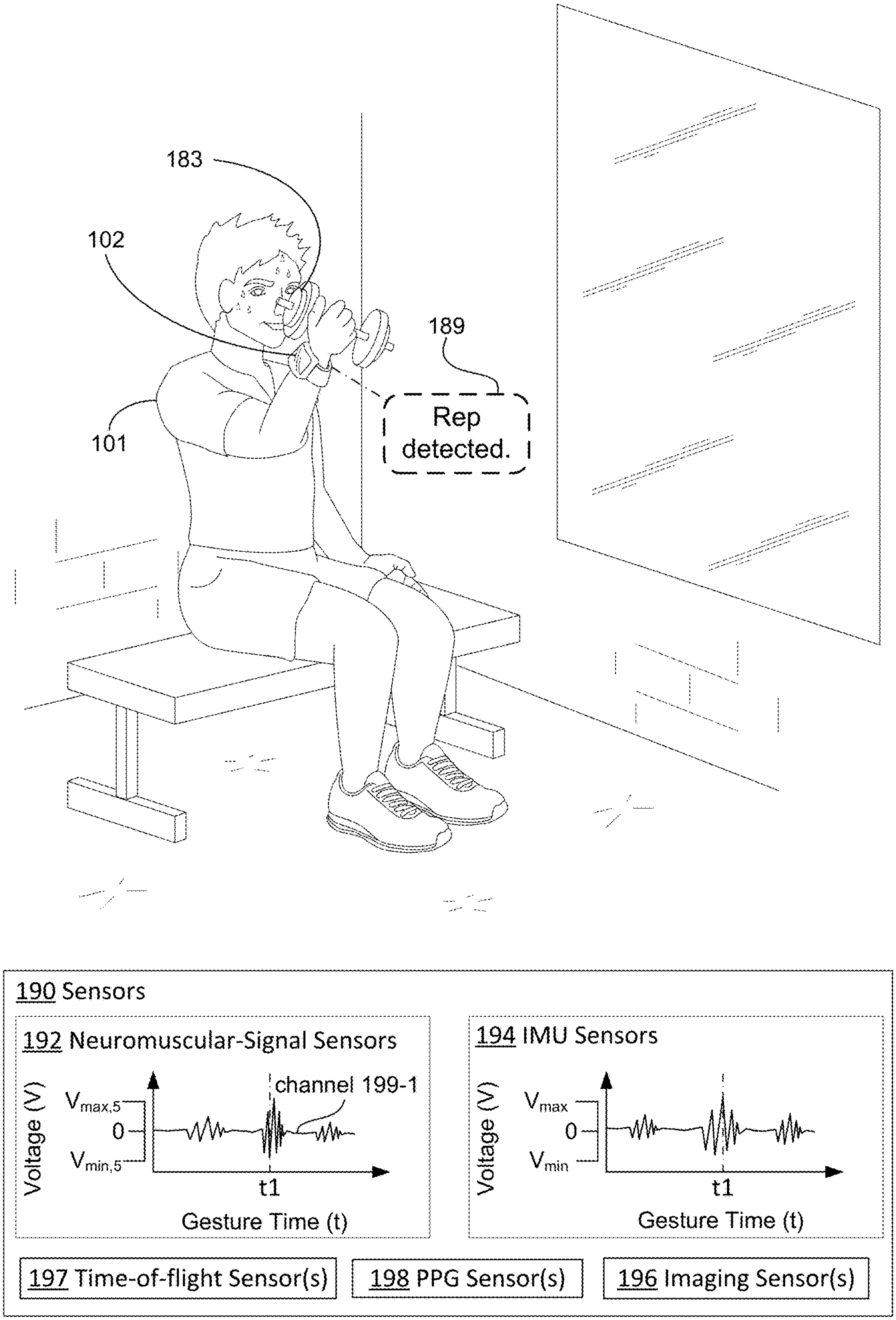

FIG. 1M shows the user performing a repetition of bicep curls with a barbell 183. The IMU sensors 194 in FIG. 1M detect a similar motion to that detected when the user lifted the towel to their face as shown in FIG. 1L. However, in FIG. 1M the neuromuscular-signal sensors 192 detect a level of exertion related to lifting the barbell 183 (e.g., recognize a local minimum exertion and/or a local maximum exertion). FIG. 1M further shows the wrist-wearable device 102 presenting a notification 189 (stating: "Rep detected."). In some embodiments, the notification 189 is an audio and/or visual notification. In some embodiments, the wrist-wearable device 102 does not present a notification in accordance with a determination that the user is performing a repetition. For example, the wrist-wearable device 102 may wait for a threshold period to determine if the user 101 is pausing between repetitions for a sufficient amount of time to provide the notification 189 without interrupting the user's performance of the physical activity.

Figure 2A:
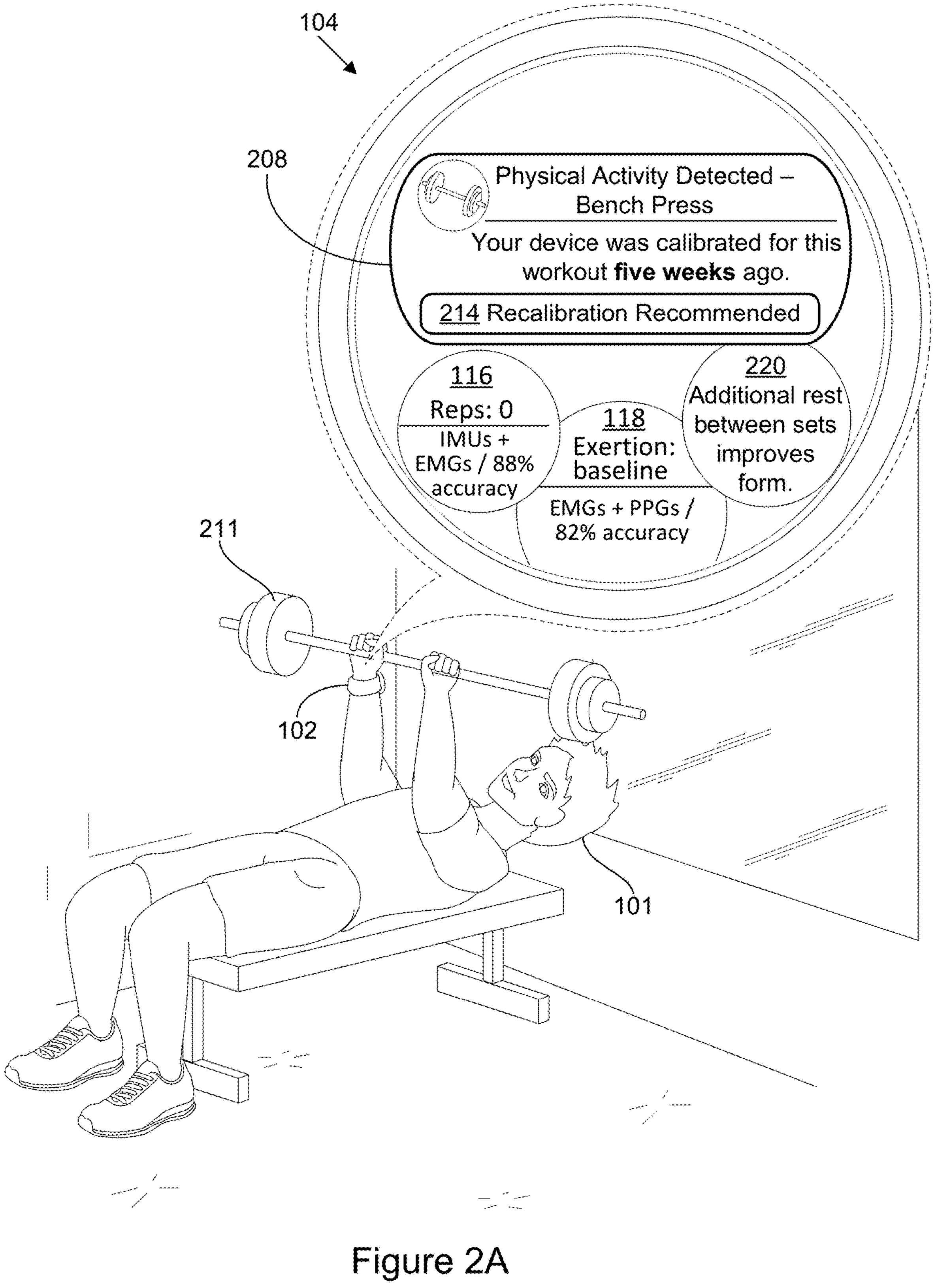
FIGS. 2A-2E illustrate another example user scenario of performing a physical activity while wearing a wearable device in accordance with some embodiments.

FIGS. 2A-2E illustrate another example user scenario of performing a physical activity while wearing a wearable device in accordance with some embodiments. FIG. 2A shows the user 101 at a fitness bench holding a barbell 211. The user 101 is wearing the wrist-wearable device 102. The display 104 of the wrist-wearable device 102 shows a user interface element 208 that includes contextual data. The contextual data in FIG. 2A includes a textual prompt, stating: "Your device was calibrated for this workout five weeks ago." The contextual data in FIG. 2A also includes a physical activity indicator, stating: "Physical Activity Detected—Bench Press." In some embodiments, the physical activity is determined based on data from one or more sensors of the wrist-wearable device (e.g., IMU sensor data). In some embodiments, the user 101 enters information about the physical activity being performed (e.g., via a touch-sensitive portion of the display of the wrist-wearable device 102). In some embodiments, data about the physical activity is received from a workout machine or other electronic device. The user interface element 208 in FIG. 2A also includes a selectable button 214 that states "Recalibration recommended." In some embodiments, the wrist-wearable device 102 prompts the user 101 to recalibrate the sensors of the wrist-wearable device 102 based on a threshold calibration time since the sensors of the wrist-wearable device 102 were previously calibrated. In some embodiments, an indication to calibrate the sensors of the wrist-wearable device 102 is provided to the user 101 based on a detected change in body composition of the user 101 and/or a change in values detected by one or more sensors of the wrist-wearable device 102 during performance of a physical activity. In some embodiments, power is provided to one or more sensors of the wrist-wearable device 102 based on the type of physical activity that is being performed. For example, the wrist-wearable device 102 determines which muscles are involved in the particular physical activity and activates sensors that are positioned to monitor activity of those muscles. In some embodiments, the wrist-wearable device causes operations to be performed by an AR model to determine which sensors and/or sensor channels to activate at the wrist-wearable device 102 based on the type of physical activity that is being performed. The display 104 also shows the repetition indicator 116 and the exertion indicator 118 that were shown in FIGS. 1A-1M. In accordance with some embodiments, a fitness tip 220 is presented to the user 101. In some embodiments, one or more AR models can be used to determine a predicted accuracy of the sensors of the wrist-wearable device based on which sensors are receiving power for the respective physical activity. In some embodiments, the user 101 can provide an input to activate more sensors in order to increase the accuracy of detection of one or more aspects of the physical activity (e.g., repetitions, exertion). In the example of FIG. 2A, the values displayed by the repetition indicator 116 and the exertion indicator 118 are based on the bench-press activity.

Figure 2B:
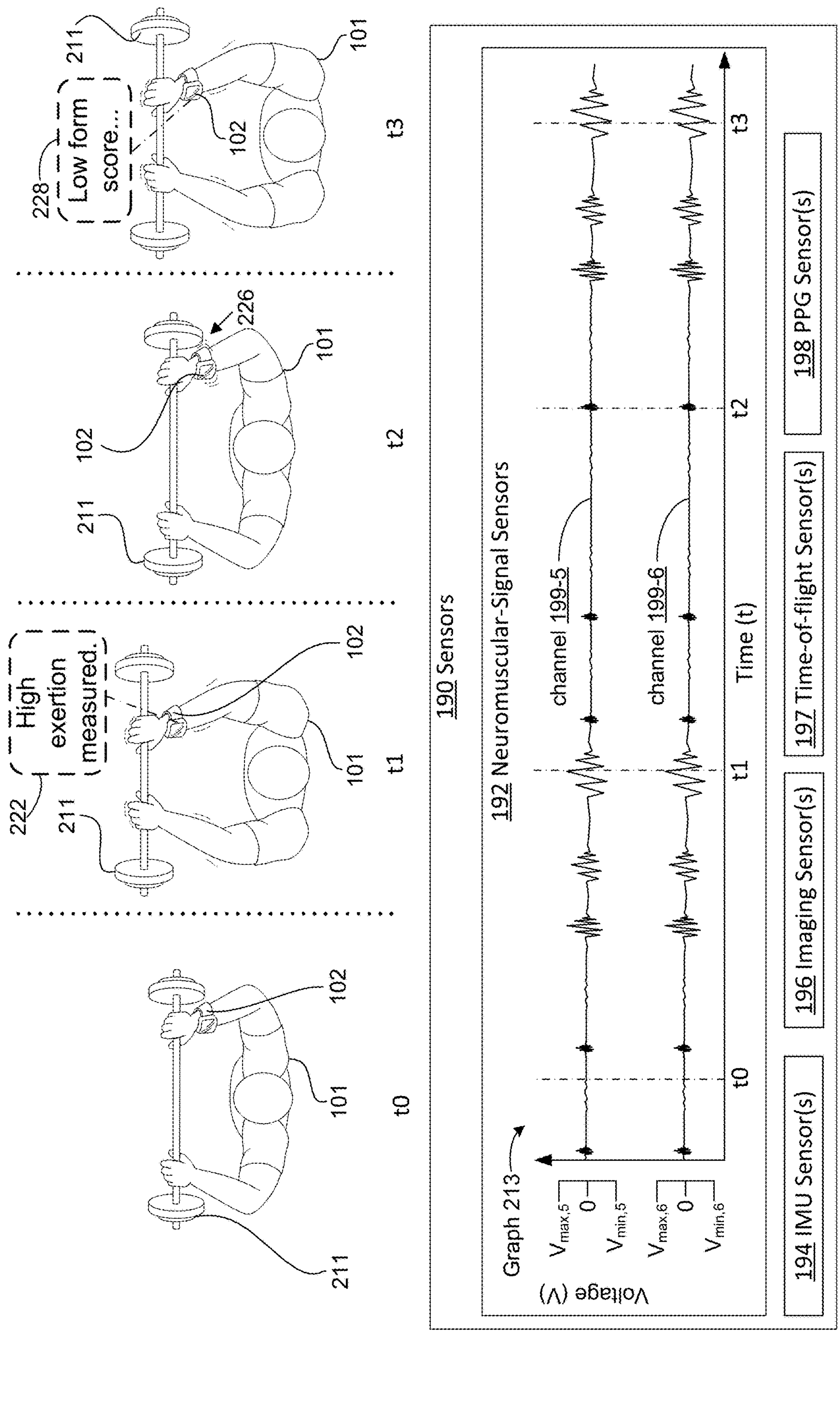

FIG. 2B shows a series of points in time corresponding to reference numerals t0 to t3 while the user is performing a set of bench press lifts. Similar components and elements are referenced to those in similar respective figures of the sequence 1A-1M. In accordance with some embodiments, a subset of sensor channels (e.g., sensor channel 199-5 and sensor channel 199-6), that is distinct from the subset of sensor channels used in FIGS. 1A-1M, are used to detect repetitions of a bench press being performed. In some embodiments, the user's exertion is determined based on a specific subset of neuromuscular-signal sensor channels that are being used to detect the particular physical activity (e.g., bench press).

At time t0, the user's arms are bent (e.g., corresponding to a minimum amount of exertion by muscle of the user's arm). In accordance with some embodiments, the channels 199-5 and 199-6 are monitoring muscle(s) that are engaged when the user's arm is straight as indicated in the graph 213. At time t1, the user's arms are straight and the wrist-wearable device 102 detects high exertion as indicated by notification 222. In accordance with some embodiments, the channels 199-5 and 199-6 output respective voltages that correspond to the user's arm being straight (e.g., local maximums) as indicated in the graph 213. In some embodiments, the indication that the user is exerting high exertion is based on the particular sensors that are being used to measure the particular activity (e.g., as opposed to an overall exertion of the user). For example, the same user 101 may cause a lower-than-normal exertion to be detected for one particular activity (e.g., bicep curls), and a higher-than-normal exertion for another physical activity (e.g., bench press). In some embodiments, the notification 222 is an audio notification and/or a visual notification. In some embodiments, the wrist-wearable device 102 detects the high exertion but does not issue a notification. At time t2, the user's arms are bent again and the wrist-wearable device 102 generates a notification 226 (e.g., an audio, visual, and/or haptic notification). In some embodiments, the wrist-wearable device 102 generates the notification 226 in accordance with detecting a local minimum and/or determining that the user's arms are fully bent for the bench-press workout. In some embodiments, the wrist-wearable device 102 generates the notification 226 in accordance with determining that the user has completed a bench press repetition. At time t3, the user's arms are straight and the wrist-wearable device 102 generates a notification 228, e.g., indicating that the user's current repetition has improper form (e.g., the user is straightening one arm faster than the other rather than keeping the barbell 211 level). In some embodiments, an indication about the user's form can be provided based on detecting a higher-than-normal exertion by one respective sensor channel (e.g., the channel 199-5) in conjunction with detecting a lower-than-normal exertion by another respective sensor channel (e.g., the channel 199-6) for the performance of the same repetition of the physical activity. That is, the form indication can be determined based on the user 101 overexerting one or more muscle groups associated with a first sensor channel, and under-exerting one or more muscle groups associated with a second sensor channel.

Figure 2D:
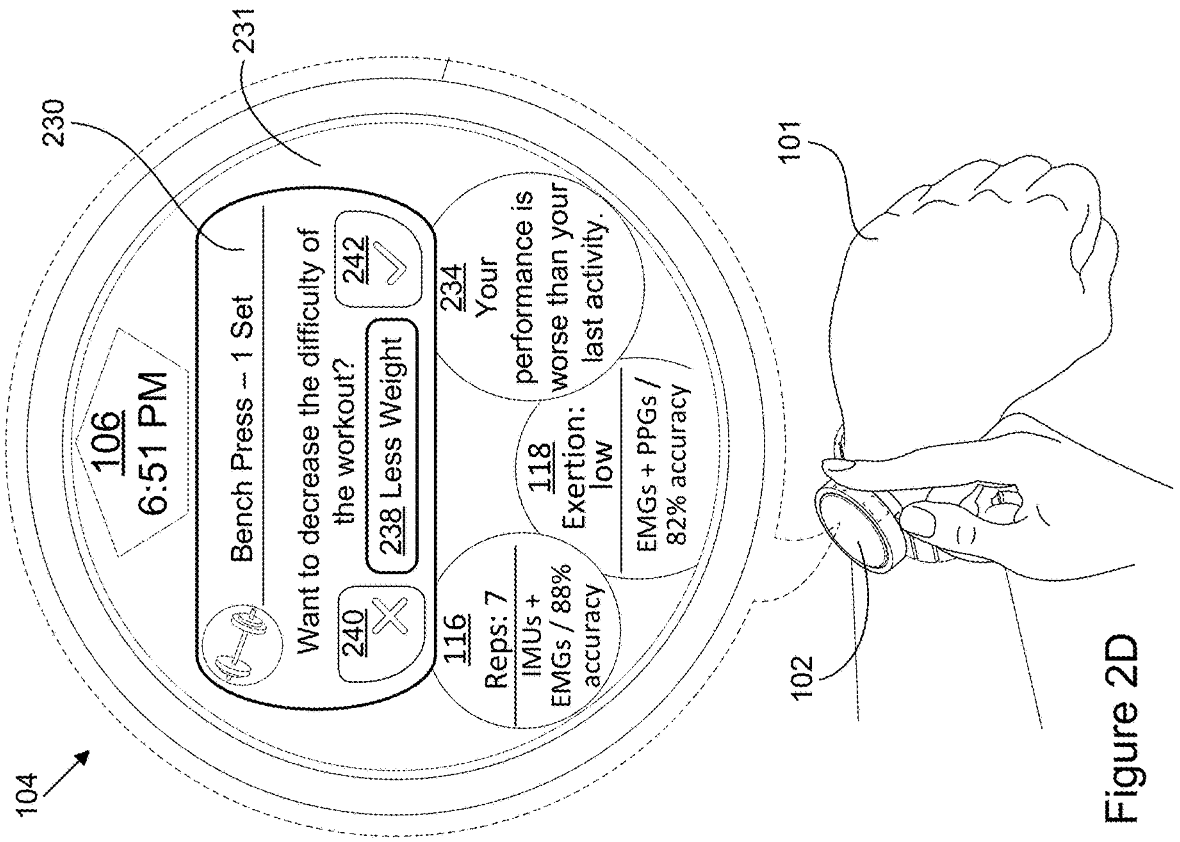
Figure 2C:
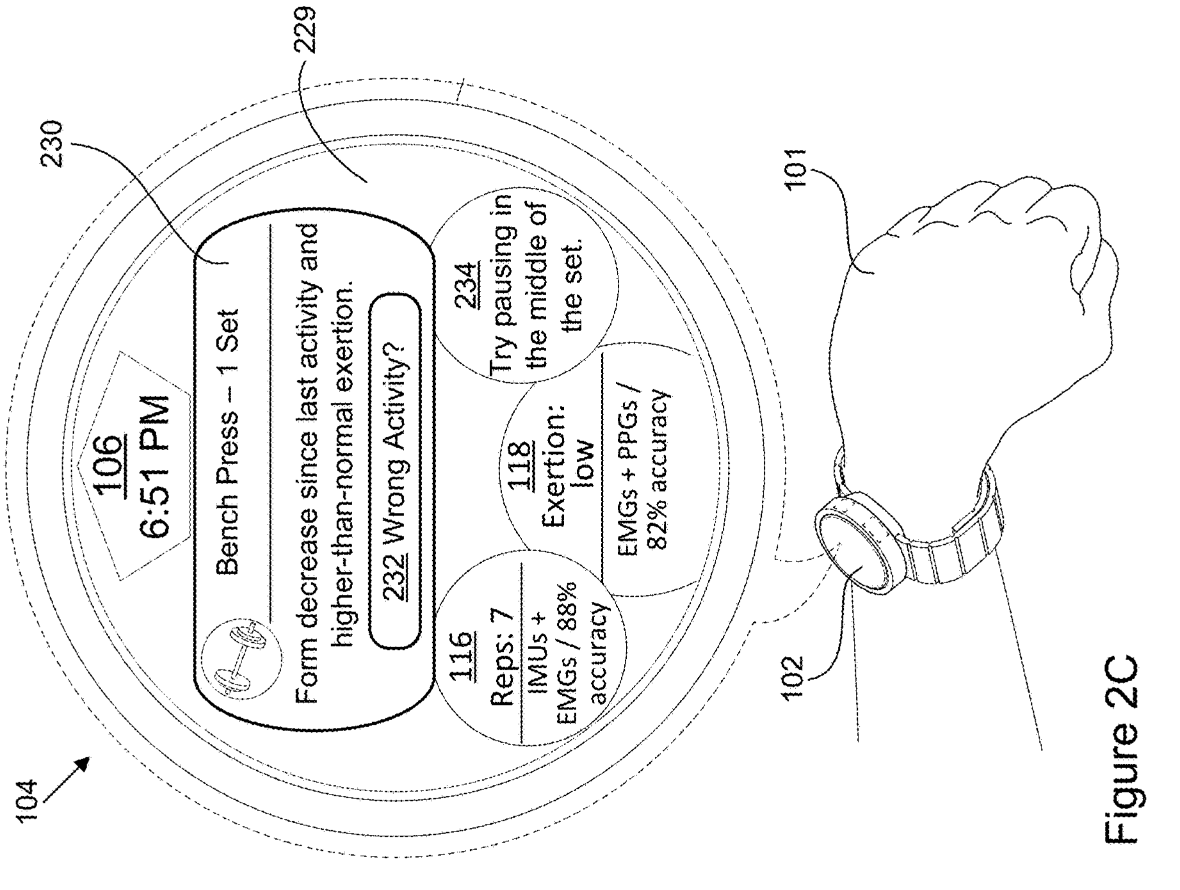

FIG. 2C shows an activity user interface 229 being displayed at the display 104 of the wrist-wearable device 102, e.g., after the user 101 has performed a set of bench-press repetitions. The user interface 229 includes a user interface element 230 showing contextual data about the user's performance of the set of bench presses. The contextual data includes a set indicator, e.g., stating: "Bench Press—1 Set." The user interface element 230 also includes a textual prompt (e.g., stating: "Form decrease since last activity and higher than normal exertion."). In this way, the wrist-wearable device 102 can use data from the different sensors to determine whether a user is generally performing well at all physical activities, and additionally or alternatively whether the user 101 is performing a particular physical activity (e.g., bench press) effectively and/or is exerting a higher-than-normal level for the particular physical activity (e.g., that the user is exerting a higher-than-normal exertion for bench press, after exerting a lower-than-normal exertion for bicep curl). In the example of FIG. 2C, the user interface element 230 also includes a selectable button 232 that the user 101 can activate to select a different physical activity. The user interface 229 also includes the repetition indicator 116 and the exertion indicator 118 shown in FIGS. 1A to 1M, but with values corresponding to the new physical activity that the user 101 is performing (e.g., bench press). The user interface 229 also includes a user interface element 234 that is configured to provide an adaptive notification to the user. In some embodiments, the adaptive notification includes feedback to the user regarding form and/or exertion, e.g., stating: "Try pausing in the middle of the set."

FIG. 2D shows an activity user interface 231 being displayed at the display 104. In the user interface 231, the user interface element 230 is presenting textual information to the user 101 related to the particular physical activity that the user 101 is performing. In FIG. 2D, the user interface element 230 includes a textual prompt, stating: "Want to decrease the difficulty of the workout?" The user interface element 230 also includes a plurality of selectable buttons 238, 240, and 242 to allow the user 101 to adjust the difficulty of the workout (e.g., adjust an amount of weight on the barbell).

Figure 2E:
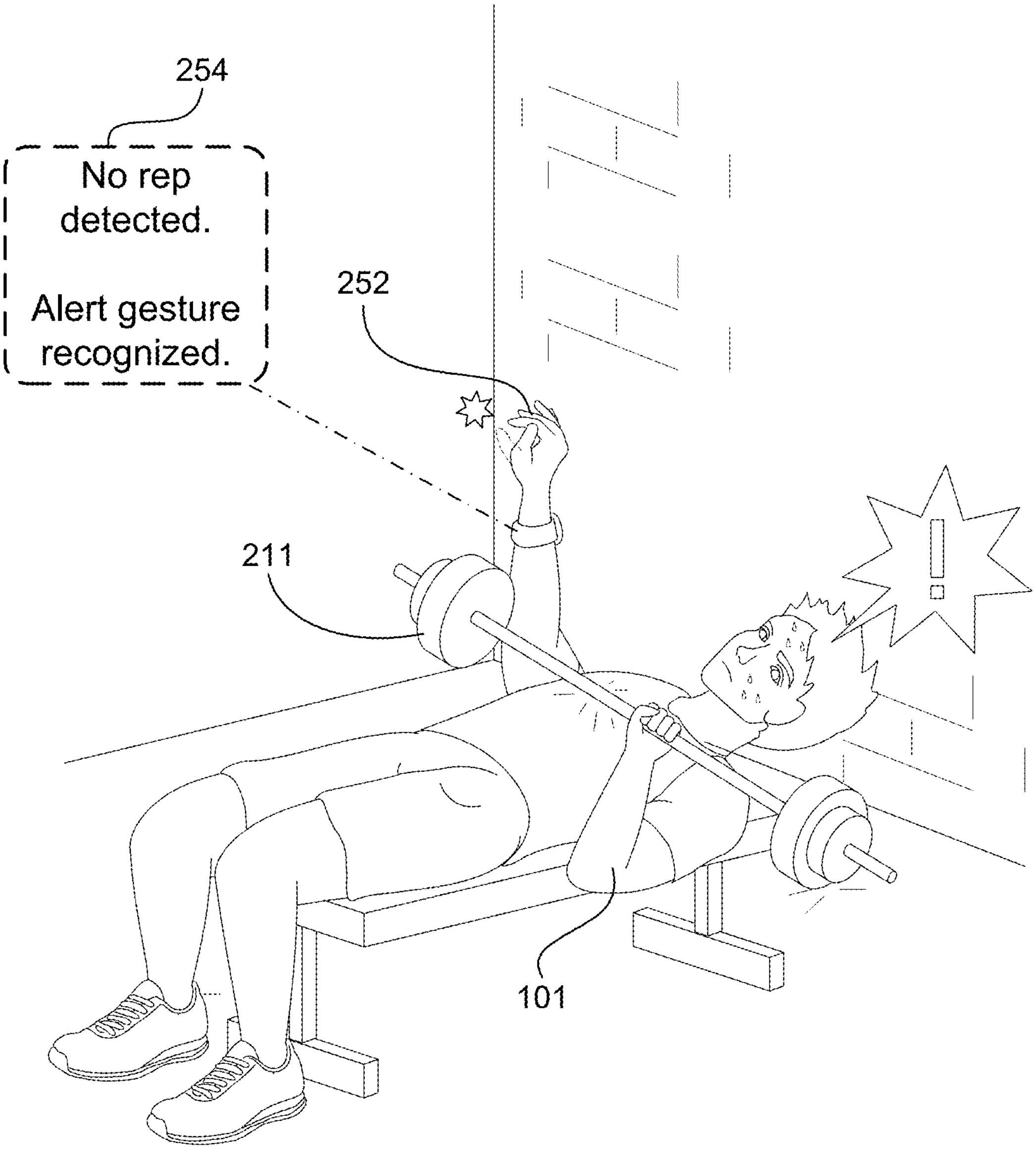

FIG. 2E shows the user 101 performing an alert gesture 252 while the barbell 211 is on the user's chest, e.g., the user 101 is unable to raise the barbell 211. In some embodiments, in response to detecting the alert gesture 252, the wrist-wearable device 102 sends a notification to a remote device to notify a remote person that the user 101 is in a dangerous situation. In some embodiments, the notification is sent to a remote device previously selected by the user 101 (e.g., a remote device selected as an emergency contact). In some embodiments, the notification is sent to nearby remote devices (e.g., the notification is broadcast to nearby devices via Bluetooth and/or Wi-Fi protocol). In some embodiments, the notification is sent to emergency responders (e.g., a police department, gym security, a fire department, and/or medical personnel). In some embodiments, the notification includes context information of the user 101, such as the user's biometric data, the user's location, an image captured by the wrist-wearable device or another device of the user, and/or audio data captured by the wrist-wearable device or another device of the user. In some embodiments, based on the user 101 performing the alert gesture 252 in conjunction with the contextual information that the user is located at a public gym facility, a notification can be provided to another user (e.g., a user that has subscribed to the alert service associated with the alert gesture) that is located at the same public gym facility. In accordance with some embodiments, the wrist-wearable device 102 in FIG. 2E is presenting a notification 254 to the user 101, e.g., indicating that no repetition was detected and/or that an alert gesture was recognized. In some embodiments, user interface elements related to the particular physical activity are caused to be subdued based on detecting the alert gesture.

Figure 3A:
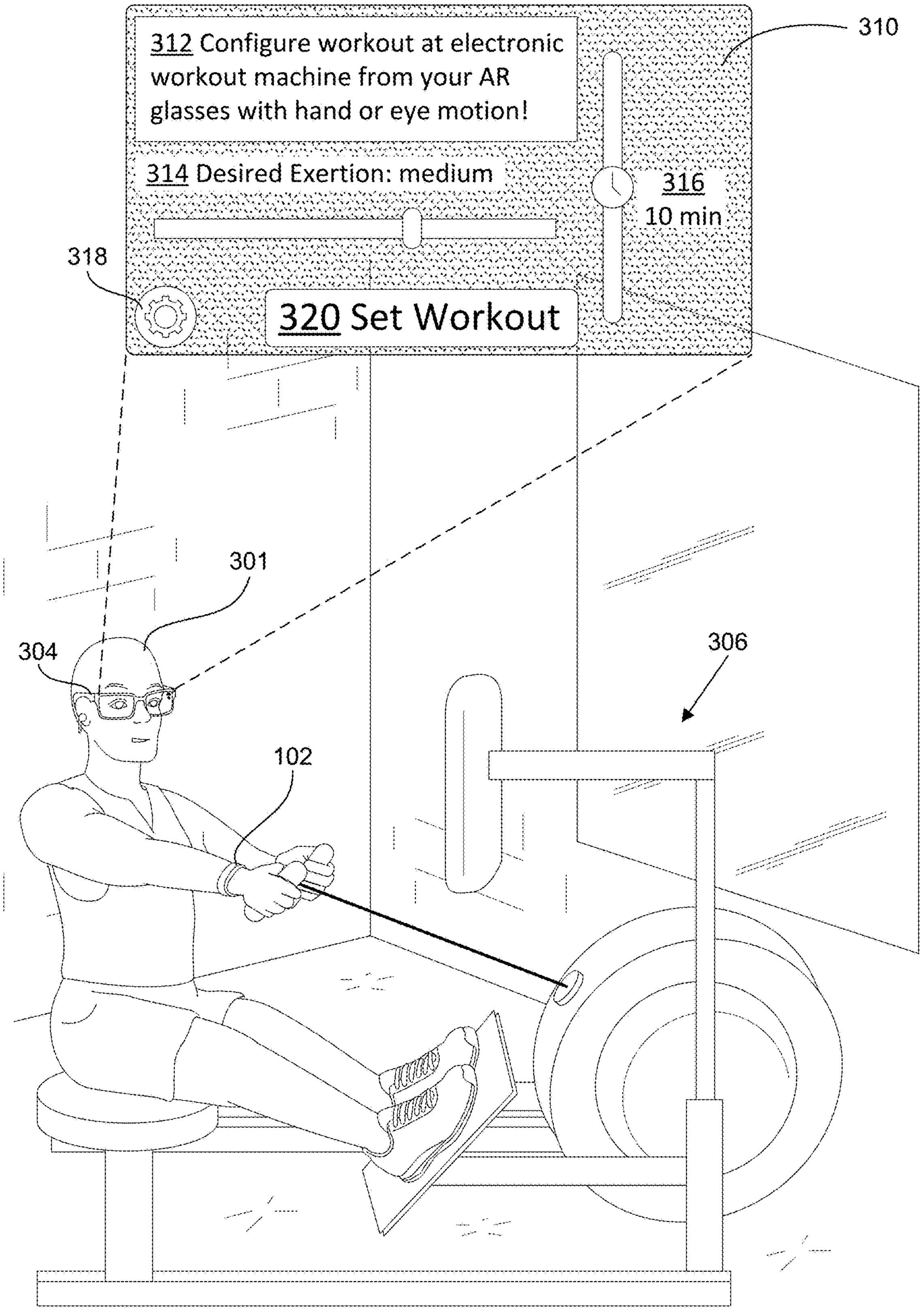
FIGS. 3A-3I illustrate another example user scenario of performing a physical activity while wearing a wearable device in accordance with some embodiments.

FIGS. 3A-3I illustrate another example user scenario of performing a physical activity while wearing the wrist-wearable device 102. FIG. 3A shows a user 301 preparing to perform a physical activity at an electronic workout machine 306 (e.g., a rowing machine). Specifically, the user 301 is performing a rowing-machine exercise at the electronic workout machine 306. The user 301 is wearing a wrist-wearable device 102, and a head-wearable device 304 (e.g., AR glasses).

In the example of FIG. 3A, the head-wearable device 304 is presenting a user interface 310 to the user 301 related to the performance of the physical activity. The user interface 310 includes a textual prompt 312, stating: "Configure workout at electronic workout machine from your AR glasses with hand or eye motion!" The user interface 310 also includes a selectable exertion indicator 314, which displays, and allows the user 301 to adjust, a level of exertion corresponding to their performance of the physical activity. The user interface 310 also includes an activity-duration indicator 316, which indicates an activity duration and allows the user 301 to adjust their desired duration for performing the physical activity. The user interface 310 includes a selectable settings button 318, which is configured to allow the user 301 to adjust one or more settings of performance of physical activities. The settings can include an option to calibrate the sensors of the user's respective electronic devices. For example, sensors at the head-wearable device 304 can be detected during calibration and can cause an adjustment to the detection settings of the physical activity. The user interface 310 includes a selectable button 320, which allows the user to set and/or adjust the workout, e.g., indicate a start of the physical activity. In some embodiments, the selectable button 320, and/or any of the other user interface elements displayed at the user interface 310, is selected based on a tracked eye movement of the user, alone or in conjunction with a hand gesture detected by the head-wearable device 304, the wrist-wearable device 102, and/or sensors of the electronic workout machine 306.

Figure 3B:
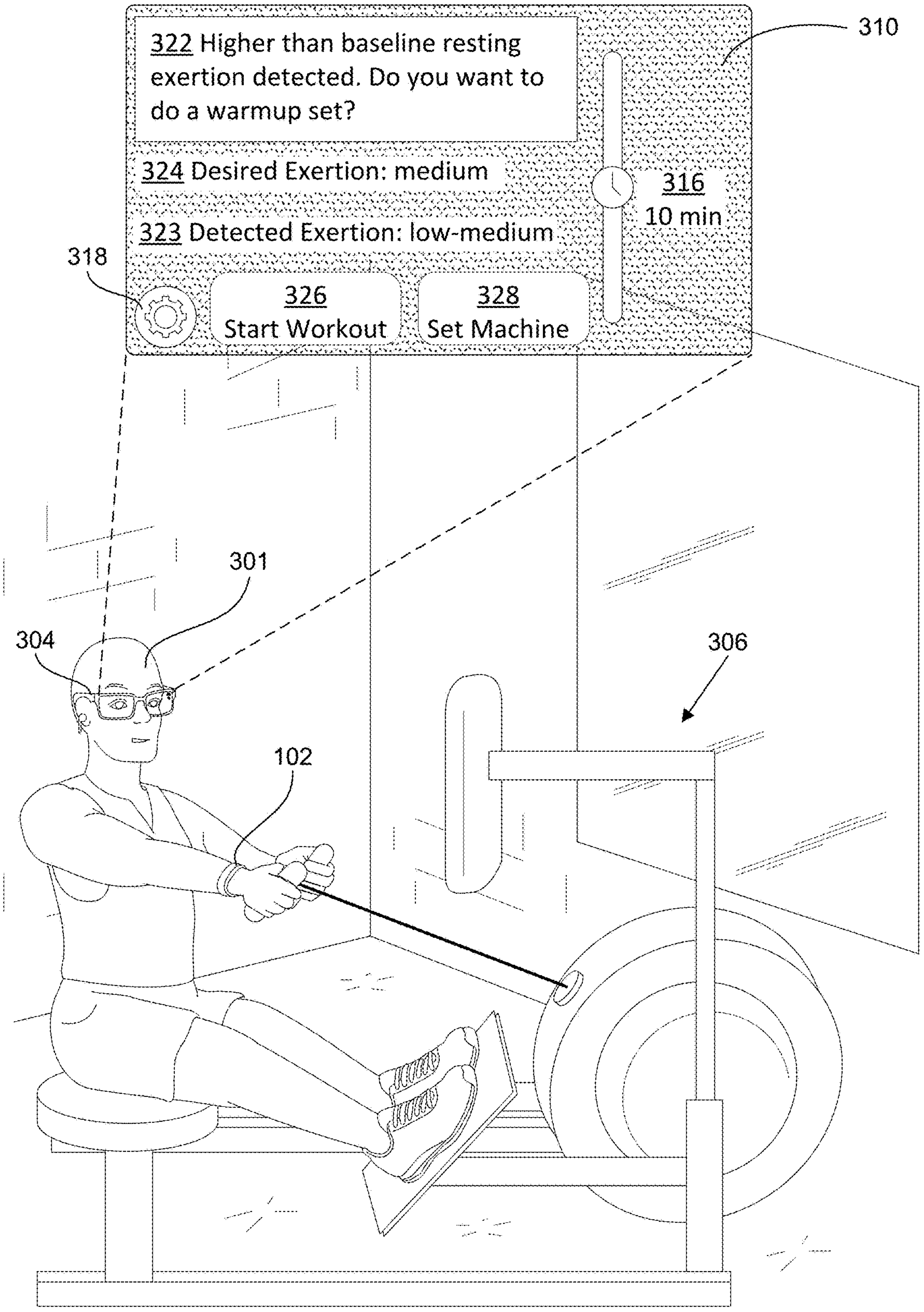

FIG. 3B shows the user 301 at the electronic workout machine 306, e.g., after the user has selected the selectable button 320 shown in FIG. 3A. The user interface 310 in FIG. 3B includes a textual prompt 322, stating: "Higher than baseline resting exertion detected. Do you want to do a warmup set?" For example, the user interface 310 in FIG. 3B is updated in accordance with the user selecting the selectable button 320 shown in FIG. 3A. In some embodiments, the textual prompt 322 is based on data from one or more neuromuscular-signal sensors. For example, the textual prompt may state "Low exertion detected, do you want to increase difficulty?" in accordance with data from the one or more neuromuscular-signal sensors indicating that an exertion level of the user is below a preset threshold.

The user interface 310 also includes a desired exertion indicator 324, e.g., that corresponds to an exertion level set via the selectable button element 314 in FIG. 3A. The user interface 310 in FIG. 3B also includes a detected exertion indicator 323, e.g., that corresponds to an exertion level detected by one or more neuromuscular-signal sensors of the wrist-wearable device 102. The user interface 310 in FIG. 3B also includes the activity-duration indicator 316 and the selectable settings button 318. The user interface 310 further includes a selectable button 326 to start the physical activity (e.g., rowing machine workout) and a selectable button 328 to select (e.g., identify and/or communicatively couple with) a workout machine (e.g., the electronic workout machine 306).

Figure 3C:
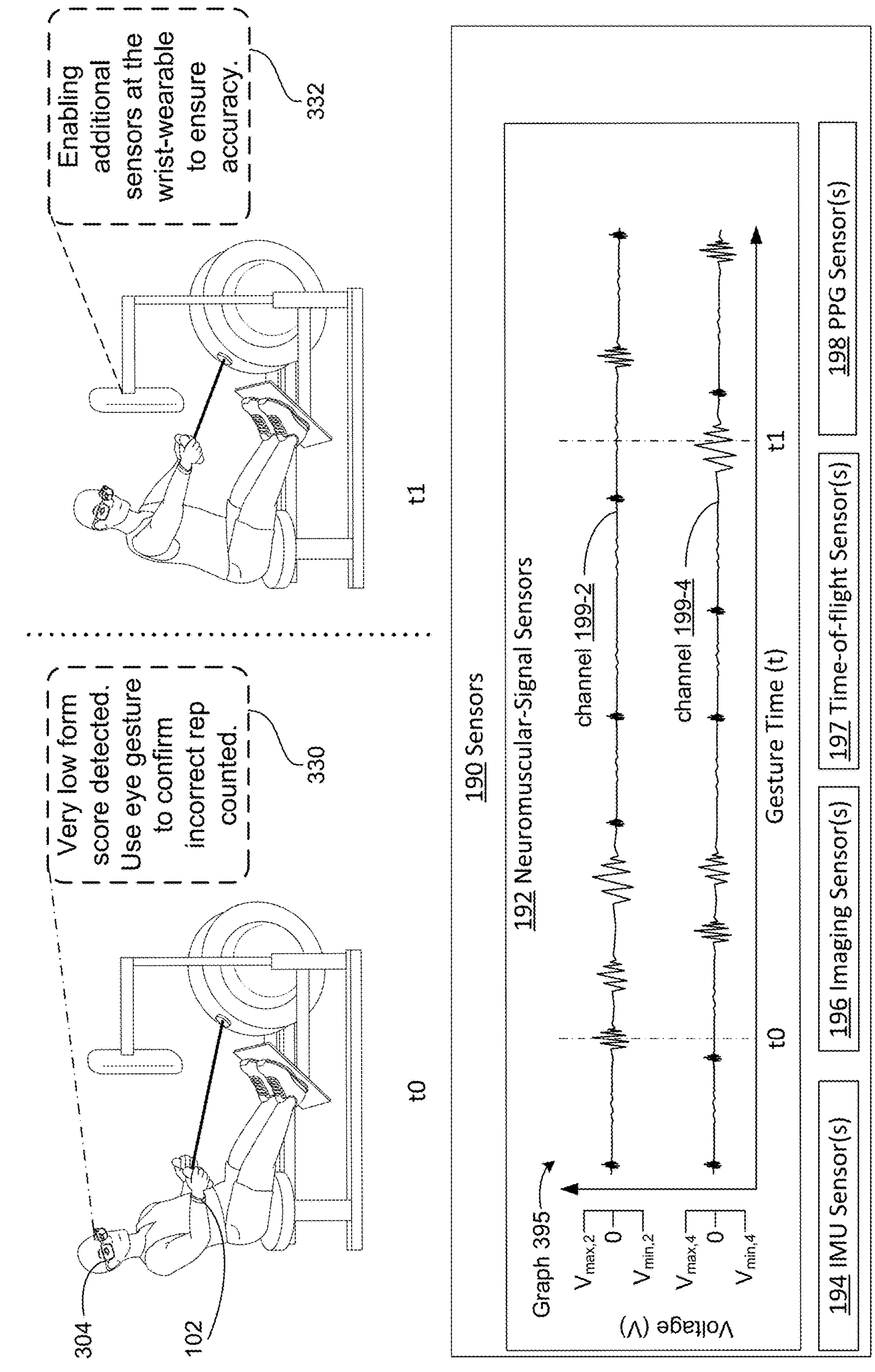

As shown in FIG. 3C, the user 301 is performing a rowing exercise at the electronic workout machine 306 while wearing the wrist-wearable device 102. At time t0, the user is in a fully extended position (e.g., corresponding to a maximum amount of exertion by at least one muscle group being detected by the wrist-wearable device 102). In accordance with some embodiments, the channel 199-2 is monitoring a muscle that is engaged when the user is in the fully extended position of the rowing exercise. FIG. 3C shows the wrist-wearable device 102 detecting a local maximum at t0 on channel 199-2, as indicated by the graph 395. A notification 330 is provided to the user 301, e.g., via the electronic workout machine 306, which is in electronic communication with the wrist-wearable device 102, in accordance with some embodiments. The notification 330 states "Very low form score detected. Use eye gesture to confirm incorrect rep counted," which can be based on detected signals from one or more of the sensors 190.

At time t1, the user 301 is in a contracted position as part of the rowing exercise (e.g., corresponding to a minimum amount of exertion by at least one muscle group being detected by the wrist-wearable device 102). In accordance with some embodiments, the channel 199-4 is monitoring a muscle that is engaged when the user is in the contracted position of the rowing exercise, as indicated by the graph 395. A notification 332 is provided to the user 301 via the electronic workout machine 306. The notification 332 states: "Enabling additional sensors at the wrist-wearable device to ensure accuracy," which can be based on detected signals from one or more of the sensors 190, including the neuromuscular signal(s) associated with the sensor channel 199-4. In some embodiments, the wrist-wearable device 102 automatically activates (enables) additional sensors in accordance with a determination that accuracy is below a preset threshold. In some embodiments, the wrist-wearable device activates additional sensors in accordance with input from the user.

Figure 3D:
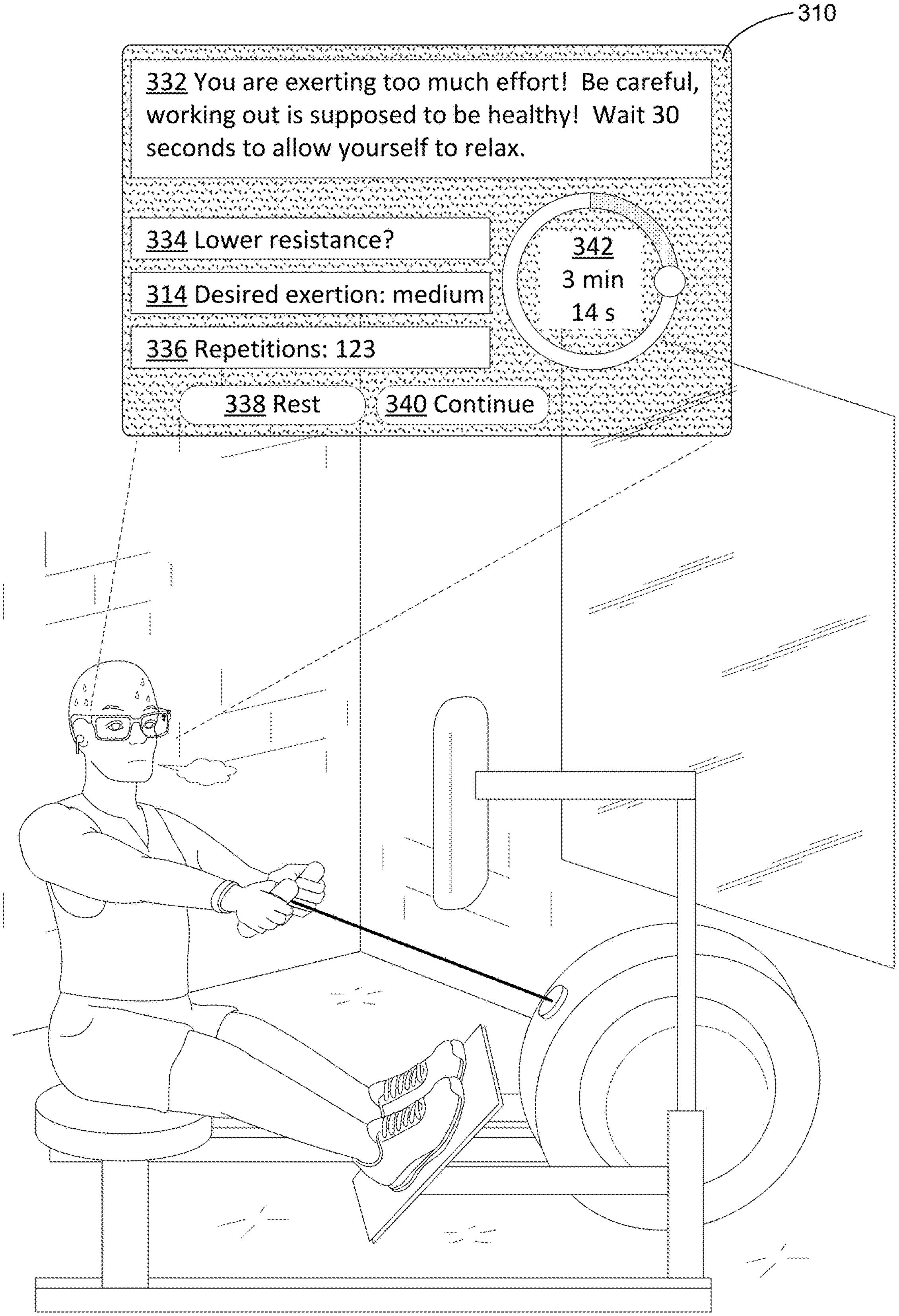

FIG. 3D shows the user 301 after the user has completed performance of a set of repetitions of rows at the electronic workout machine 306. The user interface 310 in FIG. 3D is displaying several user interface elements related to the performance of the physical activity. A notification 332 (e.g., textual prompt) is displayed, stating: "You are exerting too much effort! Be careful, working out is supposed to be healthy! Wait 30 seconds to allow yourself to relax." In some embodiments, the textual prompt 332 is displayed in accordance with a determination that an exertion level of the user was above a preset threshold. Selectable button elements 314, 334, and 336 are included in the user interface 310 in FIG. 3D and provide the user 301 with the ability to adjust workout parameters and/or settings at the electronic workout machine 306. An activity-duration indicator 342 is also presented in FIG. 3D, indicating a time that the user has spent performing the physical activity at the electronic workout machine 306. Selectable buttons 338 and 340 are presented at the user interfaced 310 in FIG. 3D, respectively providing the user 301 with the ability to rest or begin another set of repetitions of the physical activity. In some embodiments, in addition to, or alternatively to, the user interface elements being based on the detections from sensors that are in communication with the wrist-wearable device 102, visual aspects and/or elements of the user interface 310 are based on the electronic workout machine 306 being in electronic communication with the wrist-wearable device 102.

Figure 3E:
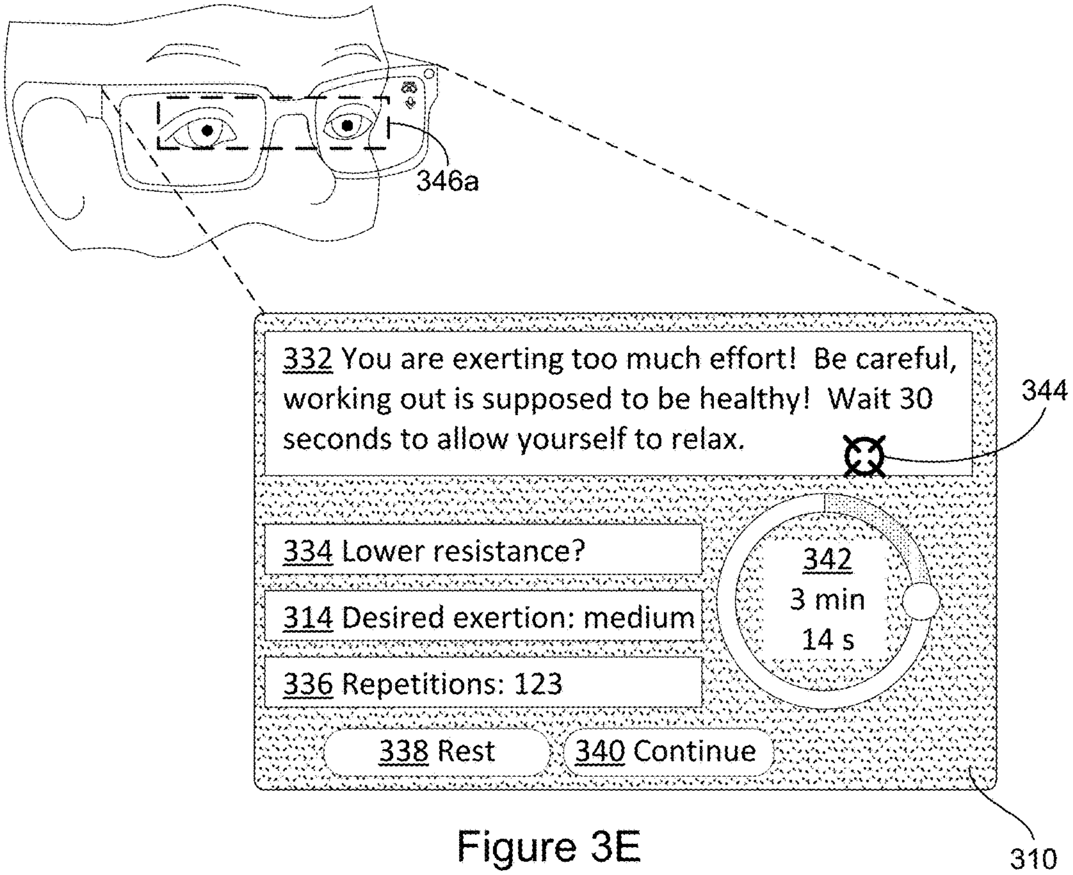
Figure 3F:
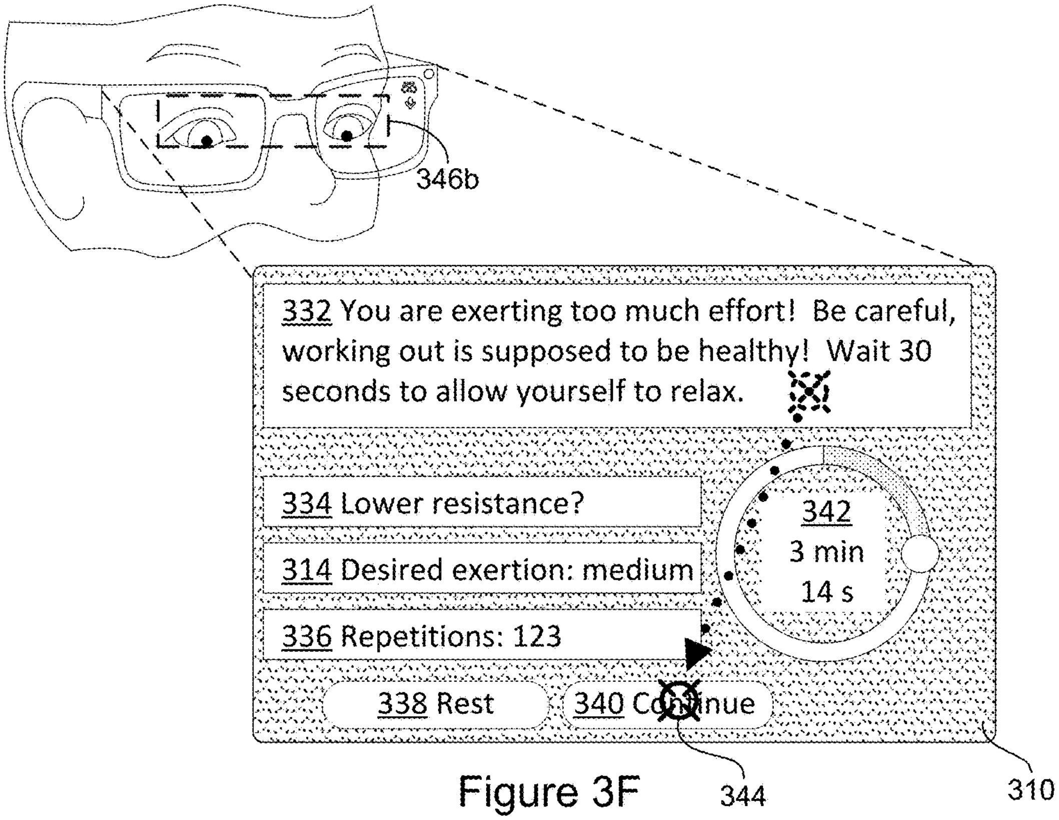

FIGS. 3E-3F show the user 301 performing a tracked eye movement (e.g., from position 346*a* in FIG. 3E to position 346*b* in FIG. 3F) that causes a focus selector 344 presented within the user interface 310 to move from a first location to a second location within the user interface 310. Specifically, the tracked eye movement causes the focus selector 344 to move over a selectable button 340, which corresponds to starting another repetition of the physical activity. In this way, the user is able to interact with the user interface 310 in a hands-free manner (e.g., while performing the physical activity). In some embodiments, the user's eye movement is tracked using one or more image sensors (e.g., arranged on the head-wearable device 304).

Figure 3G:
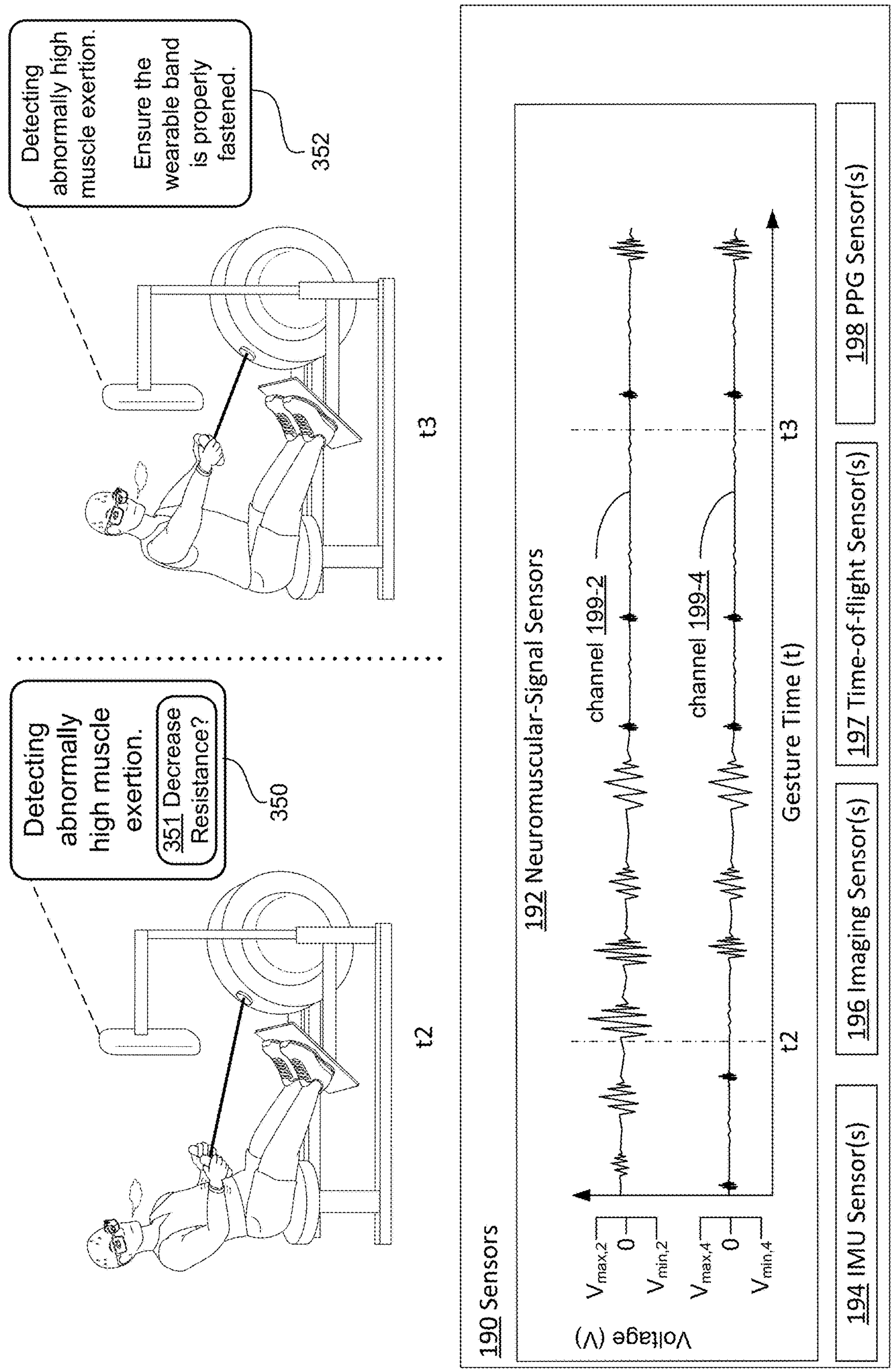

FIG. 3G shows the user performing a portion of another set of repetitions of rows at the electronic workout machine 306. At time t2, a notification 350 is presented via the electronic workout machine, stating: "Detecting abnormally high muscle exertion" with a selectable button 351, stating: "Decrease Resistance?" In some embodiments, the notification is presented in accordance with a determination that an exertion level of the user is above a preset threshold (e.g., an exertion level corresponding to the channel 199-2). At time t3, a notification 352 is presented (e.g., visually and/or audibly output) via the electronic workout machine, stating: "Detecting abnormally high muscle exertion. Ensure the wearable band is properly fastened." In some embodiments, the notification 352 is presented in accordance with a determination that an accuracy of the device does not meet one or more criteria and/or an exertion level of the user is above a preset threshold.

Figure 3H:
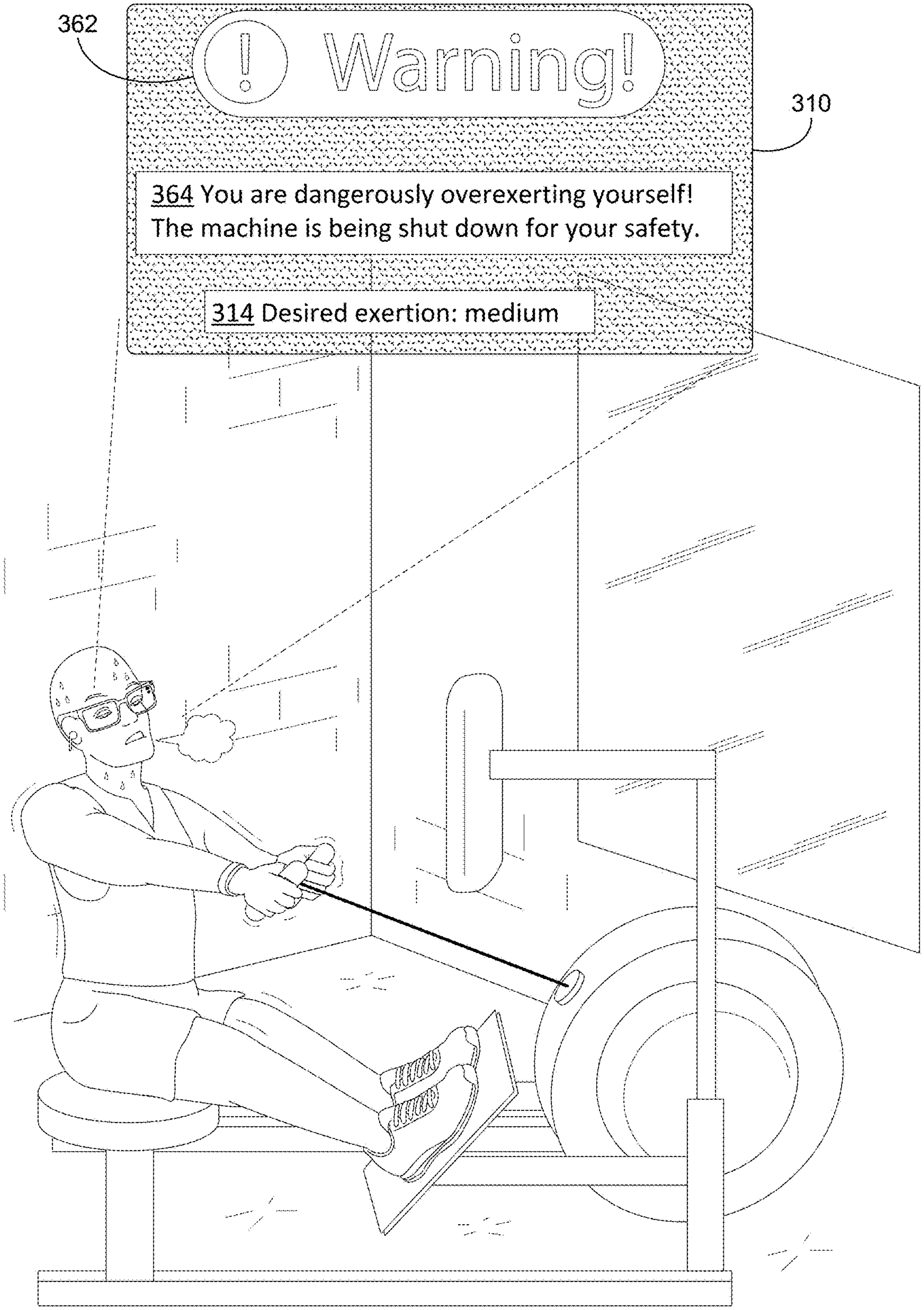

FIG. 3H shows the user continuing to perform the physical activity while the user interface 310 is displaying a warning element 362 indicating to the user that the detected exertion is above a second (higher) exertion threshold. The user interface 310 in FIG. 3H is also displaying a user interface element 364, stating: "You are dangerously over-exerting yourself! The machine is being shut down for your safety." In some embodiments, based on a determination that an exertion of the user 301 is above a second exertion level, the wrist-wearable device 102 and/or another electronic device that is in electronic communication with the electronic workout device causes a shutdown command to be provided at the electronic workout machine 306. In some embodiments, the user interface 310 in FIG. 3H is displayed in accordance with a determination that an exertion of the user is above an exertion threshold and/or other sensors (e.g., a heartrate sensor) indicate that the user is unwell.

Figure 3I:
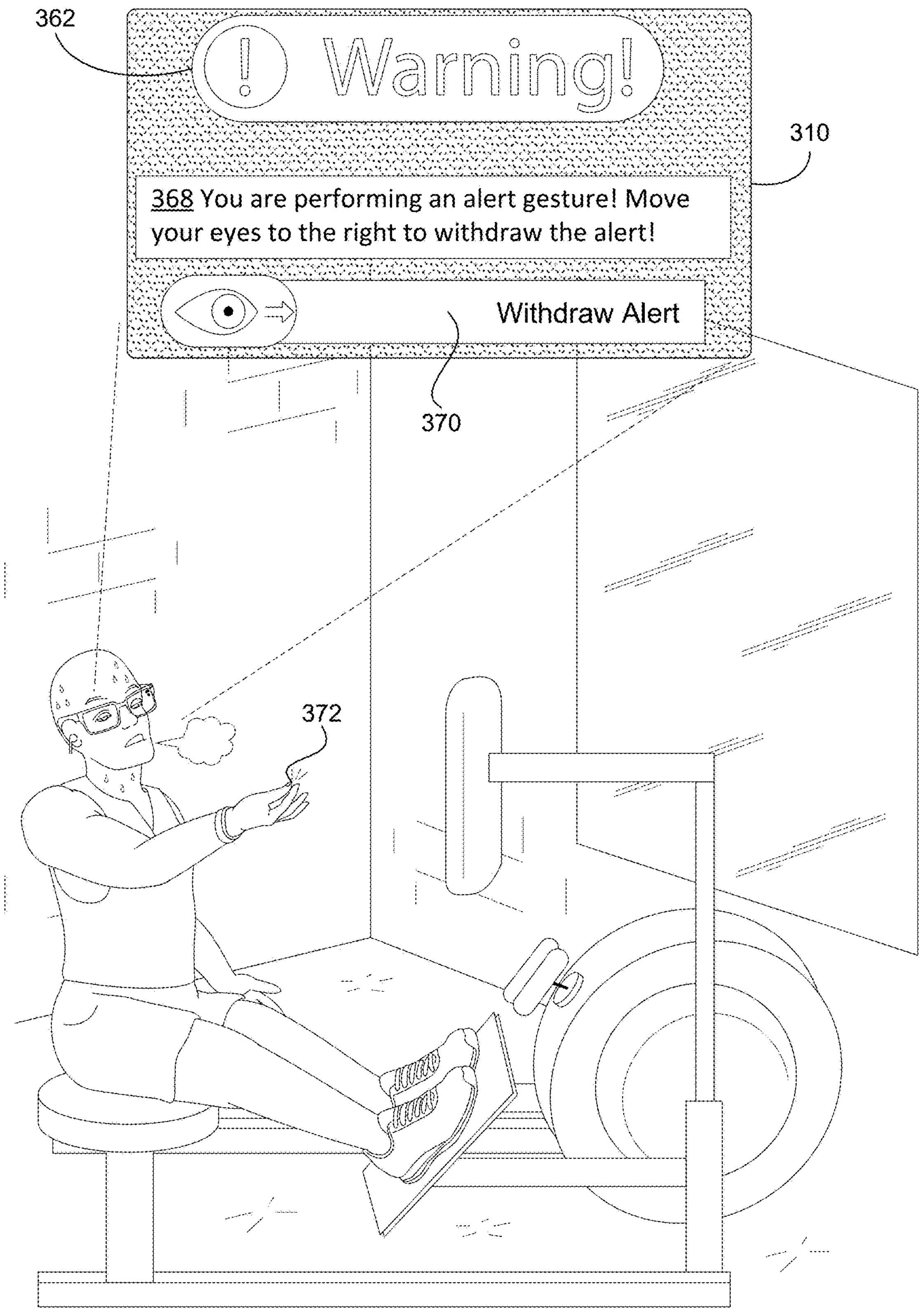

FIG. 3I shows the user 301 performing an alert gesture 372, which causes corresponding alert elements to be presented within the user interface 310. In some embodiments, performing the alert gesture 372 causes a notification to be sent to a remote device with context information. In some embodiments, the context information includes an image captured by the wrist-wearable device 102 or the head-wearable device 304. In some embodiments, the context information includes audio data and/or health data captured by the wrist-wearable device 102 and/or the head-wearable device 304. As an example, a warning element 362 is presented at the user interface 310, and a notification user interface element 368 states: "You are performing an alert gesture! Move your eyes to the right to withdraw the alert!" In some embodiments, once the user performs the alert gesture 372, operations corresponding to the gesture are performed automatically, without further instructions from the user 301. In some embodiments, the user 301 can cause the operations corresponding to the alert gesture 372 to be withdrawn, or otherwise adjusted based on another gesture (e.g., a tracked eye movement). The user interface 310 includes a slidable user interface element 370 that allows the user 301 to withdraw the performance of operations corresponding to the alert gesture 372.

FIGS. 4A-4E illustrate another example user scenario of performing a physical activity while wearing a wearable device. The sequence shown by FIGS. 4A-4E can be performed in conjunction with or in alternative to any of the sequences show in FIGS. 1A-3I.

Figure 4A:
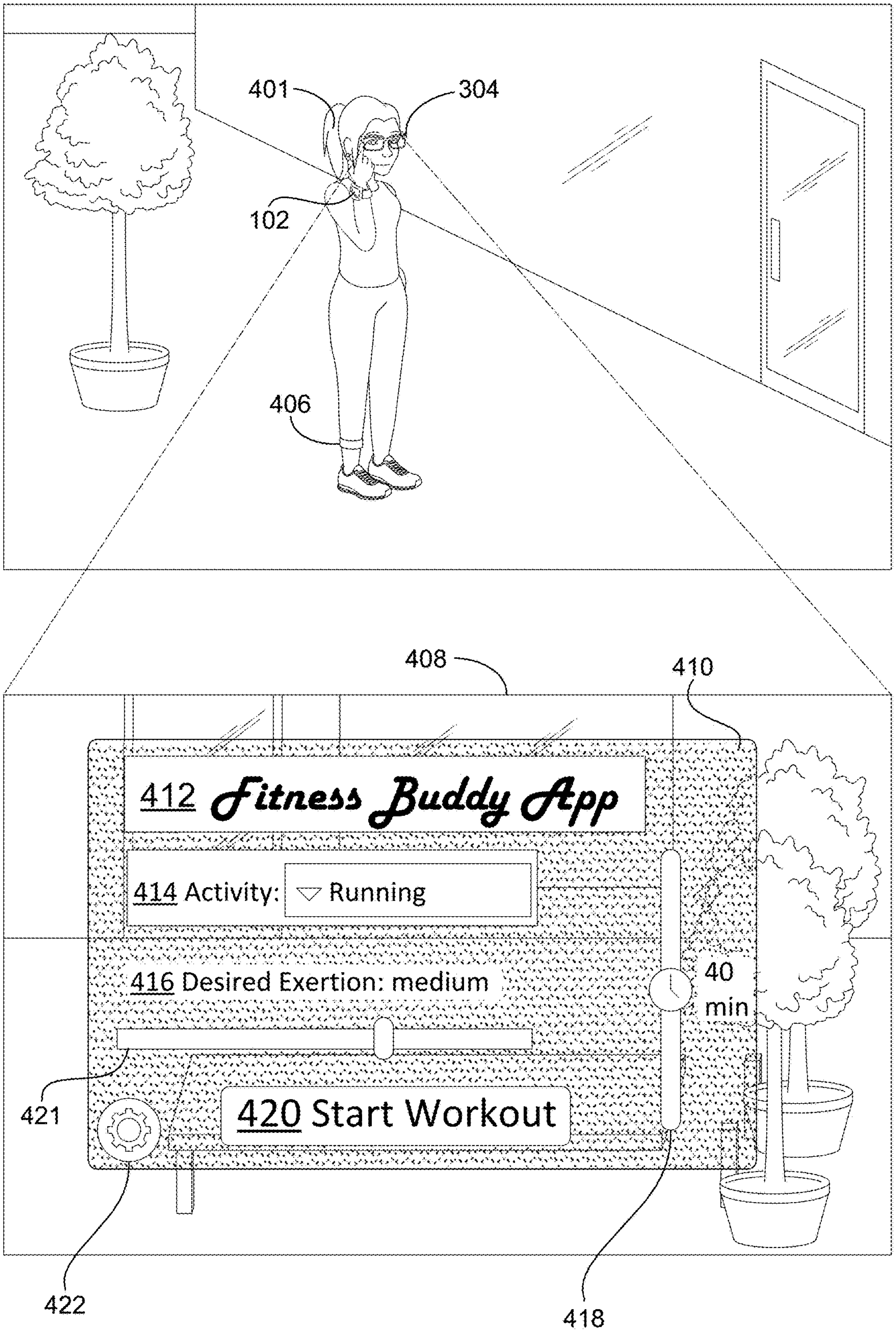
FIGS. 4A-4E illustrate another example user scenario of performing a physical activity while wearing a wearable device in accordance with some embodiments.

FIG. 4A shows a user 401 that is wearing the wrist-wearable device 102 (e.g., a smart watch), the head-wearable device 304, and an ankle-wearable device 406. A field of view 408 of the user 401 shows a user interface 410 being presented to the user 401 (e.g., via the head-wearable device 304), with settings related to performing a physical activity. Specifically, the user interface 410 includes a textual element 412 with an application name "Fitness Buddy App," which corresponds to an application to be used while the user 401 is performing a physical activity. In some embodiments, the user interface 410 is displayed based on actions that the user has performed while wearing the wrist-wearable device 102, the head-wearable device 304, and/or the ankle-wearable device 406. For example, the application can be displayed based on detecting exertion at the ankle-wearable device 406 indicating that the user 401 is performing leg stretches and/or jogging. For example, the user interface 410 can be displayed in accordance with an identification that the user 401 is performing a physical activity (e.g., running). In some embodiments, the user interface 410 is displayed in accordance with a user input (e.g., to initiate a wearable device and/or the fitness application).

The user interface 410 further includes a dropdown user interface element 414 that allows the user 401 to select (e.g., via a gesture detected by the wrist-wearable device 102 and/or the head-wearable device 304) to select the physical activity to be performed. The user interface 410 also includes a selectable exertion-setting element 416 indicating the desired exertion of the user 401 for the physical activity. The user interface 410 further includes a selectable activity time user interface element 418 that the user 401 can use to adjust the duration of the physical activity and a selectable exertion interface element 421 that the user 401 can use to adjust the desired exertion for the physical activity. The user interface 410 further includes a selectable button input 420 that the user 401 can select to initialize the physical activity. In some embodiments, power is increased and/or reduced to one or more sensors of the wrist-wearable device 102, the head-wearable device 304, and/or the ankle-wearable device 406 based on the user 401 selecting the selectable button input 420. The user interface 410 further includes a selectable settings user interface element 422 that the user 401 can select to adjust global settings at one or more of the wearable electronic devices (e.g., that are currently being worn by the user 401). In some embodiments, the user can calibrate one or more sensors based on inputs provided after selecting the selectable settings user interface element 422.

Figure 4B:
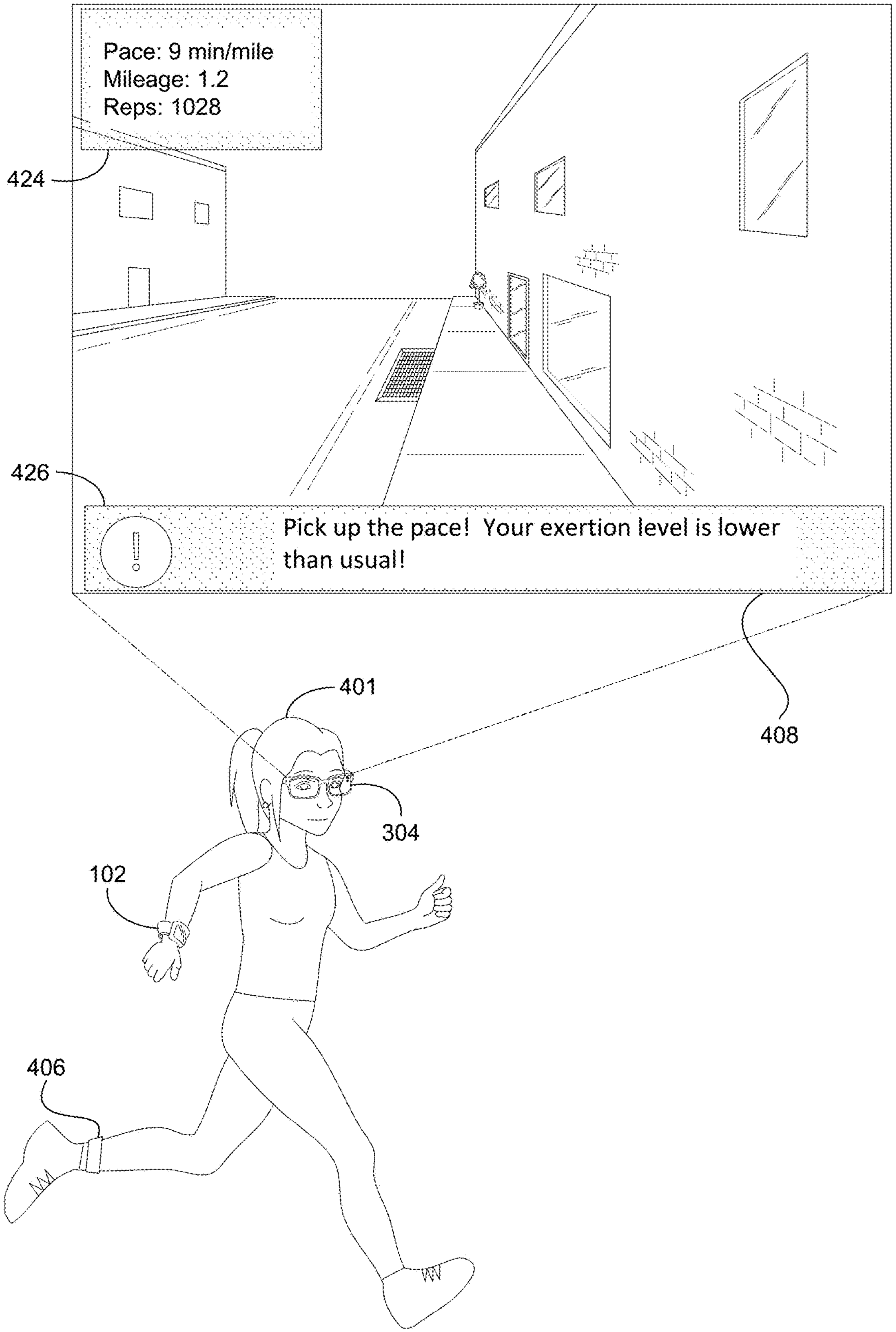

FIG. 4B illustrates the user 401 engaging in a physical activity (running), e.g., after selecting the selectable button input 420 shown in FIG. 4A. A user interface element 424 is presented that indicates aspects related to the performance of the physical activity (e.g., pace, mileage, reps) by the user, and another user interface element 426 indicates a level of exertion of the user in performing the physical activity (e.g., "Pick up the pace! Your exertion level is lower than usual!"), which indicates a comparison between a current level of exertion by the user and a typical level of exertion of the user 401 while the user is performing the physical activity (e.g., exertion detected by one or more neuromuscular-signal sensors).

Figure 4C:
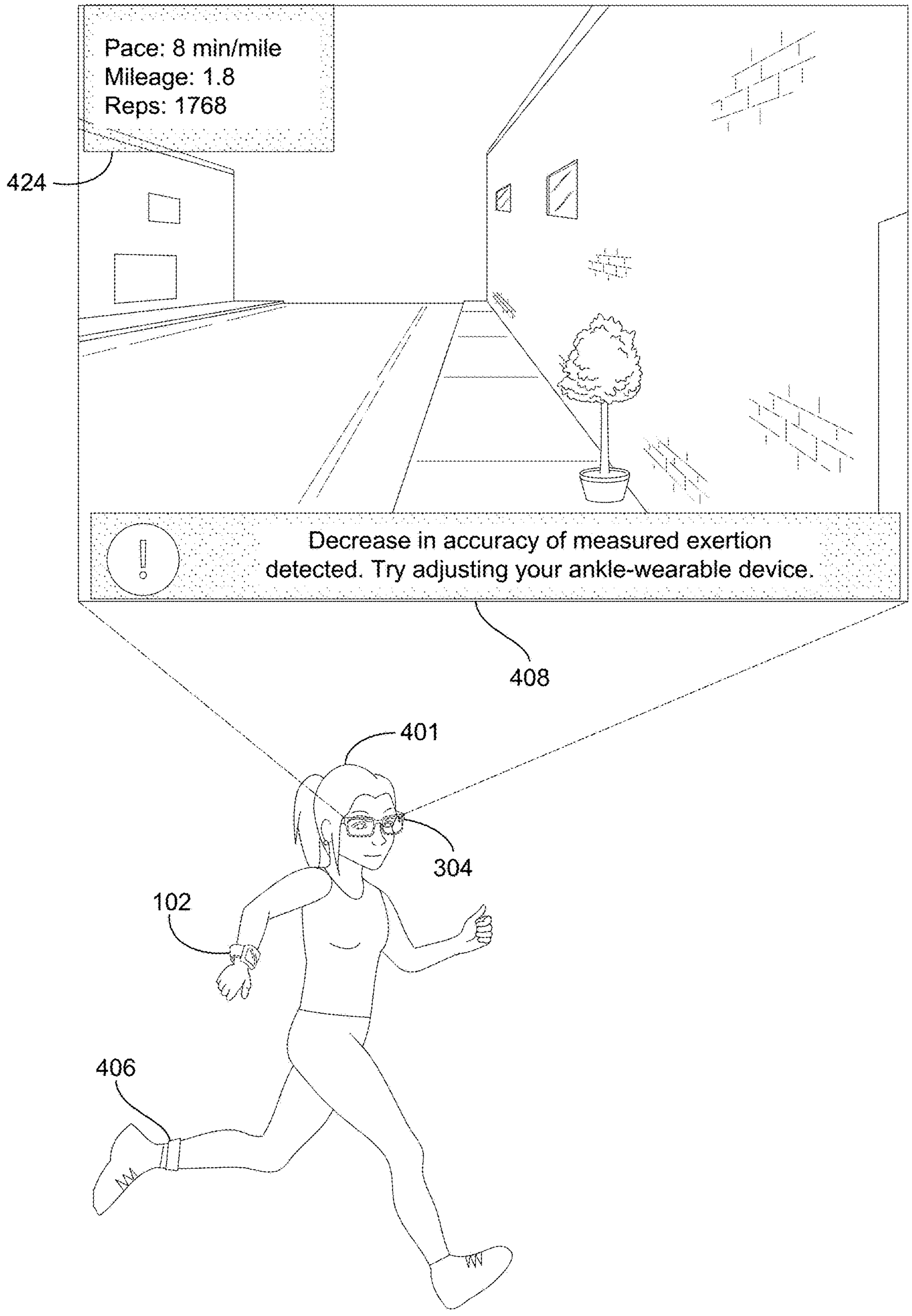

FIG. 4C illustrates the user 401 continuing to engage in the physical activity while user interface elements are being displayed in the field of view 408 of the user 401. For example, the field of view 408 in FIG. 4C includes the user interface element 424, which indicates aspects related to the performance of the physical activity, which can be updated based on data from the ankle-wearable device 406 in conjunction with data from the wrist-wearable device 102.

Figure 4D:
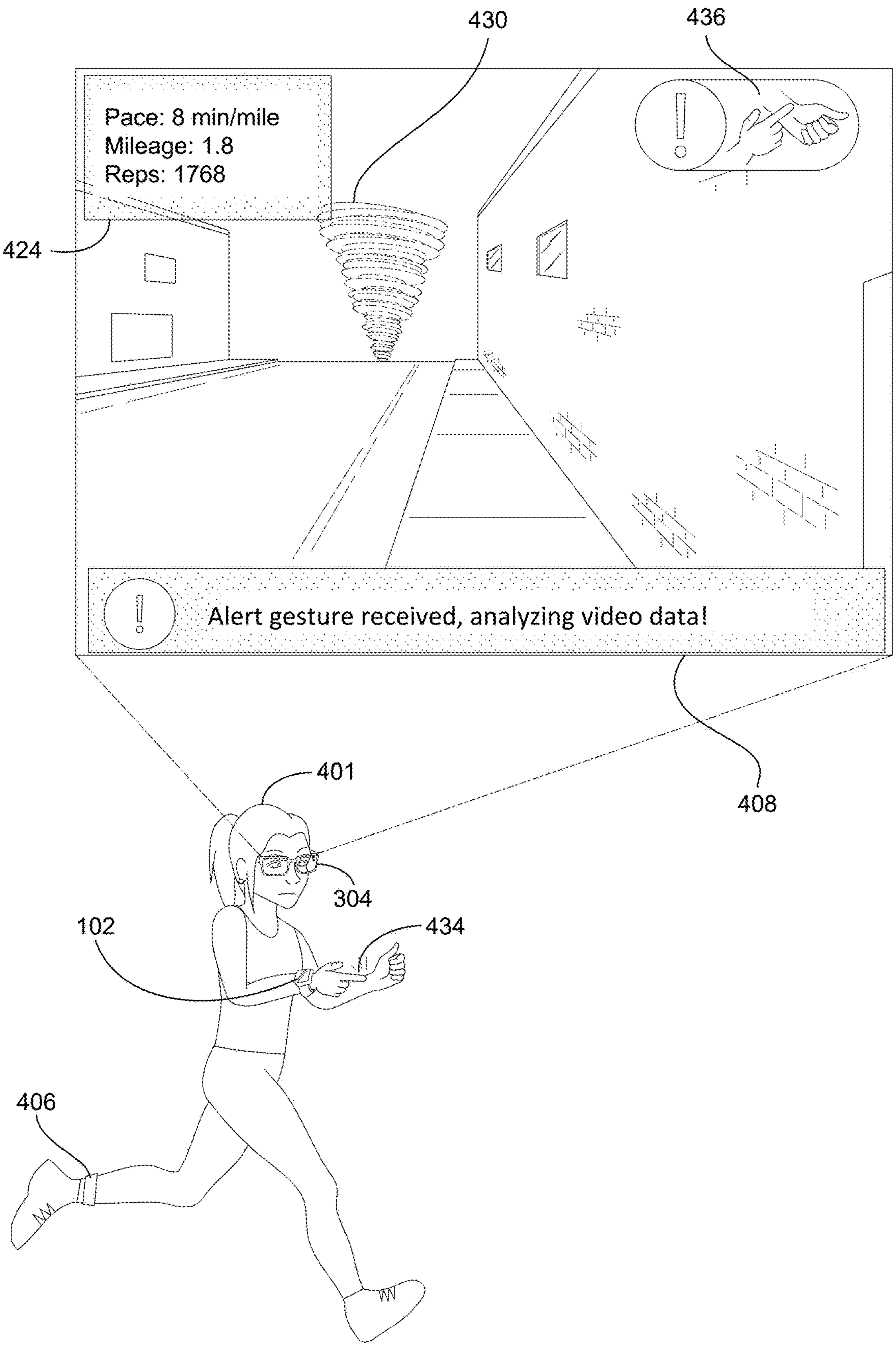

FIG. 4D illustrates the user 401 continuing to engage in the physical activity while user interface elements are being displayed in the field of view 408 of the user 401. While the user interface elements, including the user interface element 424 and the other user interface element 426 are being displayed within the field of view 408 of the user 401, a tornado hazard 430 appears at a visible distance from the user 401. In accordance with some embodiments, the field of view 408 includes a notification 436 indicating how an alert gesture can be performed by the user. In some embodiments, the notification 436 is displayed in response to identification of the tornado hazard 430. The user 401 in FIG. 4D is performing an alert gesture 434, which can be detected by neuromuscular-signal sensors (e.g., EMG sensors) of the wrist-wearable device 102. In some embodiments, in response to detecting the alert gesture 434, the wrist-wearable device 102 sends a notification to a remote device with context information of the user (e.g., location, image data, audio data, and/or health data).

Figure 4E:
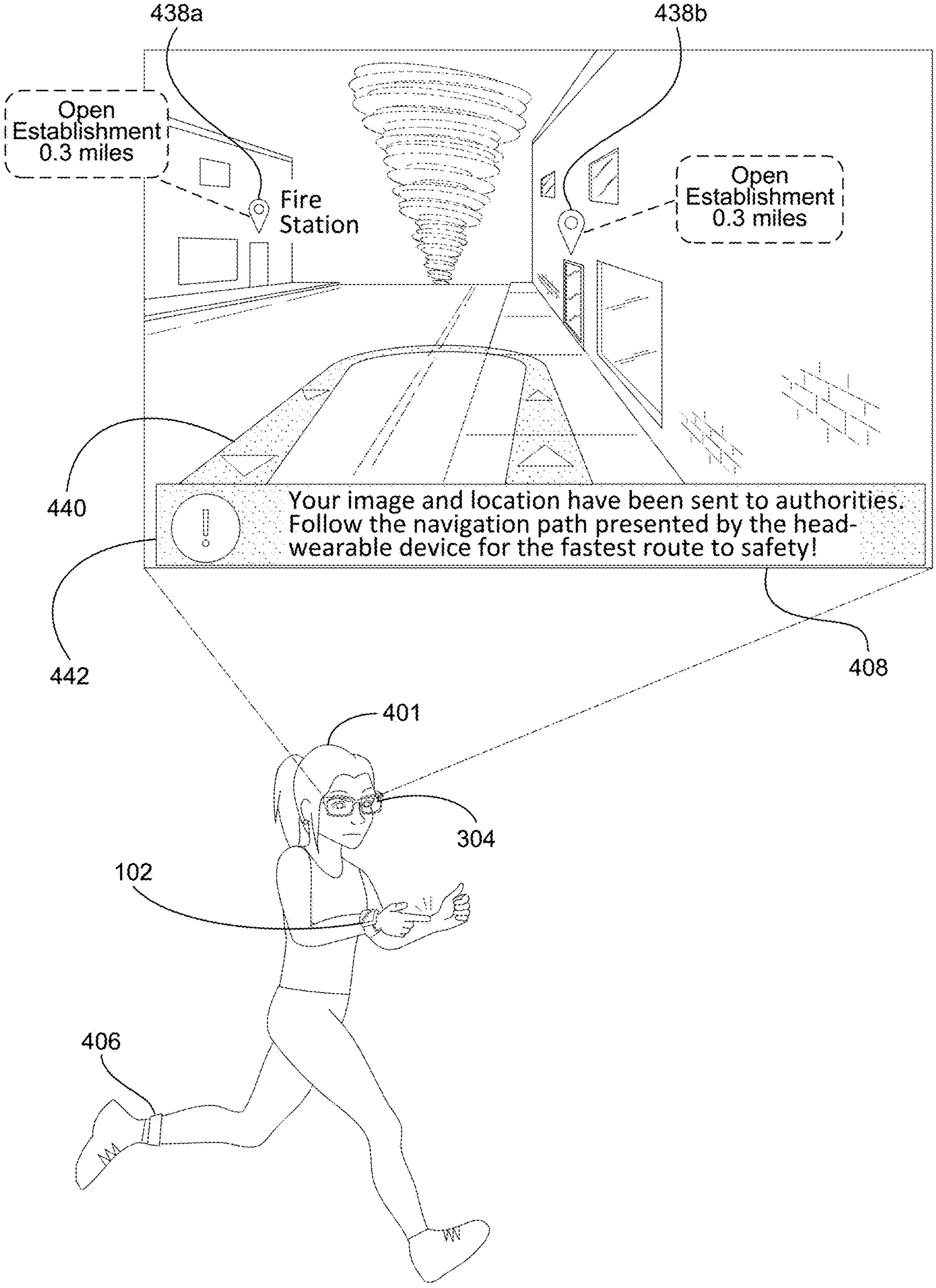

FIG. 4E illustrates updated user interface elements being displayed within the field of view 408 of the user 401 in response to the user 401 performing the alert gesture 434 in FIG. 4D. The field of view of the user includes a user interface element 442 stating: "Your image and location have been sent to the authorities. Follow the navigation path presented by the head-wearable device for the fastest route to safety!" Respective user interface elements 438*a* and 438*b* are also presented indicating respective locations of establishments where the user 401 can potentially go for safety (e.g., locations determined to be shelters from dangerous weather). Based on the user 401 performing the alert gesture 434, a navigational user interface element 440 is displayed so as to appear on the ground in front of the user 401 (e.g., advising the user to turn around). In some embodiments, one or more navigational user interface elements are displayed while the user 401 is performing the physical activity, and the navigational user interface elements are caused to change (e.g., change color, change an animation style) after the user 401 has performed the alert gesture 434 (e.g., to guide the user away from the dangerous situation). In some embodiments, the navigation user interface element 440 has an adjusted physical appearance based on the level of exertion of the user 401 being above an exertion threshold (e.g., an exertion level deemed to be unhealthy for the user).

In some embodiments, the notifications and alerts shown in FIGS. 1A-1M, 2A-2E, 3A-3I, and 4A-4E have one or more of an audio component, a visual component, and a haptic component. For example, the wrist-wearable device displays a notification, generates an audio alert (e.g., a text-to-speech output), and/or vibrates.

Having thus described example sequences and methods of operation that make use of the example sequences, attention will now be directed to system-level depictions of hardware and software on which (or with which) the methods can be implemented.

Example Systems

Figure 5A:
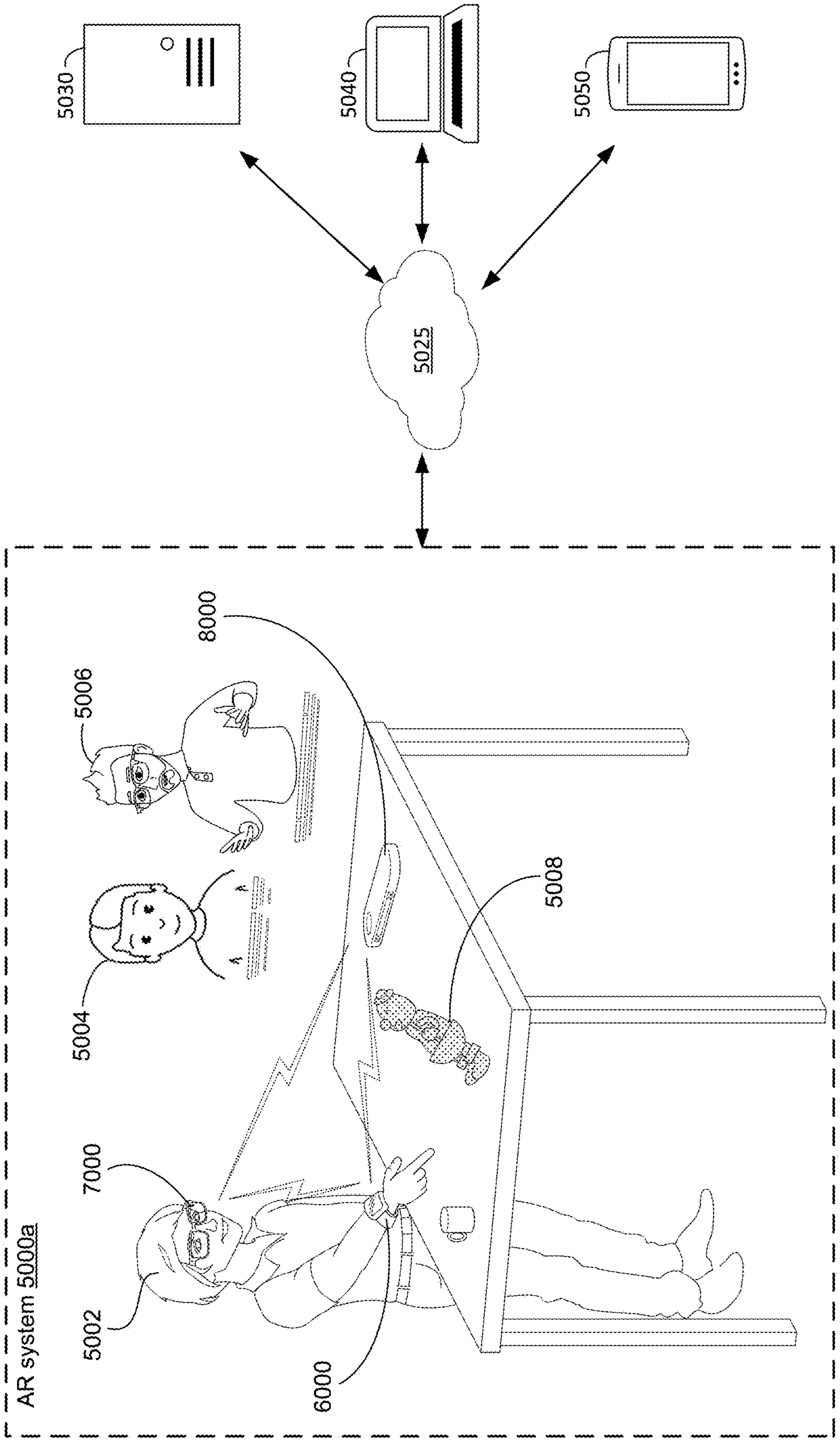
FIGS. 5A, 5B, 5C-1, 5C-2, 5D-1, and 5D-2 illustrate example AR systems in accordance with some embodiments.
Figure 5B:
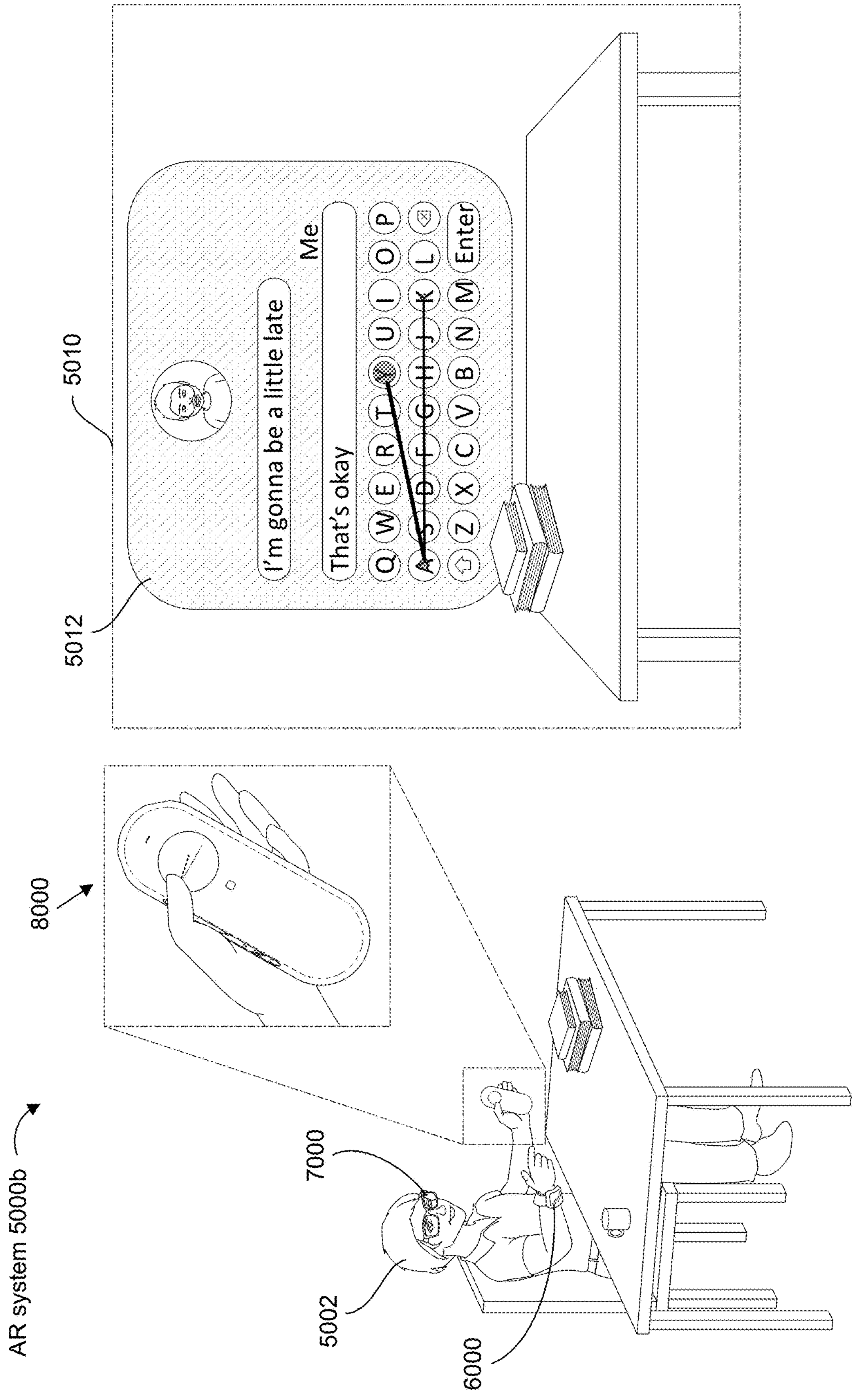
Figures 1, 5C:
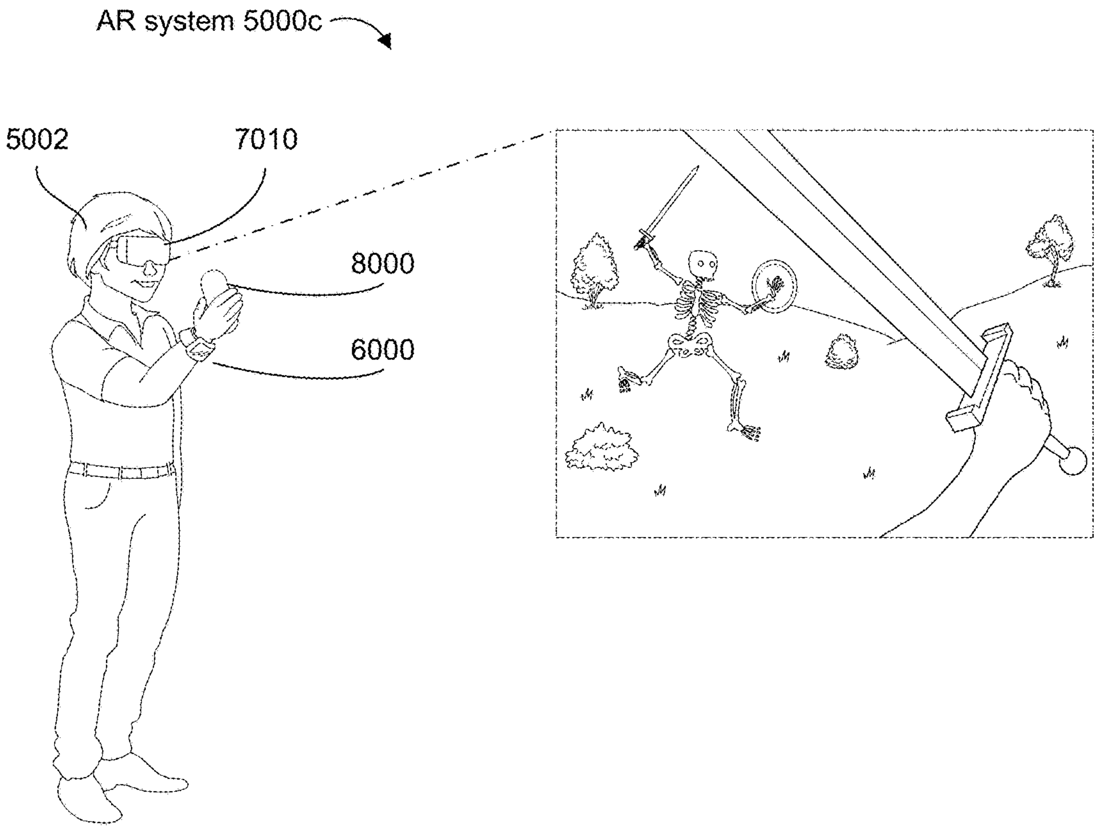
Figures 2, 5C:
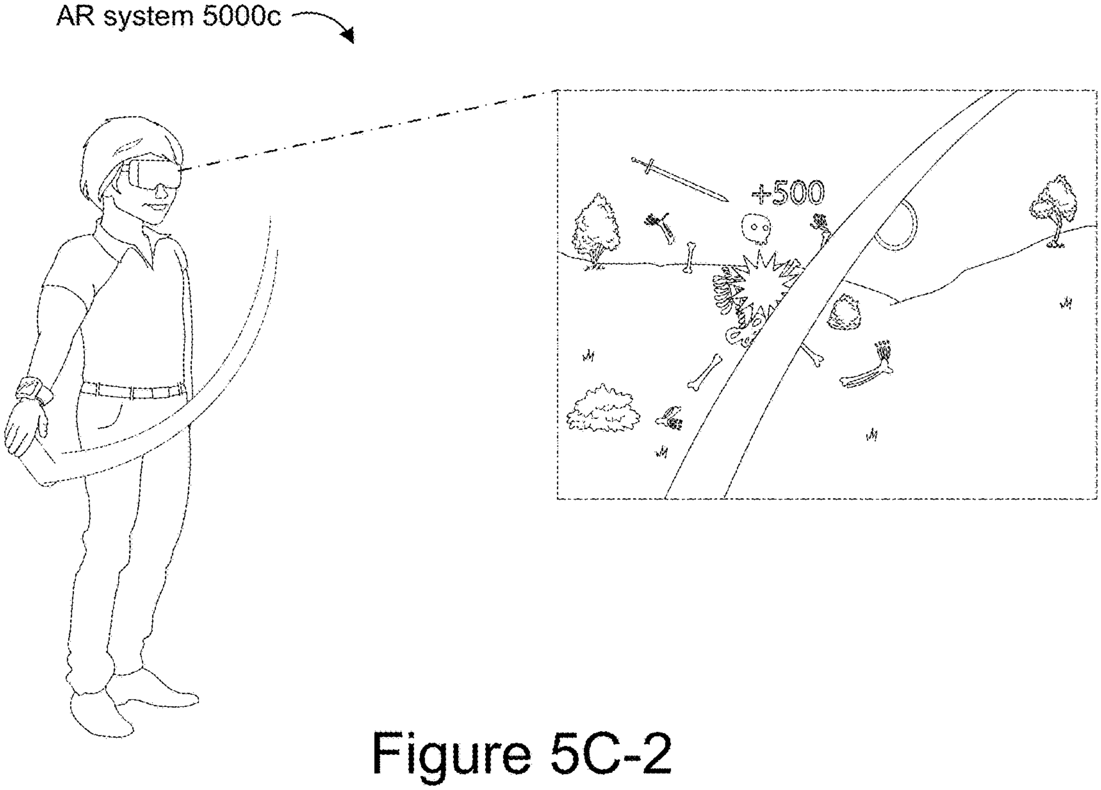
Figures 1, 5D:
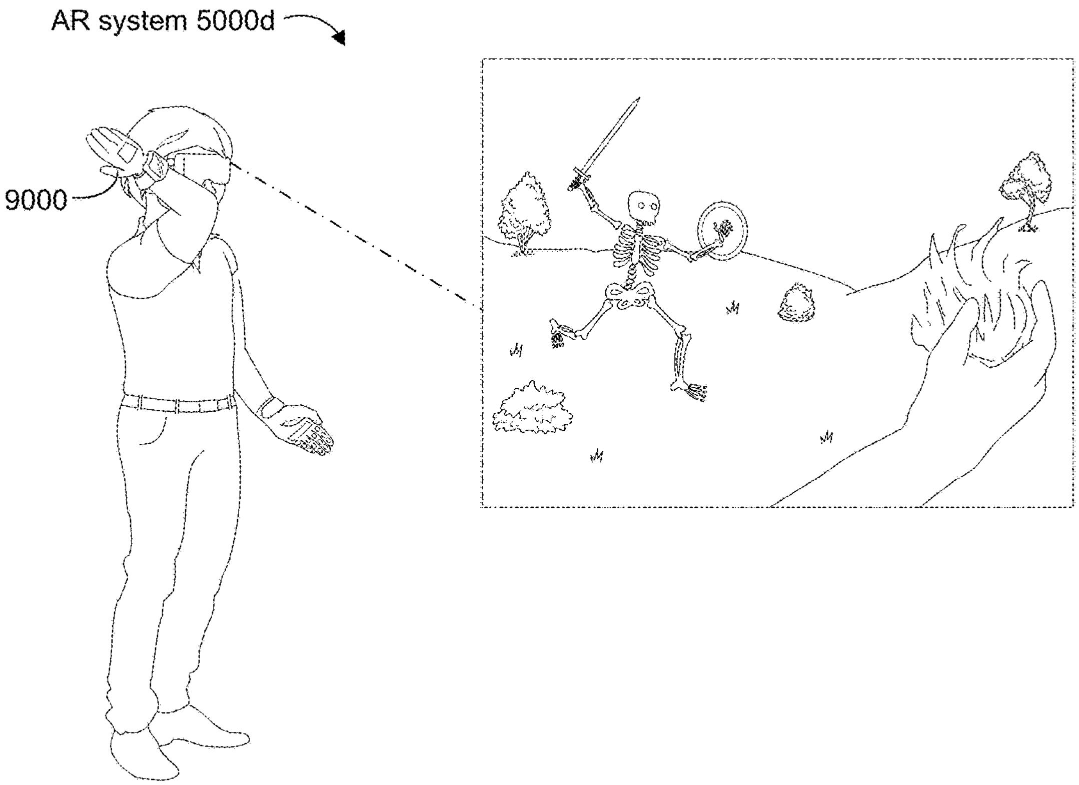
Figures 2, 5D:
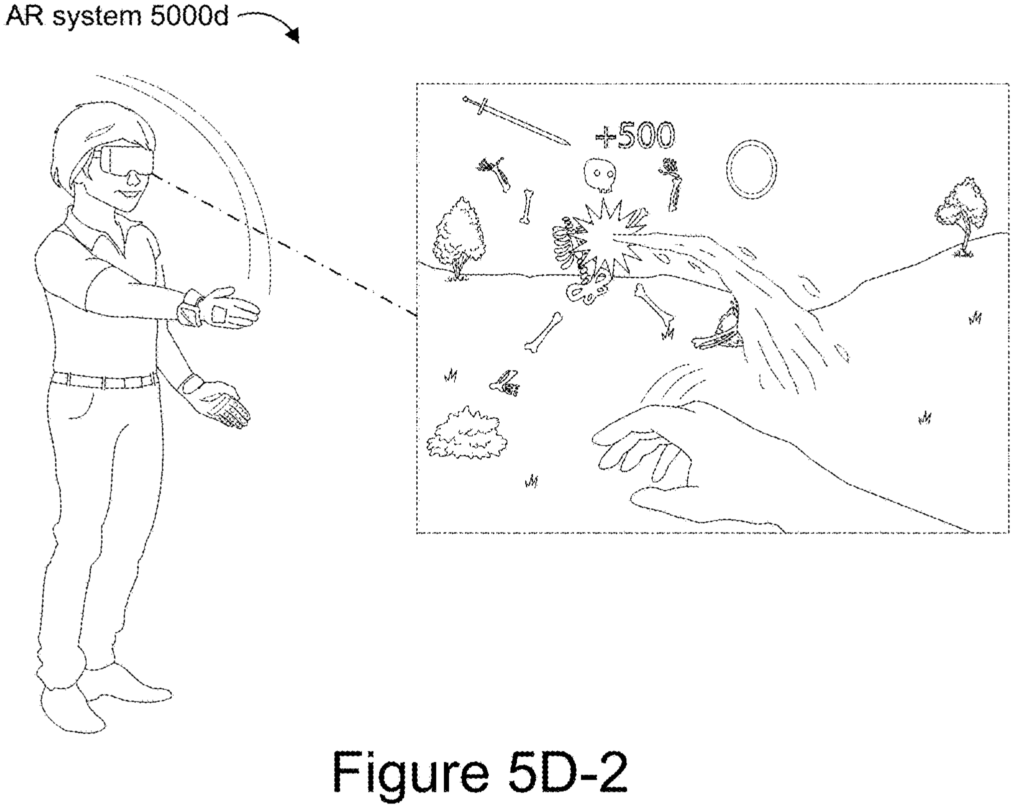

FIGS. 5A, 5B, 5C-1, 5C-2, 5D-1, and 5D-2 illustrate example AR systems in accordance with some embodiments. FIG. 5A shows an AR system 5000*a* and first example user interactions using a wrist-wearable device 6000, a head-wearable device (e.g., AR system 7000), and/or a handheld intermediary processing device (HIPD) 8000. FIG. 5B shows an AR system 5000*b* and second example user interactions using the wrist-wearable device 6000, the AR system 7000, and/or an HIPD 8000. FIGS. 5C-1 and 5C-2 show an AR system 5000*c* and third example user interactions using a wrist-wearable device 6000, a head-wearable device (e.g., virtual-reality (VR) headset 7010), and/or an HIPD 8000. FIGS. 5D-1 and 5D-2 show a fourth AR system 5000*d* and fourth example user interactions using a wrist-wearable device 6000, VR headset 7010, and/or device 9000 (e.g., wearable haptic gloves). The above-example AR systems (described in detail below) can perform the various functions and/or operations described above with reference to FIGS. 1A-4E.

The wrist-wearable device 6000 and its components are described below in reference to FIGS. 6A-6B, the head-wearable devices and their components are described below in reference to FIGS. 7A-7D, and the HIPD 8000 and its components are described below in reference to FIGS. 8A-8B. Wearable gloves and their components are described below in reference to FIGS. 9A-9C. As shown in FIG. 5A, the wrist-wearable device 6000, the head-wearable devices, and/or the HIPD 8000 can communicatively couple via a network 5025 (e.g., cellular, near field, Wi-Fi, personal area network, or wireless LAN). Additionally, the wrist-wearable device 6000, the head-wearable devices, and/or the HIPD 8000 can also communicatively couple with one or more servers 5030, computers 5040 (e.g., laptops, computers), mobile devices 5050 (e.g., smartphones, tablets), and/or other electronic devices via the network 5025 (e.g., cellular, near field, Wi-Fi, personal area network, wireless LAN) Similarly, the device 9000 can also communicatively couple with the wrist-wearable device 6000, the head-wearable devices, the HIPD 8000, the one or more servers 5030, the computers 5040, the mobile devices 5050, and/or other electronic devices via the network 5025.

Turning to FIG. 5A, a user 5002 is shown wearing the wrist-wearable device 6000 and the AR system 7000 and having the HIPD 8000 on their desk. The wrist-wearable device 6000, the AR system 7000, and the HIPD 8000 facilitate user interaction with an AR environment. In particular, as shown by the AR system 5000*a*, the wrist-wearable device 6000, the AR system 7000, and/or the HIPD 8000 cause presentation of one or more avatars 5004, digital representations of contacts 5006, and virtual objects 5008. As discussed below, the user 5002 can interact with the one or more avatars 5004, digital representations of the contacts 5006, and virtual objects 5008 via the wrist-wearable device 6000, the AR system 7000, and/or the HIPD 8000.

The user 5002 can use any of the wrist-wearable device 6000, the AR system 7000, and/or the HIPD 8000 to provide user inputs. For example, the user 5002 can perform one or more hand gestures that are detected by the wrist-wearable device 6000 (e.g., using one or more EMG sensors and/or IMUs, described below in reference to FIGS. 6A-6B) and/or AR system 7000 (e.g., using one or more image sensors or cameras, described below in reference to FIGS. 7A-7B) to provide a user input. Alternatively, or additionally, the user 5002 can provide a user input via one or more touch surfaces of the wrist-wearable device 6000, the AR system 7000, and/or the HIPD 8000, and/or voice commands captured by a microphone of the wrist-wearable device 6000, the AR system 7000, and/or the HIPD 8000. In some embodiments, the wrist-wearable device 6000, the AR system 7000, and/or the HIPD 8000 include a digital assistant to help the user in providing a user input (e.g., completing a sequence of operations, suggesting different operations or commands, providing reminders, or confirming a command). In some embodiments, the user 5002 provides a user input via one or more facial gestures and/or facial expressions. For example, cameras of the wrist-wearable device 6000, the AR system 7000, and/or the HIPD 8000 can track the eyes of the user 5002 for navigating a user interface.

The wrist-wearable device 6000, the AR system 7000, and/or the HIPD 8000 can operate alone or in conjunction to allow the user 5002 to interact with the AR environment. In some embodiments, the HIPD 8000 is configured to operate as a central hub or control center for the wrist-wearable device 6000, the AR system 7000, and/or another communicatively coupled device. For example, the user 5002 can provide an input to interact with the AR environment at any of the wrist-wearable device 6000, the AR system 7000, and/or the HIPD 8000, and the HIPD 8000 can identify one or more back-end and front-end tasks to cause the performance of the requested interaction and distribute instructions to cause the performance of the one or more back-end and front-end tasks at the wrist-wearable device 6000, the AR system 7000, and/or the HIPD 8000. In some embodiments, a back-end task is a background-processing task that is not perceptible by the user (e.g., rendering content, decompression, or compression), and a front-end task is a user-facing task that is perceptible to the user (e.g., presenting information to the user or providing feedback to the user). As described below in reference to FIGS. 8A-8B, the HIPD 8000 can perform the back-end tasks and provide the wrist-wearable device 6000 and/or the AR system 7000 operational data corresponding to the performed back-end tasks such that the wrist-wearable device 6000 and/or the AR system 7000 can perform the front-end tasks. In this way, the HIPD 8000, which can have more computational resources and greater thermal headroom than the wrist-wearable device 6000 and/or the AR system 7000, performs computationally intensive tasks and reduces the computer resource utilization and/or power usage of the wrist-wearable device 6000 and/or the AR system 7000.

In the example shown by the AR system 5000*a*, the HIPD 8000 identifies one or more back-end tasks and front-end tasks associated with a user request to initiate an AR video call with one or more other users (represented by the avatar 5004 and the digital representation of the contact 5006) and distributes instructions to cause the performance of the one or more back-end tasks and front-end tasks. In particular, the HIPD 8000 performs back-end tasks for processing and/or rendering image data (and other data) associated with the AR video call and provides operational data associated with the performed back-end tasks to the AR system 7000 such that the AR system 7000 performs front-end tasks for presenting the AR video call (e.g., presenting the avatar 5004 and the digital representation of the contact 5006).

In some embodiments, the HIPD 8000 operates as a focal or anchor point for causing the presentation of information. This allows the user 5002 to be generally aware of where information is presented. For example, as shown in the AR system 5000*a*, the avatar 5004 and the digital representation of the contact 5006 are presented above the HIPD 8000. In particular, the HIPD 8000 and the AR system 7000 operate in conjunction to determine a location for presenting the avatar 5004 and the digital representation of the contact 5006. In some embodiments, information can be presented within a predetermined distance from the HIPD 8000 (e.g., within five meters). For example, as shown in the AR system 5000*a*, virtual object 5008 is presented on the desk some distance from the HIPD 8000. Similar to the above example, the HIPD 8000 and the AR system 7000 can operate in conjunction to determine a location for presenting the virtual object 5008. Alternatively, in some embodiments, presentation of information is not bound by the HIPD 8000. More specifically, the avatar 5004, the digital representation of the contact 5006, and the virtual object 5008 do not have to be presented within a predetermined distance of the HIPD 8000.

User inputs provided at the wrist-wearable device 6000, the AR system 7000, and/or the HIPD 8000 are coordinated such that the user can use any device to initiate, continue, and/or complete an operation. For example, the user 5002 can provide a user input to the AR system 7000 to cause the AR system 7000 to present the virtual object 5008 and, while the virtual object 5008 is presented by the AR system 7000, the user 5002 can provide one or more hand gestures via the wrist-wearable device 6000 to interact and/or manipulate the virtual object 5008.

FIG. 5B shows the user 5002 wearing the wrist-wearable device 6000 and the AR system 7000 and holding the HIPD 8000. In the AR system 5000*b*, the wrist-wearable device 6000, the AR system 7000, and/or the HIPD 8000 are used to receive and/or provide one or more messages to a contact of the user 5002. In particular, the wrist-wearable device 6000, the AR system 7000, and/or the HIPD 8000 detect and coordinate one or more user inputs to initiate a messaging application and prepare a response to a received message via the messaging application.

In some embodiments, the user 5002 initiates, via a user input, an application on the wrist-wearable device 6000, the AR system 7000, and/or the HIPD 8000 that causes the application to initiate on at least one device. For example, in the AR system 5000*b* the user 5002 performs a hand gesture associated with a command for initiating a messaging application (represented by messaging user interface 5012); the wrist-wearable device 6000 detects the hand gesture; and, based on a determination that the user 5002 is wearing AR system 7000, causes the AR system 7000 to present a messaging user interface 5012 of the messaging application. The AR system 7000 can present the messaging user interface 5012 to the user 5002 via its display (e.g., as shown by the field of view 5010 of the user 5002). In some embodiments, the application is initiated and can be run on the device (e.g., the wrist-wearable device 6000, the AR system 7000, and/or the HIPD 8000) that detects the user input to initiate the application, and the device provides another device operational data to cause the presentation of the messaging application. For example, the wrist-wearable device 6000 can detect the user input to initiate a messaging application, initiate and run the messaging application, and provide operational data to the AR system 7000 and/or the HIPD 8000 to cause presentation of the messaging application. Alternatively, the application can be initiated and run at a device other than the device that detected the user input. For example, the wrist-wearable device 6000 can detect the hand gesture associated with initiating the messaging application and cause the HIPD 8000 to run the messaging application and coordinate the presentation of the messaging application.

Further, the user 5002 can provide a user input provided at the wrist-wearable device 6000, the AR system 7000, and/or the HIPD 8000 to continue and/or complete an operation initiated at another device. For example, after initiating the messaging application via the wrist-wearable device 6000 and while the AR system 7000 presents the messaging user interface 5012, the user 5002 can provide an input at the HIPD 8000 to prepare a response (e.g., shown by the swipe gesture performed on the HIPD 8000). The user 5002's gestures performed on the HIPD 8000 can be provided and/or displayed on another device. For example, the user 5002's swipe gestures performed on the HIPD 8000 are displayed on a virtual keyboard of the messaging user interface 5012 displayed by the AR system 7000.

In some embodiments, the wrist-wearable device 6000, the AR system 7000, the HIPD 8000, and/or other communicatively coupled devices present one or more notifications to the user 5002. The notification can be an indication of a new message, an incoming call, an application update, or a status update. The user 5002 can select the notification via the wrist-wearable device 6000, the AR system 7000, or the HIPD 8000 and cause presentation of an application or operation associated with the notification on at least one device. For example, the user 5002 can receive a notification that a message was received at the wrist-wearable device 6000, the AR system 7000, the HIPD 8000, and/or other communicatively coupled devices and provide a user input at the wrist-wearable device 6000, the AR system 7000, and/or the HIPD 8000 to review the notification, and the device detecting the user input can cause an application associated with the notification to be initiated and/or presented at the wrist-wearable device 6000, the AR system 7000, and/or the HIPD 8000.

While the above example describes coordinated inputs used to interact with a messaging application, the skilled artisan will appreciate upon reading the descriptions that user inputs can be coordinated to interact with any number of applications including, but not limited to, gaming applications, social media applications, camera applications, web-based applications, and financial applications. For example, the AR system 7000 can present to the user 5002 game application data and the HIPD 8000 can use a controller to provide inputs to the game. Similarly, the user 5002 can use the wrist-wearable device 6000 to initiate a camera of the AR system 7000, and the user can use the wrist-wearable device 6000, the AR system 7000, and/or the HIPD 8000 to manipulate the image capture (e.g., zoom in or out, apply filters) and capture image data.

Having discussed example AR systems, devices for interacting with such AR systems, and other computing systems more generally, example devices for use in such AR systems and other computing systems will now be discussed in greater detail below. Some definitions of devices and components that can be included in some or all of the example devices discussed below are defined here for ease of reference. A skilled artisan will appreciate that certain types of the components described below may be more suitable for a particular set of devices, and less suitable for a different set of devices. But subsequent reference to the components defined here should be considered to be encompassed by the definitions provided.

In some embodiments discussed below example devices and systems, including electronic devices and systems, will be discussed. Such example devices and systems are not intended to be limiting, and one of skill in the art will understand that alternative devices and systems to the example devices and systems described herein may be used to perform the operations and construct the systems and devices that are described herein.

As described herein, an electronic device is a device that uses electrical energy to perform one or more functions. It can be any physical object that contains electronic components such as transistors, resistors, capacitors, diodes, and integrated circuits. Examples of electronic devices include smartphones, laptops, digital cameras, televisions, gaming consoles, and music players, as well as the example electronic devices discussed herein. As described herein, an intermediary electronic device is a device that sits between two other electronic devices, and/or a subset of components of one or more electronic devices and facilitates communication, and/or data processing and/or data transfer between the respective electronic devices and/or electronic components.

As described herein, a processor (e.g., a central processing unit (CPU)), is an electronic component that is responsible for executing instructions and controlling the operation of an electronic device (e.g., a computer). There are various types of processors that may be used interchangeably, or may be specifically required, by embodiments described herein. For example, a processor may be (i) a general processor designed to perform a wide range of tasks, such as running software applications, managing operating systems, and performing arithmetic and logical operations; (ii) a microcontroller designed for specific tasks such as controlling electronic devices, sensors, and motors; (iii) a graphics-processing unit (GPU) designed to accelerate the creation and rendering of images, videos, and animations (e.g., virtual-reality animations, such as three-dimensional modeling); (iv) a field-programmable gate array that can be programmed and reconfigured after manufacturing, and/or can be customized to perform specific tasks, such as signal processing, cryptography, and machine learning; or (v) a digital signal processor (DSP) designed to perform mathematical operations on signals such as audio, video, and radio waves. One of skill in the art will understand that one or more processors of one or more electronic devices may be used in various embodiments described herein.

As described herein, memory refers to electronic components in a computer or electronic device that stores data and instructions for the processor to access and manipulate. Examples of memory can include (i) random access memory configured to store data and instructions temporarily; (ii) read-only memory configured to store data and instructions permanently (e.g., one or more portions of system firmware, and/or boot loaders); (iii) flash memory, which can be configured to store data in electronic devices (e.g., USB drives, memory cards, and/or solid-state drives; and (iv) cache memory configured to temporarily store frequently accessed data and instructions). Memory, as described herein, can include structured data (e.g., SQL databases, MongoDB databases, GraphQL data, and/or JSON data). Other examples of memory can include (i) profile data, including user account data, user settings, and/or other user data stored by the user; (ii) sensor data detected and/or otherwise obtained by one or more sensors; (iii) media content data including stored image data, audio data, documents, and the like; (iv) application data, which can include data collected and/or otherwise obtained and stored during use of an application; and/or any other types of data described herein.

As described herein, controllers are electronic components that manage and coordinate the operation of other components within an electronic device (e.g., controlling inputs, processing data, and/or generating outputs). Examples of controllers can include (i) microcontrollers, including small, low-power controllers that are commonly used in embedded systems and Internet of Things (IoT) devices; (ii) programmable logic controllers, which may be configured to be used in industrial automation systems to control and monitor manufacturing processes; (iii) system-on-a-chip (SoC) controllers that integrate multiple components such as processors, memory, I/O interfaces, and other peripherals into a single chip; and/or DSPs.

As described herein, a power system of an electronic device is configured to convert incoming electrical power into a form that can be used to operate the device. A power system can include various components, including (i) a power source, which can be an alternating current adapter or a direct current adapter power supply; (ii) a charger input that can be configured to use a wired and/or wireless connection (which may be part of a peripheral interface, such as a USB, micro-USB interface, near-field magnetic coupling, magnetic inductive and magnetic resonance charging, and/or radio frequency (RF) charging); (iii) a power-management integrated circuit, configured to distribute power to various components of the device and to ensure that the device operates within safe limits (e.g., regulating voltage, controlling current flow, and/or managing heat dissipation); and/or (iv) a battery configured to store power to provide usable power to components of one or more electronic devices.

As described herein, peripheral interfaces are electronic components (e.g., of electronic devices) that allow electronic devices to communicate with other devices or peripherals and can provide a means for input and output of data and signals. Examples of peripheral interfaces can include (i) universal serial bus (USB) and/or micro-USB interfaces configured for connecting devices to an electronic device; (ii) Bluetooth interfaces configured to allow devices to communicate with each other, including Bluetooth low energy (BLE); (iii) near-field communication (NFC) interfaces configured to be short-range wireless interface for operations such as access control; (iv) POGO pins, which may be small, spring-loaded pins configured to provide a charging interface; (v) wireless charging interfaces; (vi) GPS interfaces; (vii) Wi-Fi interfaces for providing a connection between a device and a wireless network; and (viii) sensor interfaces.

As described herein, sensors are electronic components, which may be physically coupled with and/or otherwise in electronic communication with electronic devices, such as wearable devices) configured to detect physical and environmental changes and generate electrical signals. Examples of sensors can includer (i) imaging sensors for collecting imaging data (e.g., including one or more cameras disposed on a respective electronic device); (ii) biopotential-signal sensors; (iii) inertial measurement unit (e.g., IMUs) for detecting, for example, angular rate, force, magnetic field, and/or changes in acceleration; (iv) heart-rate sensors for measuring a user's heart rate; (v) SpO2 sensors for measuring blood oxygen saturation and/or other biometric data of a user; and (vi) capacitive sensors for detecting changes in potential at a portion of a user's body (e.g., a sensor-skin interface); light sensors (e.g., time-of-flight sensors, infrared light sensors, visible light sensors). As described herein biopotential-signal-sensing components are devices used to measure electrical activity within the body (e.g., biopotential-signal sensors). Some types of biopotential-signal sensors include (i) electroencephalography sensors configured to measure electrical activity in the brain to diagnose neurological disorders; (ii) electrocardiography (ECG or EKG) sensors configured to measure electrical activity of the heart to diagnose heart problems; (iii) EMG sensors configured to measure the electrical activity of muscles and to diagnose neuromuscular disorders; (iv) electrooculography sensors configured to measure the electrical activity of eye muscles to detect eye movement and diagnose eye disorders.

As described herein, an application stored in memory of an electronic device (e.g., software) includes instructions stored in the memory. Examples of such applications include (i) games; (ii) word processors; messaging applications; media-streaming applications; financial applications; calendars; clocks; communication interface modules for enabling wired and/or wireless connections between different respective electronic devices (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocols.

As described herein, a communication interface is a mechanism that enables different systems or devices to exchange information and data with each other, including hardware, software, or a combination of both hardware and software. For example, a communication interface can refer to a physical connector and/or port on a device that enables communication with other devices (e.g., USB, Ethernet, HDMI, Bluetooth). In some embodiments, a communication interface can refer to a software layer that enables different software programs to communicate with each other (e.g., application programming interfaces and/or protocols such as HTTP and TCP/IP).

As described herein, a graphics module is a component or software module that is designed to handle graphical operations and/or processes and can include a hardware module and/or a software module.

As described herein, non-transitory computer-readable storage media are physical devices or storage medium that can be used to store electronic data in a non-transitory form (e.g., such that the data is stored permanently until it is intentionally deleted or modified).

Example Wrist-Wearable Devices

Figure 6A:
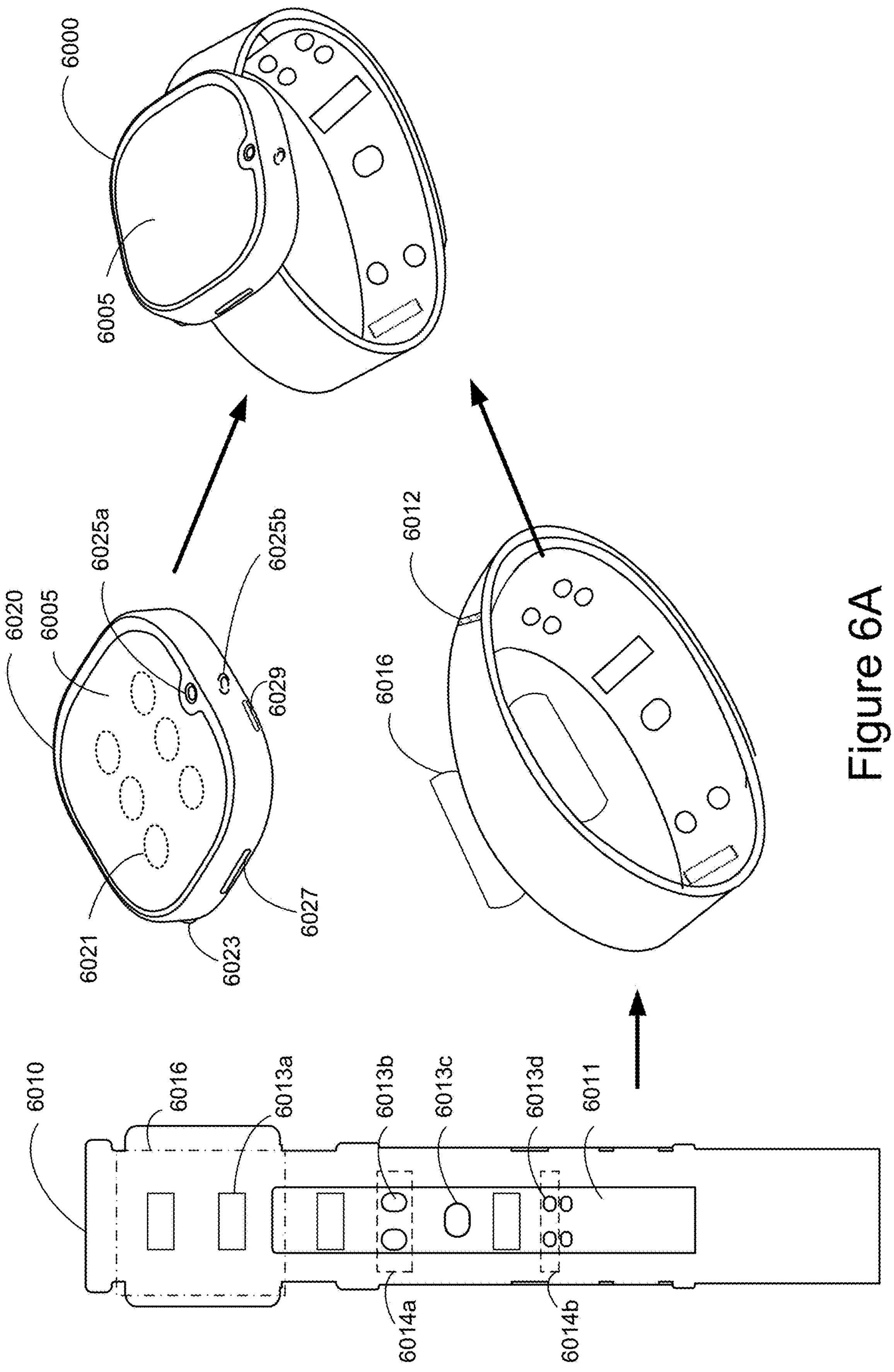
FIGS. 6A-6B illustrate an example wrist-wearable device in accordance with some embodiments.
Figure 6B:
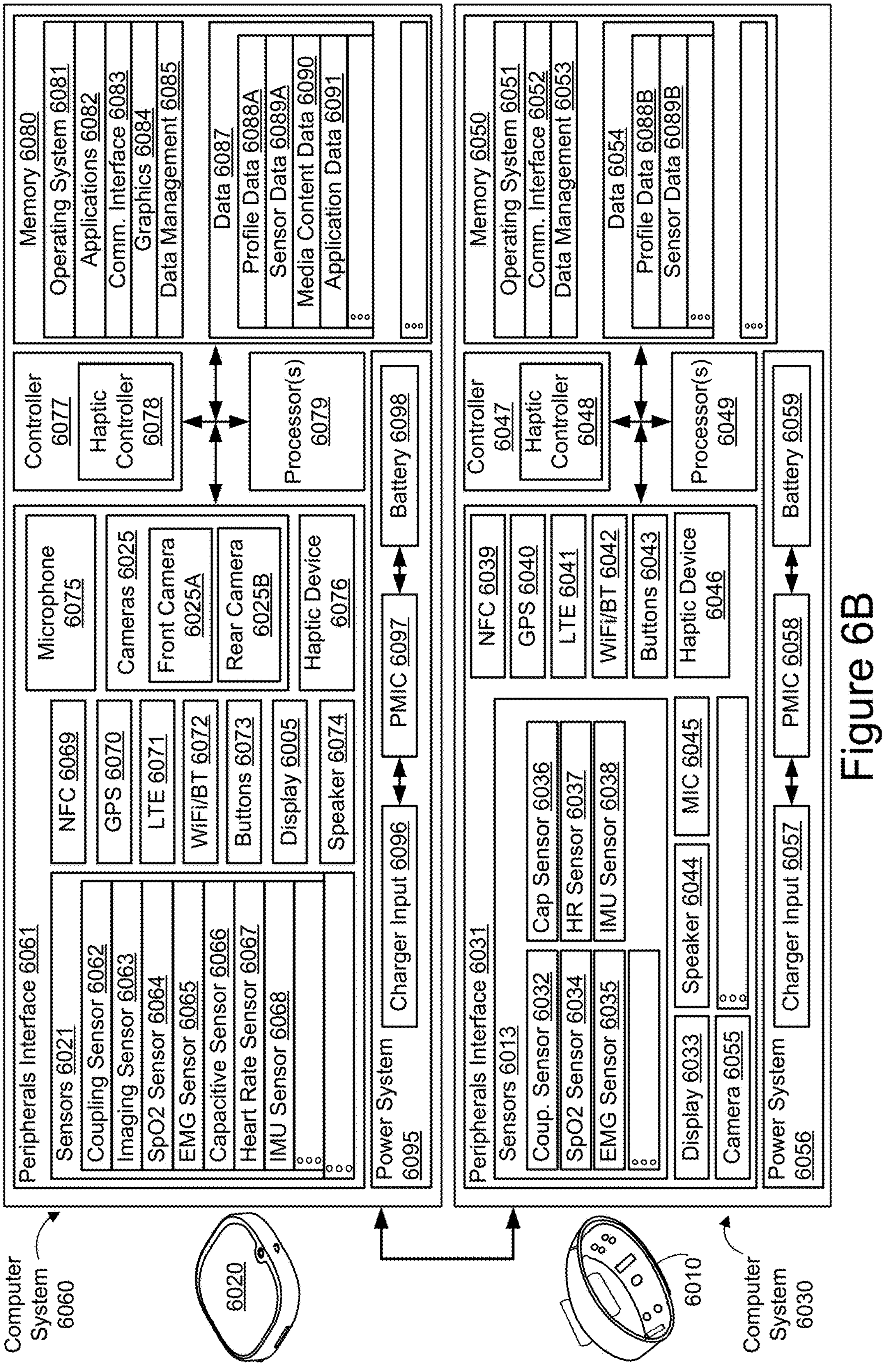

FIGS. 6A and 6B illustrate the wrist-wearable device 6000 in accordance with some embodiments. FIG. 6A illustrates components of the wrist-wearable device 6000, which can be used individually or in combination, including combinations that include other electronic devices and/or electronic components.

FIG. 6A shows a wearable band 6010 and a watch body 6020 (or capsule) being coupled, as discussed below, to form the wrist-wearable device 6000. The wrist-wearable device 6000 can perform various functions and/or operations associated with navigating through user interfaces and selectively opening applications, as well as the functions and/or operations described above with reference to FIGS. 1A-4E.

As will be described in more detail below, operations executed by the wrist-wearable device 6000 can include (i) presenting content to a user (e.g., displaying visual content via a display 6005); (ii) detecting (e.g., sensing) user input (e.g., sensing a touch on peripheral button 6023 and/or at a touch screen of the display 6005, a hand gesture detected by sensors (e.g., biopotential sensors)); (iii) sensing biometric data via one or more sensors 6013 (e.g., neuromuscular signals, heart rate, temperature, and/or sleep); messaging (e.g., text, speech, and/or video); image capture via one or more imaging devices or cameras 6025; wireless communications (e.g., cellular, near field, Wi-Fi, and/or personal area network); location determination; financial transactions; providing haptic feedback; alarms; notifications; biometric authentication; health monitoring; sleep monitoring; and the like.

The above-example functions can be executed independently in the watch body 6020, independently in the wearable band 6010, and/or via an electronic communication between the watch body 6020 and the wearable band 6010. In some embodiments, functions can be executed on the wrist-wearable device 6000 while an AR environment is being presented (e.g., via one of the AR systems 5000*a* to 5000*d*). As the skilled artisan will appreciate upon reading the descriptions provided herein, the novel wearable devices described herein can be used with other types of AR environments.

The wearable band 6010 can be configured to be worn by a user such that an inner surface of the wearable band 6010 is in contact with the user's skin. When worn by a user, sensors 6013 contact the user's skin. The sensors 6013 can sense biometric data such as a user's heart rate, saturated oxygen level, temperature, sweat level, neuromuscular signal sensors, or a combination thereof. The sensors 6013 can also sense data about a user's environment, including a user's motion, altitude, location, orientation, gait, acceleration, position, or a combination thereof. In some embodiments, the sensors 6013 are configured to track a position and/or motion of the wearable band 6010. The one or more sensors 6013 can include any of the sensors defined above and/or discussed below with respect to FIG. 6B.

The one or more sensors 6013 can be distributed on an inside and/or an outside surface of the wearable band 6010. In some embodiments, the one or more sensors 6013 are uniformly spaced along the wearable band 6010. Alternatively, in some embodiments, the one or more sensors 6013 are positioned at distinct points along the wearable band 6010. As shown in FIG. 6A, the one or more sensors 6013 can be the same or distinct. For example, in some embodiments, the one or more sensors 6013 can be shaped as a pill (e.g., sensor 6013*a*), an oval, a circle a square, an oblong (e.g., sensor 6013*c*) and/or any other shape that maintains contact with the user's skin (e.g., such that neuromuscular signal and/or other biometric data can be accurately measured at the user's skin). In some embodiments, the one or more sensors 6013 are aligned to form pairs of sensors (e.g., for sensing neuromuscular signals based on differential sensing within each respective sensor). For example, sensor 6013*b* is aligned with an adjacent sensor to form sensor pair 6014*a* and sensor 6013*d* is aligned with an adjacent sensor to form sensor pair 6014*b*. In some embodiments, the wearable band 6010 does not have a sensor pair. Alternatively, in some embodiments, the wearable band 6010 has a predetermined number of sensor pairs (e.g., one pair of sensors, three pairs of sensors, four pairs of sensors, six pairs of sensors, or sixteen pairs of sensors).

The wearable band 6010 can include any suitable number of sensors 6013. In some embodiments, the number and arrangements of sensors 6013 depends on the particular application for which the wearable band 6010 is used. For instance, a wearable band 6010 configured as an armband, wristband, or chest-band may include a plurality of sensors 6013 with different number of sensors 6013 and different arrangement for each use case, such as medical use cases, compared to gaming or general day-to-day use cases.

In accordance with some embodiments, the wearable band 6010 further includes an electrical ground electrode and a shielding electrode. The electrical ground and shielding electrodes, like the sensors 6013, can be distributed on the inside surface of the wearable band 6010 such that they contact a portion of the user's skin. For example, the electrical ground and shielding electrodes can be at an inside surface of coupling mechanism 6016 or an inside surface of a wearable structure 6011. The electrical ground and shielding electrodes can be formed and/or use the same components as the sensors 6013. In some embodiments, the wearable band 6010 includes more than one electrical ground electrode and more than one shielding electrode.

The sensors 6013 can be formed as part of the wearable structure 6011 of the wearable band 6010. In some embodiments, the sensors 6013 are flush or substantially flush with the wearable structure 6011 such that they do not extend beyond the surface of the wearable structure 6011. While flush with the wearable structure 6011, the sensors 6013 are still configured to contact the user's skin (e.g., via a skin-contacting surface). Alternatively, in some embodiments, the sensors 6013 extend beyond the wearable structure 6011 a predetermined distance (e.g., 0.1 mm-2 mm) to make contact and depress into the user's skin. In some embodiments, the sensors 6013 are coupled to an actuator (not shown) configured to adjust an extension height (e.g., a distance from the surface of the wearable structure 6011) of the sensors 6013 such that the sensors 6013 make contact and depress into the user's skin. In some embodiments, the actuators adjust the extension height between 0.01 mm to 1.2 mm. This allows the user to customize the positioning of the sensors 6013 to improve the overall comfort of the wearable band 6010 when worn while still allowing the sensors 6013 to contact the user's skin. In some embodiments, the sensors 6013 are indistinguishable from the wearable structure 6011 when worn by the user.

The wearable structure 6011 can be formed of an elastic material, elastomers, etc., configured to be stretched and fitted to be worn by the user. In some embodiments, the wearable structure 6011 is a textile or woven fabric. As described above, the sensors 6013 can be formed as part of a wearable structure 6011. For example, the sensors 6013 can be molded into the wearable structure 6011 or be integrated into a woven fabric (e.g., the sensors 6013 can be sewn into the fabric and mimic the pliability of fabric (e.g., the sensors 6013 can be constructed from a series of woven strands of fabric)).

The wearable structure 6011 can include flexible electronic connectors that interconnect the sensors 6013, the electronic circuitry, and/or other electronic components (described below in reference to FIG. 6B) that are enclosed in the wearable band 6010. In some embodiments, the flexible electronic connectors are configured to interconnect the sensors 6013, the electronic circuitry, and/or other electronic components of the wearable band 6010 with respective sensors and/or other electronic components of another electronic device (e.g., watch body 6020). The flexible electronic connectors are configured to move with the wearable structure 6011 such that the user adjustment to the wearable structure 6011 (e.g., resizing, pulling, and/or folding) does not stress or strain the electrical coupling of components of the wearable band 6010.

As described above, the wearable band 6010 is configured to be worn by a user. In particular, the wearable band 6010 can be shaped or otherwise manipulated to be worn by a user. For example, the wearable band 6010 can be shaped to have a substantially circular shape such that it can be configured to be worn on the user's lower arm or wrist. Alternatively, the wearable band 6010 can be shaped to be worn on another body part of the user, such as the user's upper arm (e.g., around a bicep), forearm, chest, or legs. The wearable band 6010 can include a retaining mechanism 6012 (e.g., a buckle or a hook and loop fastener) for securing the wearable band 6010 to the user's wrist or other body part. While the wearable band 6010 is worn by the user, the sensors 6013 sense data (referred to as sensor data) from the user's skin. In particular, the sensors 6013 of the wearable band 6010 obtain (e.g., sense and record) neuromuscular signals.

The sensed data (e.g., sensed neuromuscular signals) can be used to detect and/or determine the user's intention to perform certain motor actions. In particular, the sensors 6013 sense and record neuromuscular signals from the user as the user performs muscular activations (e.g., movements and/or gestures). The detected and/or determined motor actions (e.g., phalange (or digits) movements, wrist movements, hand movements, and/or other muscle intentions) can be used to determine control commands or control information (instructions to perform certain commands after the data is sensed) for causing a computing device to perform one or more input commands. For example, the sensed neuromuscular signals can be used to control certain user interfaces displayed on the display 6005 of the wrist-wearable device 6000 and/or can be transmitted to a device responsible for rendering an AR environment (e.g., a head-mounted display) to perform an action in an associated AR environment, such as to control the motion of a virtual device displayed to the user. The muscular activations performed by the user can include static gestures, such as placing the user's hand palm down on a table; dynamic gestures, such as grasping a physical or virtual object; and covert gestures that are imperceptible to another person, such as slightly tensing a joint by co-contracting opposing muscles or using sub-muscular activations. The muscular activations performed by the user can include symbolic gestures (e.g., gestures mapped to other gestures, interactions, or commands, for example, based on a gesture vocabulary that specifies the mapping of gestures to commands).

The sensor data sensed by the sensors 6013 can be used to provide a user with an enhanced interaction with a physical object (e.g., devices communicatively coupled with the wearable band 6010) and/or a virtual object in an AR application generated by an AR system (e.g., user interface objects presented on the display 6005 or another computing device (e.g., a smartphone)).

In some embodiments, the wearable band 6010 includes one or more haptic devices 6046 (FIG. 6B, e.g., a vibratory haptic actuator) that are configured to provide haptic feedback (e.g., a cutaneous and/or kinesthetic sensation) to the user's skin. The sensors 6013, and/or the haptic devices 6046 can be configured to operate in conjunction with multiple applications including, without limitation, health monitoring, social media, games, and artificial reality (e.g., the applications associated with artificial reality).

The wearable band 6010 can also include coupling mechanism 6016 (e.g., a cradle or a shape of the coupling mechanism can correspond to shape of the watch body 6020 of the wrist-wearable device 6000) for detachably coupling a capsule (e.g., a computing unit) or watch body 6020 (via a coupling surface of the watch body 6020) to the wearable band 6010. In particular, the coupling mechanism 6016 can be configured to receive a coupling surface proximate to the bottom side of the watch body 6020 (e.g., a side opposite to a front side of the watch body 6020 where the display 6005 is located), such that a user can push the watch body 6020 downward into the coupling mechanism 6016 to attach the watch body 6020 to the coupling mechanism 6016. In some embodiments, the coupling mechanism 6016 can be configured to receive a top side of the watch body 6020 (e.g., a side proximate to the front side of the watch body 6020 where the display 6005 is located) that is pushed upward into the cradle, as opposed to being pushed downward into the coupling mechanism 6016. In some embodiments, the coupling mechanism 6016 is an integrated component of the wearable band 6010 such that the wearable band 6010 and the coupling mechanism 6016 are a single unitary structure. In some embodiments, the coupling mechanism 6016 is a type of frame or shell that allows the watch body 6020 coupling surface to be retained within or on the wearable band 6010 coupling mechanism 6016 (e.g., a cradle, a tracker band, a support base, or a clasp).

The coupling mechanism 6016 can allow for the watch body 6020 to be detachably coupled to the wearable band 6010 through a friction fit, magnetic coupling, a rotation-based connector, a shear-pin coupler, a retention spring, one or more magnets, a clip, a pin shaft, a hook and loop fastener, or a combination thereof. A user can perform any type of motion to couple the watch body 6020 to the wearable band 6010 and to decouple the watch body 6020 from the wearable band 6010. For example, a user can twist, slide, turn, push, pull, or rotate the watch body 6020 relative to the wearable band 6010, or a combination thereof, to attach the watch body 6020 to the wearable band 6010 and to detach the watch body 6020 from the wearable band 6010. Alternatively, as discussed below, in some embodiments, the watch body 6020 can be decoupled from the wearable band 6010 by actuation of the release mechanism 6029.

The wearable band 6010 can be coupled with a watch body 6020 to increase the functionality of the wearable band 6010 (e.g., converting the wearable band 6010 into a wrist-wearable device 6000, adding an additional computing unit and/or battery to increase computational resources and/or a battery life of the wearable band 6010, adding additional sensors to improve sensed data). As described above, the wearable band 6010 (and the coupling mechanism 6016) is configured to operate independently (e.g., execute functions independently) from watch body 6020. For example, the coupling mechanism 6016 can include one or more sensors 6013 that contact a user's skin when the wearable band 6010 is worn by the user and provide sensor data for determining control commands.

A user can detach the watch body 6020 (or capsule) from the wearable band 6010 in order to reduce the encumbrance of the wrist-wearable device 6000 to the user. For embodiments in which the watch body 6020 is removable, the watch body 6020 can be referred to as a removable structure, such that in these embodiments the wrist-wearable device 6000 includes a wearable portion (e.g., the wearable band 6010) and a removable structure (the watch body 6020).

Turning to the watch body 6020, the watch body 6020 can have a substantially rectangular or circular shape. The watch body 6020 is configured to be worn by the user on their wrist or on another body part. More specifically, the watch body 6020 is sized to be easily carried by the user, attached on a portion of the user's clothing, and/or coupled to the wearable band 6010 (forming the wrist-wearable device 6000). As described above, the watch body 6020 can have a shape corresponding to the coupling mechanism 6016 of the wearable band 6010. In some embodiments, the watch body 6020 includes a single release mechanism 6029 or multiple release mechanisms (e.g., two release mechanisms 6029 positioned on opposing sides of the watch body 6020, such as spring-loaded buttons) for decoupling the watch body 6020 and the wearable band 6010. The release mechanism 6029 can include, without limitation, a button, a knob, a plunger, a handle, a lever, a fastener, a clasp, a dial, a latch, or a combination thereof.

A user can actuate the release mechanism 6029 by pushing, turning, lifting, depressing, shifting, or performing other actions on the release mechanism 6029. Actuation of the release mechanism 6029 can release (e.g., decouple) the watch body 6020 from the coupling mechanism 6016 of the wearable band 6010, allowing the user to use the watch body 6020 independently from wearable band 6010, and vice versa. For example, decoupling the watch body 6020 from the wearable band 6010 can allow the user to capture images using rear-facing camera 6025B. Although the release mechanism 6029 shown positioned at a corner of watch body 6020, the release mechanism 6029 can be positioned anywhere on watch body 6020 that is convenient for the user to actuate. In addition, in some embodiments, the wearable band 6010 can also include a respective release mechanism for decoupling the watch body 6020 from the coupling mechanism 6016. In some embodiments, the release mechanism 6029 is optional and the watch body 6020 can be decoupled from the coupling mechanism 6016 as described above (e.g., via twisting or rotating).

The watch body 6020 can include one or more peripheral buttons 6023 and 6027 for performing various operations at the watch body 6020. For example, the peripheral buttons 6023 and 6027 can be used to turn on or wake (e.g., transition from a sleep state to an active state) the display 6005, unlock the watch body 6020, increase or decrease a volume, increase or decrease brightness, interact with one or more applications, and/or interact with one or more user interfaces. Additionally, or alternatively, in some embodiments, the display 6005 operates as a touch screen and allows the user to provide one or more inputs for interacting with the watch body 6020.

In some embodiments, the watch body 6020 includes one or more sensors 6021. The sensors 6021 of the watch body 6020 can be the same or distinct from the sensors 6013 of the wearable band 6010. The sensors 6021 of the watch body 6020 can be distributed on an inside and/or an outside surface of the watch body 6020. In some embodiments, the sensors 6021 are configured to contact a user's skin when the watch body 6020 is worn by the user. For example, the sensors 6021 can be placed on the bottom side of the watch body 6020 and the coupling mechanism 6016 can be a cradle with an opening that allows the bottom side of the watch body 6020 to directly contact the user's skin. Alternatively, in some embodiments, the watch body 6020 does not include sensors that are configured to contact the user's skin (e.g., including sensors internal and/or external to the watch body 6020 that configured to sense data of the watch body 6020 and the watch body 6020's surrounding environment). In some embodiments, the sensors 6013 are configured to track a position and/or motion of the watch body 6020.

The watch body 6020 and the wearable band 6010 can share data using a wired communication method (e.g., a Universal Asynchronous Receiver/Transmitter (UART) or a USB transceiver) and/or a wireless communication method (e.g., near field communication or Bluetooth). For example, the watch body 6020 and the wearable band 6010 can share data sensed by the sensors 6013 and 6021, as well as application- and device-specific information (e.g., active and/or available applications), output devices (e.g., display and/or speakers), input devices (e.g., touch screen, microphone, and/or imaging sensors).

In some embodiments, the watch body 6020 can include, without limitation, a front-facing camera 6025A and/or a rear-facing camera 6025B, sensors 6021 (e.g., a biometric sensor, an IMU sensor, a heart rate sensor, a saturated oxygen sensor, a neuromuscular signal sensor, an altimeter sensor, a temperature sensor, a bioimpedance sensor, a pedometer sensor, an optical sensor (e.g., imaging sensor 6063; FIG. 6B), a touch sensor, a sweat sensor). In some embodiments, the watch body 6020 can include one or more haptic devices 6076 (FIG. 6B; a vibratory haptic actuator) that is configured to provide haptic feedback (e.g., a cutaneous and/or kinesthetic sensation) to the user. The sensors 6021 and/or the haptic device 6076 can also be configured to operate in conjunction with multiple applications including, without limitation, health-monitoring applications, social media applications, game applications, and artificial-reality applications (e.g., the applications associated with artificial reality).

As described above, the watch body 6020 and the wearable band 6010, when coupled, can form the wrist-wearable device 6000. When coupled, the watch body 6020 and wearable band 6010 operate as a single device to execute functions (operations, detections, and/or communications) described herein. In some embodiments, each device is provided with particular instructions for performing the one or more operations of the wrist-wearable device 6000. For example, in accordance with a determination that the watch body 6020 does not include neuromuscular signal sensors, the wearable band 6010 can include alternative instructions for performing associated instructions (e.g., providing sensed neuromuscular signal data to the watch body 6020 via a different electronic device). Operations of the wrist-wearable device 6000 can be performed by the watch body 6020 alone or in conjunction with the wearable band 6010 (e.g., via respective processors and/or hardware components) and vice versa. In some embodiments, operations of the wrist-wearable device 6000, the watch body 6020, and/or the wearable band 6010 can be performed in conjunction with one or more processors and/or hardware components of another communicatively coupled device (e.g., the HIPD 8000; FIGS. 8A-8B).

As described below with reference to the block diagram of FIG. 6B, the wearable band 6010 and/or the watch body 6020 can each include independent resources required to independently execute functions. For example, the wearable band 6010 and/or the watch body 6020 can each include a power source (e.g., a battery), a memory, data storage, a processor (e.g., a central processing unit (CPU)), communications, a light source, and/or input/output devices.

FIG. 6B shows block diagrams of a computing system 6030 corresponding to the wearable band 6010, and a computing system 6060 corresponding to the watch body 6020, according to some embodiments. A computing system of the wrist-wearable device 6000 includes a combination of components of the wearable band computing system 6030 and the watch body computing system 6060, in accordance with some embodiments.

The watch body 6020 and/or the wearable band 6010 can include one or more components shown in watch body computing system 6060. In some embodiments, a single integrated circuit includes all or a substantial portion of the components of the watch body computing system 6060 are included in a single integrated circuit. Alternatively, in some embodiments, components of the watch body computing system 6060 are included in a plurality of integrated circuits that are communicatively coupled. In some embodiments, the watch body computing system 6060 is configured to couple (e.g., via a wired or wireless connection) with the wearable band computing system 6030, which allows the computing systems to share components, distribute tasks, and/or perform other operations described herein (individually or as a single device).

The watch body computing system 6060 can include one or more processors 6079, a controller 6077, a peripherals interface 6061, a power system 6095, and memory (e.g., a memory 6080), each of which are defined above and described in more detail below.

The power system 6095 can include a charger input 6057, a power-management integrated circuit (PMIC) 6097, and a battery 6096, each are which are defined above. In some embodiments, a watch body 6020 and a wearable band 6010 can have respective batteries (e.g., battery 6098 and 6059), and can share power with each other. The watch body 6020 and the wearable band 6010 can receive a charge using a variety of techniques. In some embodiments, the watch body 6020 and the wearable band 6010 can use a wired charging assembly (e.g., power cords) to receive the charge. Alternatively, or in addition, the watch body 6020 and/or the wearable band 6010 can be configured for wireless charging. For example, a portable charging device can be designed to mate with a portion of watch body 6020 and/or wearable band 6010 and wirelessly deliver usable power to a battery of watch body 6020 and/or wearable band 6010. The watch body 6020 and the wearable band 6010 can have independent power systems (e.g., power system 6095 and 6056) to enable each to operate independently. The watch body 6020 and wearable band 6010 can also share power (e.g., one can charge the other) via respective PMICs (e.g., PMICs 6097 and 6058) that can share power over power and ground conductors and/or over wireless charging antennas.

In some embodiments, the peripherals interface 6061 can include one or more sensors 6021, many of which listed below are defined above. The sensors 6021 can include one or more coupling sensors 6062 for detecting when the watch body 6020 is coupled with another electronic device (e.g., a wearable band 6010). The sensors 6021 can include imaging sensors 6063 (one or more of the cameras 6025 and/or separate imaging sensors 6063 (e.g., thermal-imaging sensors)). In some embodiments, the sensors 6021 include one or more SpO2 sensors 6064. In some embodiments, the sensors 6021 include one or more biopotential-signal sensors (e.g., EMG sensors 6065 and 6035, which may be disposed on a user-facing portion of the watch body 6020 and/or the wearable band 6010). In some embodiments, the sensors 6021 include one or more capacitive sensors 6066. In some embodiments, the sensors 6021 include one or more heart rate sensors 6067. In some embodiments, the sensors 6021 include one or more IMU sensors 6068. In some embodiments, one or more IMU sensors 6068 can be configured to detect movement of a user's hand or other location that the watch body 6020 is placed or held.

In some embodiments, the peripherals interface 6061 includes an NFC component 6069, a global-position system (GPS) component 6070, a long-term evolution (LTE) component 6071, and/or a Wi-Fi and/or Bluetooth communication component 6072. In some embodiments, the peripherals interface 6061 includes one or more buttons 6073 (e.g., the peripheral buttons 6023 and 6027 in FIG. 6A), which, when selected by a user, cause operations to be performed at the watch body 6020. In some embodiments, the peripherals interface 6061 includes one or more indicators, such as a light emitting diode (LED), to provide a user with visual indicators (e.g., message received, low battery, an active microphone, and/or a camera).

The watch body 6020 can include at least one display 6005 for displaying visual representations of information or data to the user, including user-interface elements and/or three-dimensional (3D) virtual objects. The display can also include a touch screen for inputting user inputs, such as touch gestures, swipe gestures, and the like. The watch body 6020 can include at least one speaker 6074 and at least one microphone 6075 for providing audio signals to the user and receiving audio input from the user. The user can provide user inputs through the microphone 6075 and can also receive audio output from the speaker 6074 as part of a haptic event provided by the haptic controller 6078. The watch body 6020 can include at least one camera 6025, including a front camera 6025A and a rear camera 6025B. The cameras 6025 can include ultra-wide-angle cameras, wide-angle cameras, fish-eye cameras, spherical cameras, telephoto cameras, a depth-sensing cameras, or other types of cameras.

The watch body computing system 6060 can include one or more haptic controllers 6077 and associated componentry (e.g., haptic devices 6076) for providing haptic events at the watch body 6020 (e.g., a vibrating sensation or audio output in response to an event at the watch body 6020). The haptic controllers 6078 can communicate with one or more haptic devices 6076, such as electroacoustic devices, including a speaker of the one or more speakers 6074 and/or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). The haptic controller 6078 can provide haptic events to one or more haptic actuators that are capable of being sensed by a user of the watch body 6020. In some embodiments, the one or more haptic controllers 6078 can receive input signals from an application of the applications 6082.

In some embodiments, the computing system 6030 and/or the computing system 6060 can include memory 6080, which can be controlled by a memory controller of the one or more controllers 6077. In some embodiments, software components stored in the memory 6080 include one or more applications 6082 configured to perform operations at the watch body 6020. In some embodiments, the one or more applications 6082 include games, word processors, messaging applications, calling applications, web browsers, social media applications, media streaming applications, financial applications, calendars, and/or clocks. In some embodiments, software components stored in the memory 6080 include one or more communication interface modules 6083 as defined above. In some embodiments, software components stored in the memory 6080 include one or more graphics modules 6084 for rendering, encoding, and/or decoding audio and/or visual data; and one or more data management modules 6085 for collecting, organizing, and/or providing access to the data 6087 stored in memory 6080. In some embodiments, one or more of applications 6082 and/or one or more modules can work in conjunction with one another to perform various tasks at the watch body 6020.

In some embodiments, software components stored in the memory 6080 can include one or more operating systems 6081 (e.g., a Linux-based operating system or an Android operating system). The memory 6080 can also include data 6087. The data 6087 can include profile data 6088A, sensor data 6089A, media content data 6090, and application data 6091.

It should be appreciated that the watch body computing system 6060 is an example of a computing system within the watch body 6020, and that the watch body 6020 can have more or fewer components than shown in the watch body computing system 6060, combine two or more components, and/or have a different configuration and/or arrangement of the components. The various components shown in watch body computing system 6060 are implemented in hardware, software, firmware, or a combination thereof, including one or more signal processing and/or application-specific integrated circuits.

Turning to the wearable band computing system 6030, one or more components that can be included in the wearable band 6010 are shown. The wearable band computing system 6030 can include more or fewer components than shown in the watch body computing system 6060, combine two or more components, and/or have a different configuration and/or arrangement of some or all of the components. In some embodiments, all, or a substantial portion of the components of the wearable band computing system 6030 are included in a single integrated circuit. Alternatively, in some embodiments, components of the wearable band computing system 6030 are included in a plurality of integrated circuits that are communicatively coupled. As described above, in some embodiments, the wearable band computing system 6030 is configured to couple (e.g., via a wired or wireless connection) with the watch body computing system 6060, which allows the computing systems to share components, distribute tasks, and/or perform other operations described herein (individually or as a single device).

The wearable band computing system 6030, similar to the watch body computing system 6060, can include one or more processors 6049, one or more controllers 6047 (including one or more haptics controller 6048), a peripherals interface 6031 that can include one or more sensors 6013 and other peripheral devices, power source (e.g., a power system 6056), and memory (e.g., a memory 6050) that includes an operating system (e.g., an operating system 6051), data (e.g., data 6054 including profile data 6088B and/or sensor data 6089B), and one or more modules (e.g., a communications interface module 6052 and/or a data management module 6053).

The one or more sensors 6013 can be analogous to sensors 6021 of the computing system 6060 in light of the definitions above. For example, sensors 6013 can include one or more coupling sensors 6032, one or more SpO2 sensors 6034, one or more EMG sensors 6035, one or more capacitive sensors 6036, one or more heart rate sensors 6037, and one or more IMU sensors 6038.

The peripherals interface 6031 can also include other components analogous to those included in the peripheral interface 6061 of the computing system 6060, including an NFC component 6039, a GPS component 6040, an LTE component 6041, a Wi-Fi and/or Bluetooth communication component 6042, and/or one or more haptic devices 6076 as described above in reference to peripherals interface 6061. In some embodiments, the peripherals interface 6061 includes one or more buttons 6043, a display 6033, a speaker 6044, a microphone 6045, and a camera 6055. In some embodiments, the peripherals interface 6061 includes one or more indicators, such as an LED.

It should be appreciated that the wearable band computing system 6030 is an example of a computing system within the wearable band 6010, and that the wearable band 6010 can have more or fewer components than shown in the wearable band computing system 6030, combine two or more components, and/or have a different configuration and/or arrangement of the components. The various components shown in wearable band computing system 6030 can be implemented in one or a combination of hardware, software, and firmware, including one or more signal processing and/or application-specific integrated circuits.

The wrist-wearable device 6000 with respect to FIG. 6A is an example of the wearable band 6010 and the watch body 6020 coupled, so the wrist-wearable device 6000 will be understood to include the components shown and described for the wearable band computing system 6030 and the watch body computing system 6060. In some embodiments, wrist-wearable device 6000 has a split architecture (e.g., a split mechanical architecture or a split electrical architecture) between the watch body 6020 and the wearable band 6010. In other words, all of the components shown in the wearable band computing system 6030 and the watch body computing system 6060 can be housed or otherwise disposed in a combined watch device 6000, or within individual components of the watch body 6020, wearable band 6010, and/or portions thereof (e.g., a coupling mechanism 6016 of the wearable band 6010).

The techniques described above can be used with any device for sensing neuromuscular signals, including the arm-wearable devices of FIGS. 6A and 6B, but could also be used with other types of wearable devices for sensing neuromuscular signals (such as body-wearable or head-wearable devices that might have neuromuscular sensors closer to the brain or spinal column).

In some embodiments, a wrist-wearable device 6000 can be used in conjunction with a head-wearable device described below (e.g., AR system 7000 and VR headset 7010) and/or an HIPD 8000, and the wrist-wearable device 6000 can also be configured to be used to allow a user to control aspect of the artificial reality (e.g., by using EMG-based gestures to control user interface objects in the artificial reality and/or by allowing a user to interact with the touchscreen on the wrist-wearable device to also control aspects of the artificial reality). In some embodiments, a wrist-wearable device 6000 can also be used in conjunction with a wearable garment, such as the wearable gloves described below in reference to FIGS. 9A-9C. Having thus described example wrist-wearable device, attention will now be turned to example head-wearable devices, such AR system 7000 and VR headset 7010.

Example Head-Wearable Devices

Figure 7A:
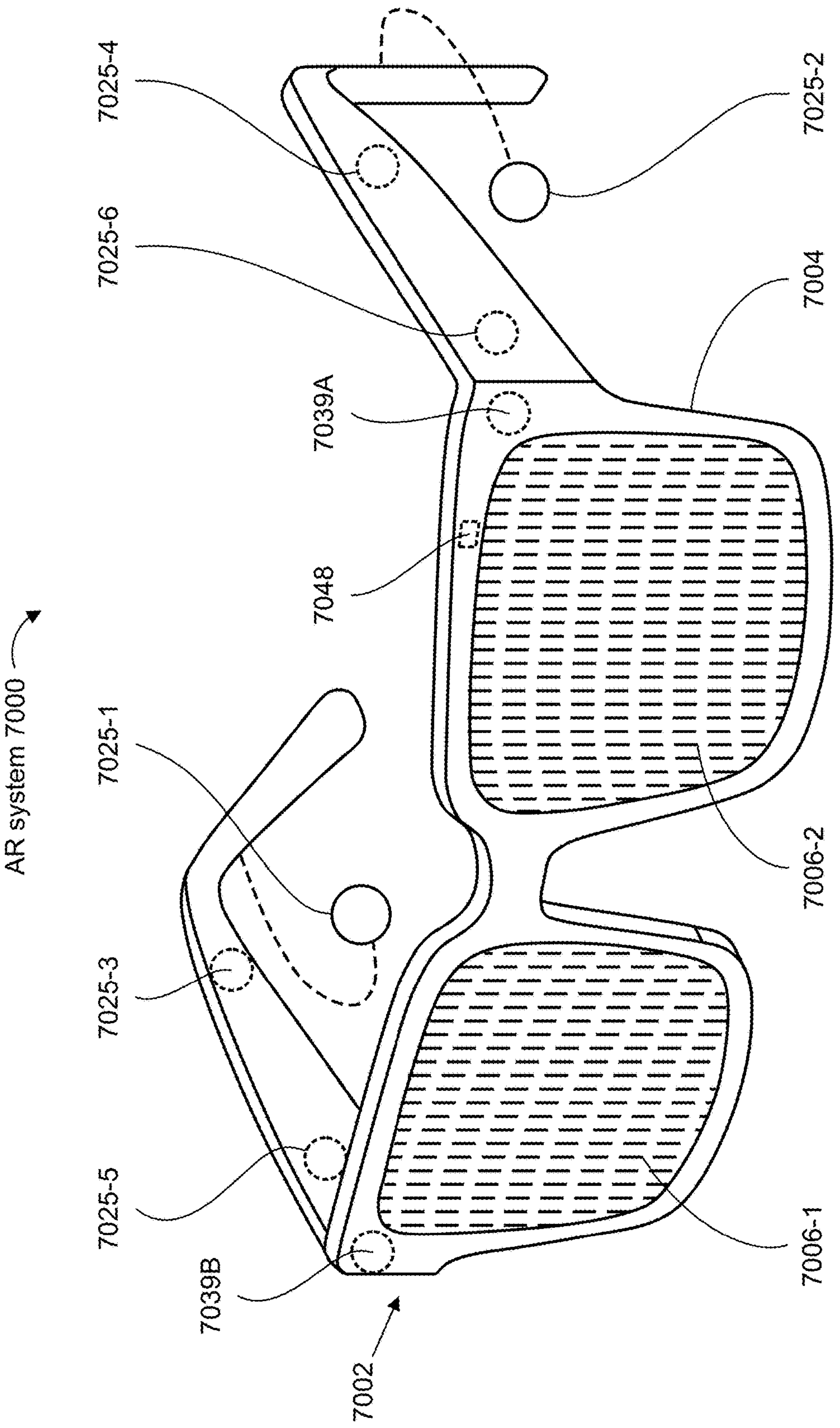
Figures 1, 7B:
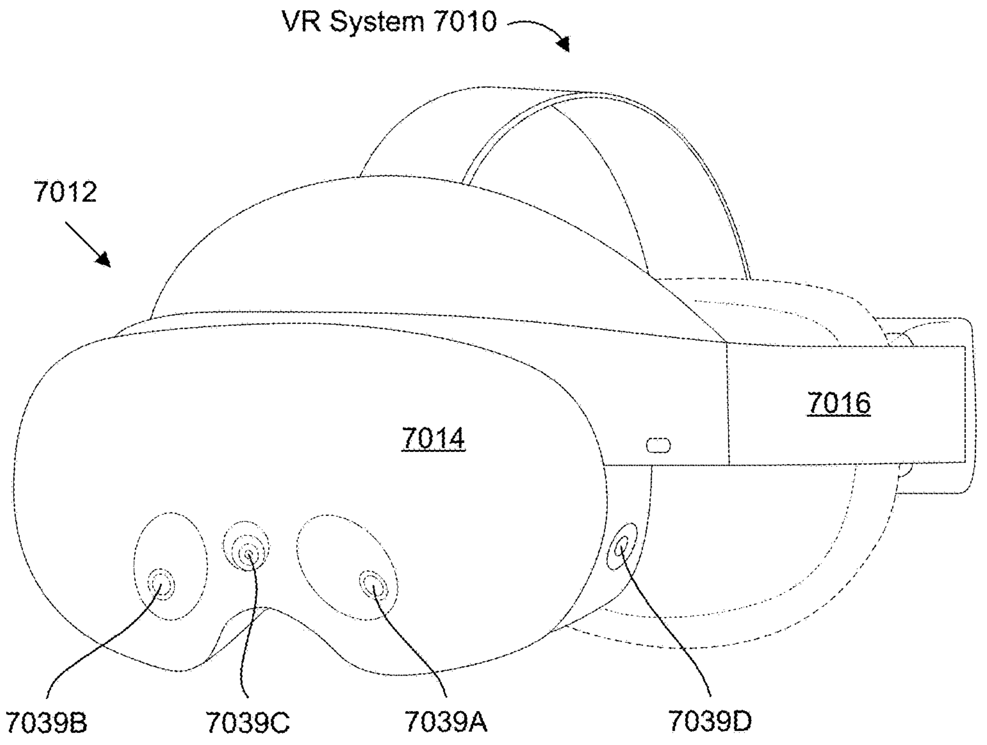
Figures 2, 7B:
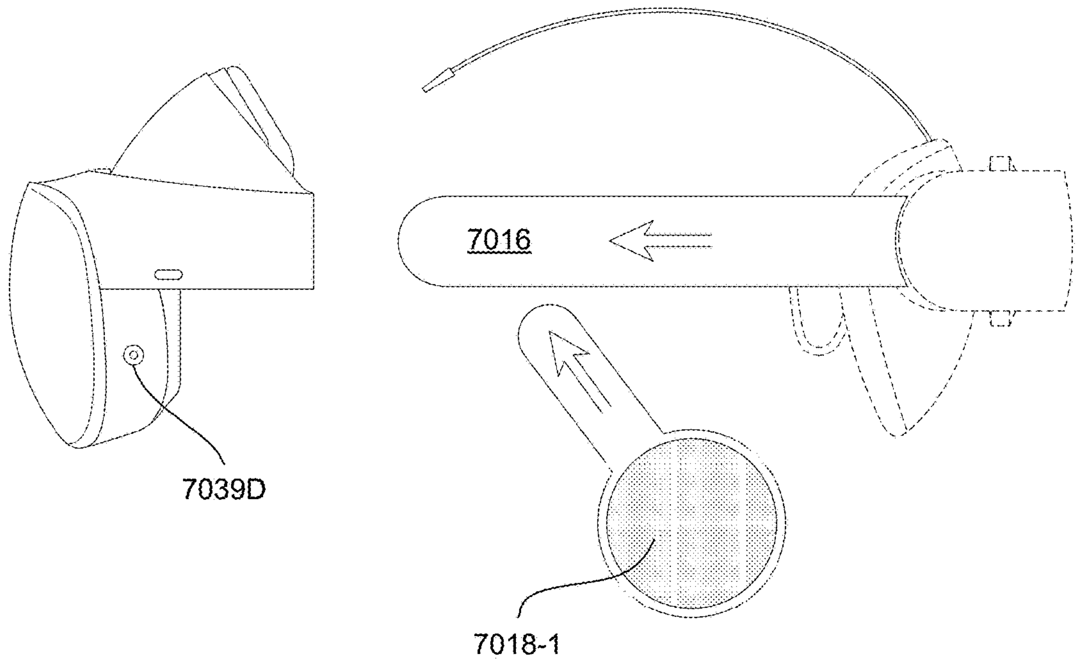

FIGS. 7A, 7B-1, 7B-2, and 7C show example AR systems, including the AR system 7000. In some embodiments, the AR system 7000 is an eyewear device as shown in FIG. 7A. In some embodiments, the VR system 7010 includes a head-mounted display (HMD) 7012, as shown in FIGS. 7B-1 and 7B-2. In some embodiments, the AR system 7000 and the VR system 7010 include one or more analogous components (e.g., components for presenting interactive AR environments, such as processors, memory, and/or presentation devices, including one or more displays and/or one or more waveguides), some of which are described in more detail with respect to FIG. 7C. As described herein, a head-wearable device can include components of the eyewear device 7002 and/or the head-mounted display 7012. Some embodiments of head-wearable devices do not include any displays, including any of the displays described with respect to the AR system 7000 and/or the VR system 7010. While the example AR systems are respectively described herein as the AR system 7000 and the VR system 7010, either or both of the example AR systems described herein can be configured to present fully immersive VR scenes presented in substantially all of a user's field of view, additionally or alternatively to, subtler augmented-reality scenes that are presented within a portion, less than all, of the user's field of view.

FIG. 7A shows an example visual depiction of the AR system 7000 (which may also be described herein as augmented-reality glasses and/or smart glasses). The AR system 7000 can include additional electronic components that are not shown in FIG. 7A, such as a wearable accessory device and/or an intermediary processing device, in electronic communication or otherwise configured to be used in conjunction with the eyewear device. In some embodiments, the wearable accessory device and/or the intermediary processing device may be configured to couple with the eyewear device via a coupling mechanism in electronic communication with a coupling sensor 7024, where the coupling sensor 7024 can detect when an electronic device becomes physically or electronically coupled with the eyewear device. In some embodiments, the eyewear device is configured to couple to a housing 7090, which may include one or more additional coupling mechanisms configured to couple with additional accessory devices. The components shown in FIG. 7A can be implemented in hardware, software, firmware, or a combination thereof, including one or more signal-processing components and/or application-specific integrated circuits (ASICs).

The eyewear device includes mechanical glasses components, including a frame 7004 configured to hold one or more lenses (e.g., one or both lenses 7006-1 and 7006-2). One of ordinary skill in the art will appreciate that the eyewear device can include additional mechanical components, such as hinges configured to allow portions of the frame 7004 of the eyewear device 7002 to be folded and unfolded, a bridge configured to span the gap between the lenses 7006-1 and 7006-2 and rest on the user's nose, nose pads configured to rest on the bridge of the nose and provide support for the eyewear device, earpieces configured to rest on the user's ears and provide additional support for the eyewear device, temple arms configured to extend from the hinges to the earpieces of the eyewear device, and the like. One of ordinary skill in the art will further appreciate that some examples of the AR system 7000 can include none of the mechanical components described herein. For example, smart contact lenses configured to present artificial reality to users may not include any components of the eyewear device.

The eyewear device includes electronic components, many of which will be described in more detail below with respect to FIG. 7C. Some example electronic components are illustrated in FIG. 7A, including acoustic sensors 7025-1, 7025-2, 7025-3, 7025-4, 7025-5, and 7025-6, which can be distributed along a substantial portion of the frame 7004 of the eyewear device. The eyewear device also includes a left camera 7039A and a right camera 7039B, which are located on different sides of the frame 7004. And the eyewear device includes a processor 7048 (e.g., an integral microprocessor, such as an ASIC) that is embedded into a portion of the frame 7004.

FIGS. 7B-1 and 7B-2 show a VR system 7010 that includes a head-mounted display (HMD) 7012 (e.g., also referred to herein as an AR headset, a head-wearable device, or a VR headset), in accordance with some embodiments. As noted, some AR systems may (e.g., the AR system 7000), instead of blending an artificial reality with actual reality, substantially replace one or more of a user's sensory perceptions of the real world with a virtual experience (e.g., the AR systems 5000*c* and 5000*d*).

The HMD 7012 includes a front body 7014 and a frame 7016 (e.g., a strap or band) shaped to fit around a user's head. In some embodiments, the front body 7014 and/or the frame 7016 includes one or more electronic elements for facilitating presentation of and/or interactions with an AR and/or VR system (e.g., displays, IMUs, tracking emitters, or detectors). In some embodiments, the HMD 7012 includes output audio transducers (e.g., an audio transducer 7018-1), as shown in FIG. 7B-2. In some embodiments, one or more components, such as the output audio transducer(s) 7018-1 and the frame 7016, can be configured to attach and detach (e.g., are detachably attachable) to the HMD 7012 (e.g., a portion or all of the frame 7016 and/or the audio transducer 7018-1), as shown in FIG. 7B-2. In some embodiments, coupling a detachable component to the HMD 7012 causes the detachable component to come into electronic communication with the HMD 7012.

FIGS. 7B-1 and 7B-2 also show that the VR system 7010 includes one or more cameras, such as the left camera 7039A and the right camera 7039B, which can be analogous to the left and right cameras on the frame 7004 of the eyewear device 7002. In some embodiments, the VR system 7010 includes one or more additional cameras (e.g., cameras 7039C and 7039D), which can be configured to augment image data obtained by the cameras 7039A and 7039B by providing more information. For example, the camera 7039C can be used to supply color information that is not discerned by cameras 7039A and 7039B. In some embodiments, one or more of the cameras 7039A to 7039D can include an optional infrared (IR) cut filter configured to remove IR light from being received at the respective camera sensors.

Figure 7C:
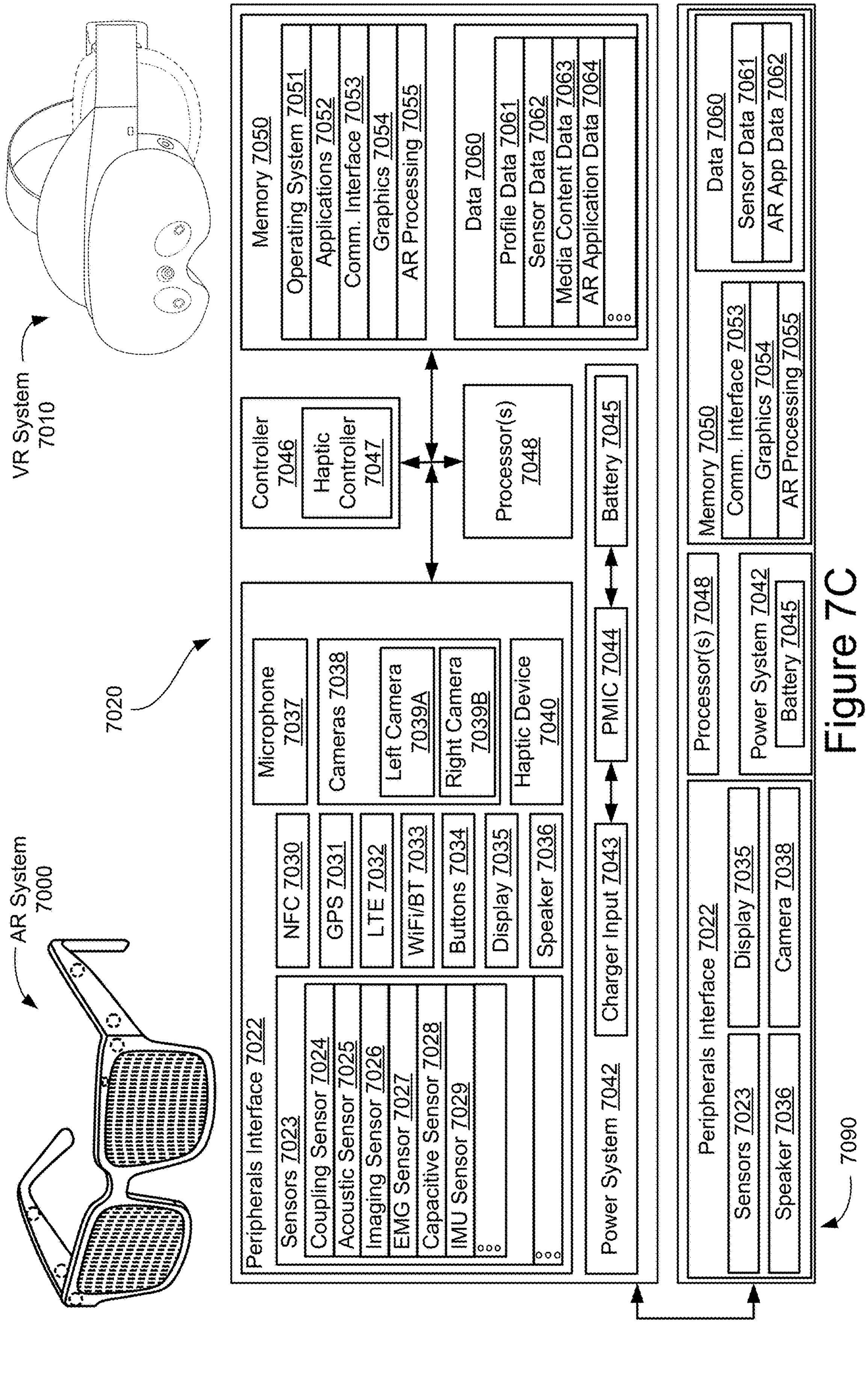

FIG. 7C illustrates a computing system 7020 and an optional housing 7090, each of which show components that can be included in the AR system 7000 and/or the VR system 7010. In some embodiments, more or less components can be included in the optional housing 7090 depending on practical restraints of the respective AR system being described.

In some embodiments, the computing system 7020 and/or the optional housing 7090 can include one or more peripheral interfaces 7022, one or more power systems 7042, one or more controllers 7046 (including one or more haptic controllers 7047), one or more processors 7048 (as defined above, including any of the examples provided), and memory 7050, which can all be in electronic communication with each other. For example, the one or more processors 7048 can be configured to execute instructions stored in the memory 7050, which can cause a controller of the one or more controllers 7046 to cause operations to be performed at one or more peripheral devices of the peripherals interface 7022. In some embodiments, each operation described can occur based on electrical power provided by the power system 7042.

In some embodiments, the peripherals interface 7022 can include one or more devices configured to be part of the computing system 7020, many of which have been defined above and/or described with respect to wrist-wearable devices shown in FIGS. 6A and 6B. For example, the peripherals interface can include one or more sensors 7023. Some example sensors include: one or more coupling sensors 7024, one or more acoustic sensors 7025, one or more imaging sensors 7026, one or more EMG sensors 7027, one or more capacitive sensors 7028, and/or one or more IMU sensors 7029; and/or any other types of sensors defined above or described with respect to any other embodiments discussed herein.

In some embodiments, the peripherals interface can include one or more additional peripheral devices, including one or more NFC devices 7030, one or more GPS devices 7031, one or more LTE devices 7032, one or more Wi-Fi and/or Bluetooth devices 7033, one or more buttons 7034 (e.g., including buttons that are slidable or otherwise adjustable), one or more displays 7035, one or more speakers 7036, one or more microphones 7037, one or more cameras 7038 (e.g., including a left camera 7039A and/or a right camera 7039B), and/or one or more haptic devices 7040; and/or any other types of peripheral devices defined above or described with respect to any other embodiments discussed herein.

AR systems can include a variety of types of visual feedback mechanisms (e.g., presentation devices). For example, display devices in the AR system 7000 and/or the VR system 7010 can include one or more liquid-crystal displays (LCDs), light emitting diode (LED) displays, organic LED (OLED) displays, and/or any other suitable types of display screens. AR systems can include a single display screen (e.g., configured to be seen by both eyes), and/or can provide separate display screens for each eye, which can allow for additional flexibility for varifocal adjustments and/or for correcting a refractive error associated with the user's vision. Some embodiments of AR systems also include optical subsystems having one or more lenses (e.g., conventional concave or convex lenses, Fresnel lenses, or adjustable liquid lenses) through which a user can view a display screen.

For example, respective displays can be coupled to each of the lenses 7006-1 and 7006-2 of the AR system 7000. The displays coupled to each of the lenses 7006-1 and 7006-2 can act together or independently to present an image or series of images to a user. In some embodiments, the AR system 7000 includes a single display (e.g., a near-eye display) or more than two displays. In some embodiments, a first set of one or more displays can be used to present an augmented-reality environment, and a second set of one or more display devices can be used to present a virtual-reality environment. In some embodiments, one or more waveguides are used in conjunction with presenting AR content to the user of the AR system 7000 (e.g., as a means of delivering light from one or more displays to the user's eyes). In some embodiments, one or more waveguides are fully or partially integrated into the eyewear device 7002. Additionally, or alternatively to display screens, some AR systems include one or more projection systems. For example, display devices in the AR system 7000 and/or the virtual-reality system 7010 can include micro-LED projectors that project light (e.g., using a waveguide) into display devices, such as clear combiner lenses that allow ambient light to pass through. The display devices can refract the projected light toward a user's pupil and can enable a user to simultaneously view both AR content and the real world. AR systems can also be configured with any other suitable type or form of image projection system. In some embodiments, one or more waveguides are provided additionally or alternatively to the one or more display(s).

The computing system 7020 and/or the optional housing 7090 of the AR system 7000 or the VR system 7010 can include some or all of the components of a power system 7042. The power system 7042 can include one or more charger inputs 7043, one or more PMICs 7044, and/or one or more batteries 7045.

The memory 7050 includes instructions and data, some or all of which may be stored as non-transitory computer-readable storage media within the memory 7050. For example, the memory 7050 can include one or more operating systems 7051; one or more applications 7052; one or more communication interface applications 7053; one or more graphics applications 7054; one or more AR processing applications 7055; and/or any other types of data defined above or described with respect to any other embodiments discussed herein.

The memory 7050 also includes data 7060 which can be used in conjunction with one or more of the applications discussed above. The data 7060 can include: profile data 7061; sensor data 7062; media content data 7063; AR application data 7064; and/or any other types of data defined above or described with respect to any other embodiments discussed herein.

In some embodiments, the controller 7046 of the eyewear device 7002 processes information generated by the sensors 7023 on the eyewear device 7002 and/or another electronic device within the AR system 7000. For example, the controller 7046 can process information from the acoustic sensors 7025-1 and 7025-2. For each detected sound, the controller 7046 can perform a direction of arrival (DOA) estimation to estimate a direction from which the detected sound arrived at the eyewear device 7002 of the AR system 7000. As one or more of the acoustic sensors 7025 detects sounds, the controller 7046 can populate an audio data set with the information (e.g., represented in FIG. 7C as sensor data 7062).

In some embodiments, a physical electronic connector can convey information between the eyewear device and another electronic device, and/or between one or more processors of the AR system 7000 or the VR system 7010 and the controller 7046. The information can be in the form of optical data, electrical data, wireless data, or any other transmittable data form. Moving the processing of information generated by the eyewear device to an intermediary processing device can reduce weight and heat in the eyewear device, making it more comfortable and safer for a user. In some embodiments, an optional wearable accessory device (e.g., an electronic neckband) is coupled to the eyewear device via one or more connectors. The connectors can be wired or wireless connectors and can include electrical and/or non-electrical (e.g., structural) components. In some embodiments, the eyewear device and the wearable accessory device can operate independently without any wired or wireless connection between them.

In some situations, pairing external devices, such as an intermediary processing device (e.g., the HIPD 8000) with the eyewear device 7002 (e.g., as part of the AR system 7000) enables the eyewear device 7002 to achieve a similar form factor of a pair of glasses while still providing sufficient battery and computation power for expanded capabilities. Some, or all, of the battery power, computational resources, and/or additional features of the AR system 7000 can be provided by a paired device or shared between a paired device and the eyewear device 7002, thus reducing the weight, heat profile, and form factor of the eyewear device 7002 overall while allowing the eyewear device 7002 to retain its desired functionality. For example, the wearable accessory device can allow components that would otherwise be included on an eyewear device 7002 to be included in the wearable accessory device and/or intermediary processing device, thereby shifting a weight load from the user's head and neck to one or more other portions of the user's body. In some embodiments, the intermediary processing device has a larger surface area over which to diffuse and disperse heat to the ambient environment. Thus, the intermediary processing device can allow for greater battery and computation capacity than might otherwise have been possible on the eyewear device 7002, standing alone. Because weight carried in the wearable accessory device can be less invasive to a user than weight carried in the eyewear device 7002, a user may tolerate wearing a lighter eyewear device and carrying or wearing the paired device for greater lengths of time than the user would tolerate wearing a heavier eyewear device standing alone, thereby enabling an AR environment to be incorporated more fully into a user's day-to-day activities.

AR systems can include various types of computer vision components and subsystems. For example, the AR system 7000 and/or the VR system 7010 can include one or more optical sensors such as two-dimensional (2D) or 3D cameras, time-of-flight depth sensors, single-beam or sweeping laser rangefinders, 3D LiDAR sensors, and/or any other suitable type or form of optical sensor. An AR system can process data from one or more of these sensors to identify a location of a user and/or aspects of the use's real-world physical surroundings, including the locations of real-world objects within the real-world physical surroundings. In some embodiments, the methods described herein are used to map the real world, to provide a user with context about real-world surroundings, and/or to generate digital twins (e.g., interactable virtual objects), among a variety of other functions. For example, FIGS. 7B-1 and 7B-2 show the VR system 7010 having cameras 7039A to 7039D, which can be used to provide depth information for creating a voxel field and a 2D mesh to provide object information to the user to avoid collisions.

In some embodiments, the AR system 7000 and/or the VR system 7010 can include haptic (tactile) feedback systems, which may be incorporated into headwear, gloves, body suits, handheld controllers, environmental devices (e.g., chairs or floormats), and/or any other type of device or system, such as the wearable devices discussed herein. The haptic feedback systems may provide various types of cutaneous feedback, including vibration, force, traction, shear, texture, and/or temperature. The haptic feedback systems may also provide various types of kinesthetic feedback, such as motion and compliance. The haptic feedback may be implemented using motors, piezoelectric actuators, fluidic systems, and/or a variety of other types of feedback mechanisms. The haptic feedback systems may be implemented independently of other AR devices, within other AR devices, and/or in conjunction with other AR devices (e.g., the haptic feedback system described with respect to FIGS. 9A to 9C).

In some embodiments of an AR system, such as the AR system 7000 and/or the VR system 7010, ambient light (e.g., a live feed of the surrounding environment that a user would normally see) can be passed through a display element of a respective head-wearable device presenting aspects of the AR system. In some embodiments, ambient light can be passed through a portion less than all, of an AR environment presented within a user's field of view (e.g., a portion of the AR environment co-located with a physical object in the user's real-world environment that is within a designated boundary (e.g., a guardian boundary) configured to be used by the user while they are interacting with the AR environment). For example, a visual user interface element (e.g., a notification user interface element) can be presented at the head-wearable device, and an amount of ambient light (e.g., 15% to 50% of the ambient light) can be passed through the user interface element, such that the user can distinguish at least a portion of the physical environment over which the user interface element is being displayed.

Example Handheld Intermediary Processing Devices

Figure 8A:
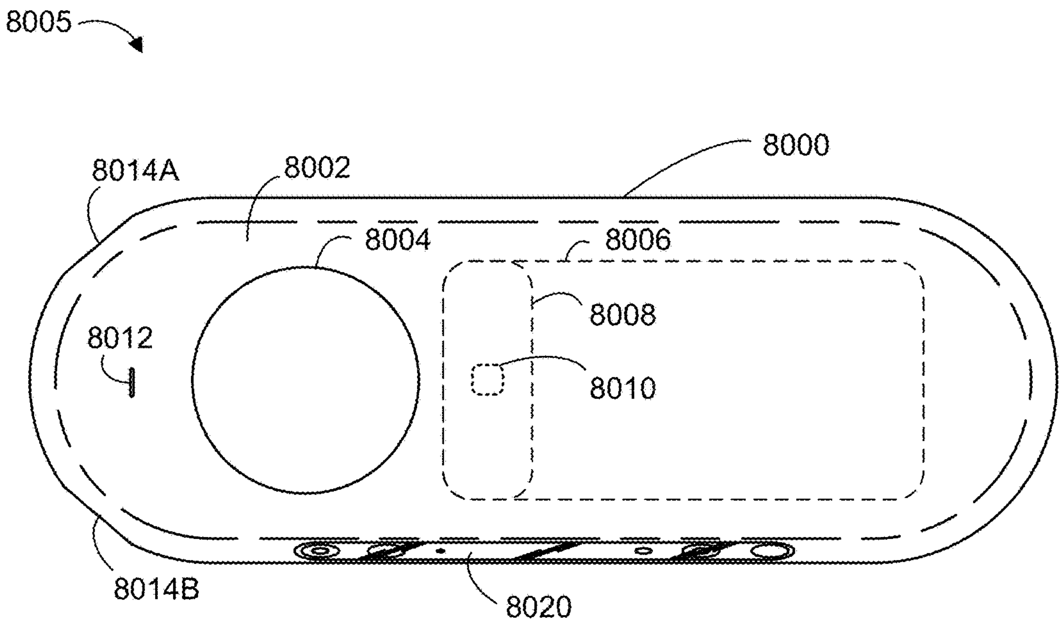
FIGS. 8A-8B illustrate an example handheld device in accordance with some embodiments.
Figure 8A:
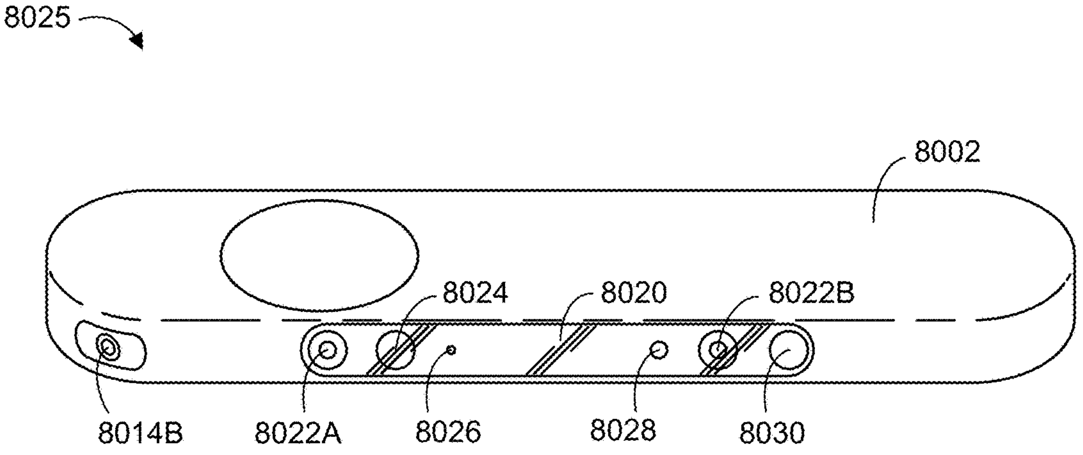
Figure 8B:
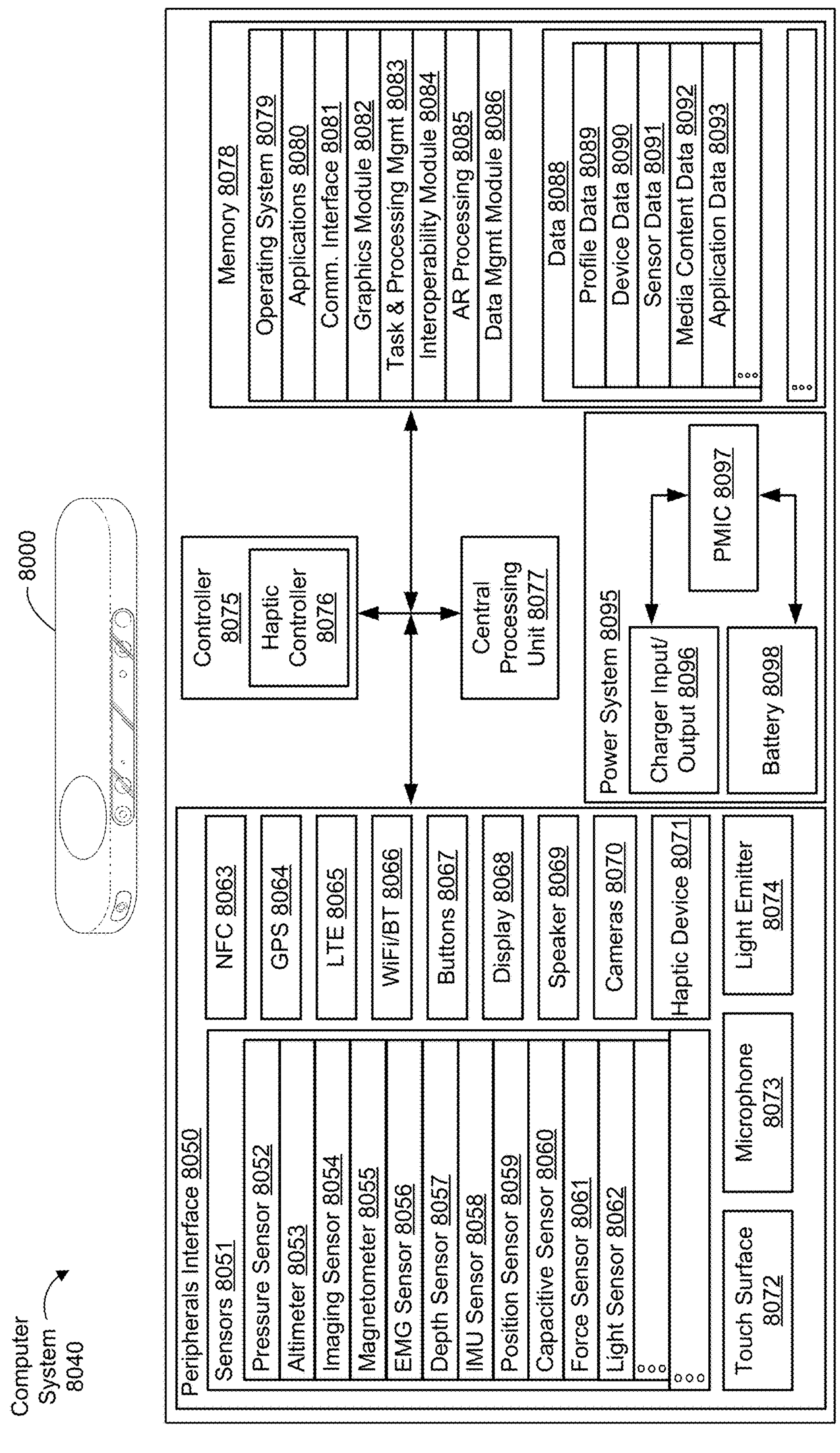

FIGS. 8A and 8B illustrate an example handheld intermediary processing device (HIPD) 8000, in accordance with some embodiments. The HIPD 8000 is an instance of the intermediary device described herein, such that the HIPD 8000 should be understood to have the features described with respect to any intermediary device defined above or otherwise described herein, and vice versa. FIG. 8A shows a top view 8005 and a side view 8025 of the HIPD 8000. The HIPD 8000 is configured to communicatively couple with one or more wearable devices (or other electronic devices) associated with a user. For example, the HIPD 8000 is configured to communicatively couple with a user's wrist-wearable device 6000 (or components thereof, such as the watch body 6020 and the wearable band 6010), AR system 7000, and/or VR headset 7010. The HIPD 8000 can be configured to be held by a user (e.g., as a handheld controller), carried on the user's person (e.g., in their pocket, in their bag), placed in proximity of the user (e.g., placed on their desk while seated at their desk, on a charging dock, etc.), and/or placed at or within a predetermined distance from a wearable device or other electronic device (e.g., where, in some embodiments, the predetermined distance is the maximum distance (e.g., 10 meters) at which the HIPD 8000 can successfully be communicatively coupled with an electronic device, such as a wearable device).

The HIPD 8000 can perform various functions independently and/or in conjunction with one or more wearable devices (e.g., wrist-wearable device 6000, AR system 7000, and/or VR headset 7010). The HIPD 8000 is configured to increase and/or improve the functionality of communicatively coupled devices, such as the wearable devices. The HIPD 8000 is configured to perform one or more functions or operations associated with interacting with user interfaces and applications of communicatively coupled devices, interacting with an AR environment, interacting with VR environment, and/or operating as a human-machine interface controller. Additionally, as will be described in more detail below, functionality and/or operations of the HIPD 8000 can include, without limitation, task offloading and/or handoffs; thermals offloading and/or handoffs; six degrees of freedom (6DoF) raycasting and/or gaming (e.g., using imaging devices or cameras 8014, which can be used for simultaneous localization and mapping (SLAM) and/or with other image processing techniques); portable charging; messaging; image capturing via one or more imaging devices or cameras 8022; sensing user input (e.g., sensing a touch on a touch input surface 8002); wireless communications and/or interlining (e.g., cellular, near field, Wi-Fi, personal area network); location determination; financial transactions; providing haptic feedback; alarms; notifications; biometric authentication; health monitoring; and sleep monitoring. The above-example functions can be executed independently in the HIPD 8000 and/or in communication between the HIPD 8000 and another wearable device described herein. In some embodiments, functions can be executed on the HIPD 8000 in conjunction with an AR environment. As the skilled artisan will appreciate upon reading the descriptions provided herein, the novel HIPD 8000 described herein can be used with any type of suitable AR environment.

While the HIPD 8000 is communicatively coupled with a wearable device and/or other electronic device, the HIPD 8000 is configured to perform one or more operations initiated at the wearable device and/or the other electronic device. In particular, one or more operations of the wearable device and/or the other electronic device can be offloaded to the HIPD 8000 to be performed. The HIPD 8000 performs the one or more operations of the wearable device and/or the other electronic device and provides to data corresponded to the completed operations to the wearable device and/or the other electronic device. For example, a user can initiate a video stream using AR system 7000 and back-end tasks associated with performing the video stream (e.g., video rendering) can be offloaded to the HIPD 8000, which the HIPD 8000 performs and provides corresponding data to the AR system 7000 to perform remaining front-end tasks associated with the video stream (e.g., presenting the rendered video data via a display of the AR system 7000). In this way, the HIPD 8000, which has more computational resources and greater thermal headroom than a wearable device, can perform computationally intensive tasks for the wearable device improving performance of an operation performed by the wearable device.

The HIPD 8000 includes a multi-touch input surface 8002 on a first side (e.g., a front surface) that is configured to detect one or more user inputs. In particular, the multi-touch input surface 8002 can detect single tap inputs, multi-tap inputs, swipe gestures and/or inputs, force-based and/or pressure-based touch inputs, held taps, and the like. The multi-touch input surface 8002 is configured to detect capacitive touch inputs and/or force (and/or pressure) touch inputs. The multi-touch input surface 8002 includes a touch-input surface 8004 defined by a surface depression, and a touch-input surface 8006 defined by a substantially planar portion. The touch-input surface 8004 can be disposed adjacent to the touch-input surface 8006. In some embodiments, the touch-input surface 8004 and the touch-input surface 8006 can be different dimensions, shapes, and/or cover different portions of the multi-touch input surface 8002. For example, the touch-input surface 8004 can be substantially circular and the touch-input surface 8006 is substantially rectangular. In some embodiments, the surface depression of the multi-touch input surface 8002 is configured to guide user handling of the HIPD 8000. In particular, the surface depression is configured such that the user holds the HIPD 8000 upright when held in a single hand (e.g., such that the using imaging devices or cameras 8014A and 8014B are pointed toward a ceiling or the sky). Additionally, the surface depression is configured such that the user's thumb rests within the touch-input surface 8004.

In some embodiments, the different touch-input surfaces include a plurality of touch-input zones. For example, the touch-input surface 8006 includes at least a touch-input zone 8008 within a touch-input zone 8006 and a touch-input zone 8010 within the touch-input zone 8008. In some embodiments, one or more of the touch-input zones are optional and/or user defined (e.g., a user can specific a touch-input zone based on their preferences). In some embodiments, each touch-input surface and/or touch-input zone is associated with a predetermined set of commands. For example, a user input detected within the touch-input zone 8008 causes the HIPD 8000 to perform a first command and a user input detected within the touch-input zone 8006 causes the HIPD 8000 to perform a second command, distinct from the first. In some embodiments, different touch-input surfaces and/or touch-input zones are configured to detect one or more types of user inputs. The different touch-input surfaces and/or touch-input zones can be configured to detect the same or distinct types of user inputs. For example, the touch-input zone 8008 can be configured to detect force touch inputs (e.g., a magnitude at which the user presses down) and capacitive touch inputs, and the touch-input zone 8006 can be configured to detect capacitive touch inputs.

The HIPD 8000 includes one or more sensors 8051 for sensing data used in the performance of one or more operations and/or functions. For example, the HIPD 8000 can include an IMU sensor that is used in conjunction with cameras 8014 for 3D object manipulation (e.g., enlarging, moving, or destroying an object) in an AR or VR environment. Non-limiting examples of the sensors 8051 included in the HIPD 8000 include a light sensor, a magnetometer, a depth sensor, a pressure sensor, and a force sensor. Additional examples of the sensors 8051 are provided below in reference to FIG. 8B.

The HIPD 8000 can include one or more light indicators 8012 to provide one or more notifications to the user. In some embodiments, the light indicators are LEDs or other types of illumination devices. The light indicators 8012 can operate as a privacy light to notify the user and/or others near the user that an imaging device and/or microphone are active. In some embodiments, a light indicator is positioned adjacent to one or more touch-input surfaces. For example, a light indicator can be positioned around the touch-input surface 8004. The light indicators can be illuminated in different colors and/or patterns to provide the user with one or more notifications and/or information about the device. For example, a light indicator positioned around the touch-input surface 8004 can flash when the user receives a notification (e.g., a message), change red when the HIPD 8000 is out of power, operate as a progress bar (e.g., a light ring that is closed when a task is completed (e.g., 0% to 100%)), operates as a volume indicator, etc.

In some embodiments, the HIPD 8000 includes one or more additional sensors on another surface. For example, as shown FIG. 8A, HIPD 8000 includes a set of one or more sensors (e.g., sensor set 8020) on an edge of the HIPD 8000. The sensor set 8020, when positioned on an edge of the of the HIPD 8000, can be pe positioned at a predetermined tilt angle (e.g., 26 degrees), which allows the sensor set 8020 to be angled toward the user when placed on a desk or other flat surface. Alternatively, in some embodiments, the sensor set 8020 is positioned on a surface opposite the multi-touch input surface 8002 (e.g., a back surface). The one or more sensors of the sensor set 8020 are discussed in detail below.

The side view 8025 of the HIPD 8000 shows the sensor set 8020 and camera 8014B. The sensor set 8020 includes one or more cameras 8022A and 8022B, a depth projector 8024, an ambient light sensor 8028, and a depth receiver 8030. In some embodiments, the sensor set 8020 includes a light indicator 8026. The light indicator 8026 can operate as a privacy indicator to let the user and/or those around them know that a camera and/or microphone is active. The sensor set 8020 is configured to capture a user's facial expression such that the user can puppet a custom avatar (e.g., showing emotions, such as smiles and/or laughter on the avatar or a digital representation of the user). The sensor set 8020 can be configured as a side stereo RGB system, a rear indirect Time-of-Flight (iToF) system, or a rear stereo RGB system. As the skilled artisan will appreciate upon reading the descriptions provided herein, the HIPD 8000 described herein can use different sensor set 8020 configurations and/or sensor set 8020 placements.

In some embodiments, the HIPD 8000 includes one or more haptic devices 8071 (e.g., a vibratory haptic actuator) that are configured to provide haptic feedback (e.g., kinesthetic sensation). The sensors 8051, and/or the haptic devices 8071 can be configured to operate in conjunction with multiple applications and/or communicatively coupled devices including, without limitation, wearable devices, health monitoring applications, social media applications, game applications, and AR applications (e.g., the applications associated with artificial reality).

The HIPD 8000 is configured to operate without a display. However, in optional embodiments, the HIPD 8000 can include a display 8068 (FIG. 8B). The HIPD 8000 can also include one or more optional peripheral buttons 8067 (FIG. 8B). For example, the peripheral buttons 8067 can be used to turn on or turn off the HIPD 8000. Further, the HIPD 8000 housing can be formed of polymers and/or elastomer elastomers. The HIPD 8000 can be configured to have a non-slip surface to allow the HIPD 8000 to be placed on a surface without requiring a user to watch over the HIPD 8000. In other words, the HIPD 8000 is designed such that it would not easily slide off surfaces. In some embodiments, the HIPD 8000 includes one or magnets to couple the HIPD 8000 to another surface. This allows the user to mount the HIPD 8000 to different surfaces and provide the user with greater flexibility in use of the HIPD 8000.

As described above, the HIPD 8000 can distribute and/or provide instructions for performing the one or more tasks at the HIPD 8000 and/or a communicatively coupled device.

For example, the HIPD 8000 can identify one or more back-end tasks to be performed by the HIPD 8000 and one or more front-end tasks to be performed by a communicatively coupled device. While the HIPD 8000 is configured to offload and/or handoff tasks of a communicatively coupled device, the HIPD 8000 can perform both back-end and front-end tasks (e.g., via one or more processors, such as CPU 8077; FIG. 8B). The HIPD 8000 can, without limitation, be used to perform augmenting calling (e.g., receiving and/or sending 3D or 2.5D live volumetric calls, live digital human representation calls, and/or avatar calls), discreet messaging, 6DoF portrait/landscape gaming, AR/VR object manipulation, AR/VR content display (e.g., presenting content via a virtual display), and/or other AR/VR interactions. The HIPD 8000 can perform the above operations alone or in conjunction with a wearable device (or other communicatively coupled electronic device).

FIG. 8B shows block diagrams of a computing system 8040 of the HIPD 8000, in accordance with some embodiments. The HIPD 8000, described in detail above, can include one or more components shown in HIPD computing system 8040. The HIPD 8000 will be understood to include the components shown and described below for the HIPD computing system 8040. In some embodiments, all or a substantial portion of the components of the HIPD computing system 8040 are included in a single integrated circuit. Alternatively, in some embodiments, components of the HIPD computing system 8040 are included in a plurality of integrated circuits that are communicatively coupled.

The HIPD computing system 8040 can include a processor (e.g., a CPU 8077, a GPU, and/or a CPU with integrated graphics), a controller 8075, a peripherals interface 8050 that includes one or more sensors 8051 and other peripheral devices, a power source (e.g., a power system 8095), and memory (e.g., a memory 8078) that includes an operating system (e.g., an operating system 8079), data (e.g., data 8088), one or more applications (e.g., applications 8080), and one or more modules (e.g., a communications interface module 8081, a graphics module 8082, a task and processing management module 8083, an interoperability module 8084, an AR processing module 8085, and/or a data management module 8086). The HIPD computing system 8040 further includes a power system 8095 that includes a charger input and output 8096, a PMIC 8097, and a battery 8098, all of which are defined above.

In some embodiments, the peripherals interface 8050 can include one or more sensors 8051. The sensors 8051 can include analogous sensors to those described above in reference to FIG. 6B. For example, the sensors 8051 can include imaging sensors 8054, (optional) EMG sensors 8056, IMU sensors 8058, and capacitive sensors 8060. In some embodiments, the sensors 8051 can include one or more pressure sensors 8052 for sensing pressure data, an altimeter 8053 for sensing an altitude of the HIPD 8000, a magnetometer 8055 for sensing a magnetic field, a depth sensor 8057 (or a time-of flight sensor) for determining a difference between the camera and the subject of an image, a position sensor 8059 (e.g., a flexible position sensor) for sensing a relative displacement or position change of a portion of the HIPD 8000, a force sensor 8061 for sensing a force applied to a portion of the HIPD 8000, and a light sensor 8062 (e.g., an ambient light sensor) for detecting an amount of lighting. The sensors 8051 can include one or more sensors not shown in FIG. 8B.

Analogous to the peripherals described above in reference to FIG. 8B, the peripherals interface 8050 can also include an NFC component 8063, a GPS component 8064, an LTE component 8065, a Wi-Fi and/or Bluetooth communication component 8066, a speaker 8069, a haptic device 8071, and a microphone 8073. As described above in reference to FIG. 8A, the HIPD 8000 can optionally include a display 8068 and/or one or more buttons 8067. The peripherals interface 8050 can further include one or more cameras 8070, touch surfaces 8072, and/or one or more light emitters 8074. The multi-touch input surface 8002 described above in reference to FIG. 8A is an example of touch surface 8072. The light emitters 8074 can be one or more LEDs, lasers, etcetera, and can be used to project or present information to a user. For example, the light emitters 8074 can include light indicators 8012 and 8026 described above in reference to FIG. 8A. The cameras 8070 (e.g., cameras 8014 and 8022 described above in FIG. 8A) can include one or more wide-angle cameras, fish-eye cameras, spherical cameras, compound eye cameras (e.g., stereo and multi cameras), depth cameras, RGB cameras, ToF cameras, RGB-D cameras (depth and ToF cameras), and/or other available cameras. Cameras 8070 can be used for SLAM; 6 DoF ray casting, gaming, object manipulation, and/or other rendering; facial recognition and facial expression recognition, etc.

Similar to the watch body computing system 6060 and the watch band computing system 6030 described above in reference to FIG. 6B, the HIPD computing system 8040 can include one or more haptic controllers 8076 and associated componentry (e.g., haptic devices 8071) for providing haptic events at the HIPD 8000.

Memory 8078 can include high-speed random-access memory and/or non-volatile memory, such as one or more magnetic disk storage devices, flash memory devices, or other non-volatile solid-state memory devices. Access to the memory 8078 by other components of the HIPD 8000, such as the one or more processors and the peripherals interface 8050, can be controlled by a memory controller of the controllers 8075.

In some embodiments, software components stored in the memory 8078 include one or more operating systems 8079, one or more applications 8080, one or more communication interface modules 8081, one or more graphics modules 8082, and one or more data management modules 8086, which are analogous to the software components described above in reference to FIG. 6B.

In some embodiments, software components stored in the memory 8078 include a task and processing management module 8083 for identifying one or more front-end and back-end tasks associated with an operation performed by the user, performing one or more front-end and/or back-end tasks, and/or providing instructions to one or more communicatively coupled devices that cause performance of the one or more front-end and/or back-end tasks. In some embodiments, the task and processing management module 8083 uses data 8088 (e.g., device data 8090) to distribute the one or more front-end and/or back-end tasks based on communicatively coupled devices' computing resources, available power, thermal headroom, ongoing operations, and/or other factors. For example, the task and processing management module 8083 can cause the performance of one or more back-end tasks (of an operation performed at communicatively coupled AR system 7000) at the HIPD 8000 in accordance with a determination that the operation is utilizing a predetermined amount (e.g., at least 70%) of computing resources available at the AR system 7000.

In some embodiments, software components stored in the memory 8078 include an interoperability module 8084 for exchanging and utilizing information received and/or provided to distinct communicatively coupled devices. The interoperability module 8084 allows for different systems, devices, and/or applications to connect and communicate in a coordinated way without user input. In some embodiments, software components stored in the memory 8078 include an AR module 8085 that is configured to process signals based at least on sensor data for use in an AR and/or VR environment. For example, the AR module 8085 can be used for 3D object manipulation, gesture recognition, facial and facial expression, and/or recognition.

The memory 8078 can also include data 8088, including structured data. In some embodiments, the data 8088 includes profile data 8089, device data 8090 (including device data of one or more devices communicatively coupled with the HIPD 8000, such as device type, hardware, software, and/or configurations), sensor data 8091, media content data 8092, and application data 8093.

It should be appreciated that the HIPD computing system 8040 is an example of a computing system within the HIPD 8000, and that the HIPD 8000 can have more or fewer components than shown in the HIPD computing system 8040, combine two or more components, and/or have a different configuration and/or arrangement of the components. The various components shown in HIPD computing system 8040 are implemented in hardware, software, firmware, or a combination thereof, including one or more signal processing and/or application-specific integrated circuits.

The techniques described above in FIGS. 8A and 8B can be used with any device used as a human-machine interface controller. In some embodiments, an HIPD 8000 can be used in conjunction with one or more wearable device such as a head-wearable device (e.g., AR system 7000 and VR system 7010) and/or a wrist-wearable device 6000 (or components thereof). In some embodiments, an HIPD 8000 is used in conjunction with a wearable garment, such as the wearable gloves of FIGS. 11A to 11C. Having thus described example HIPD 8000, attention will now be turned to example feedback devices, such as device 9000.

Example Feedback Devices

Figure 9A:
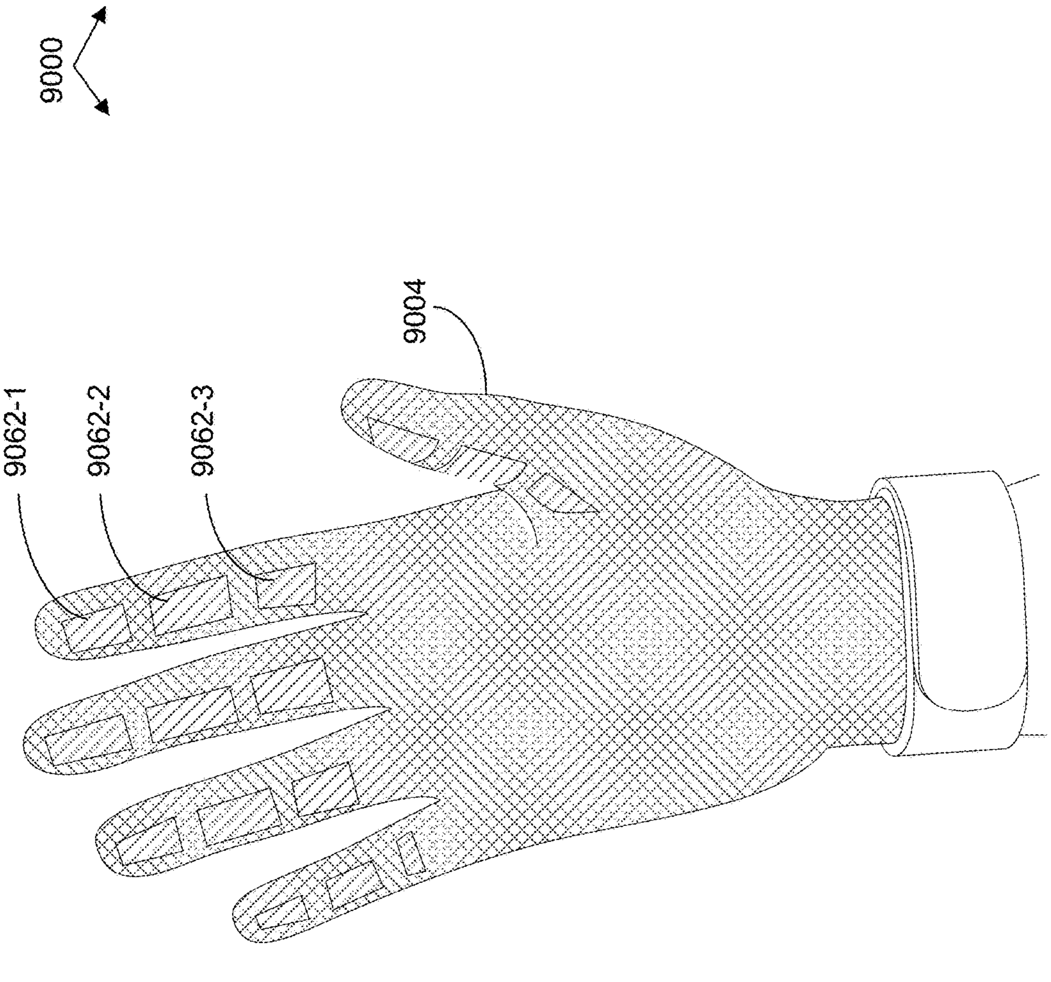
FIGS. 9A-9C illustrate example wearable gloves in accordance with some embodiments.
Figure 9B:
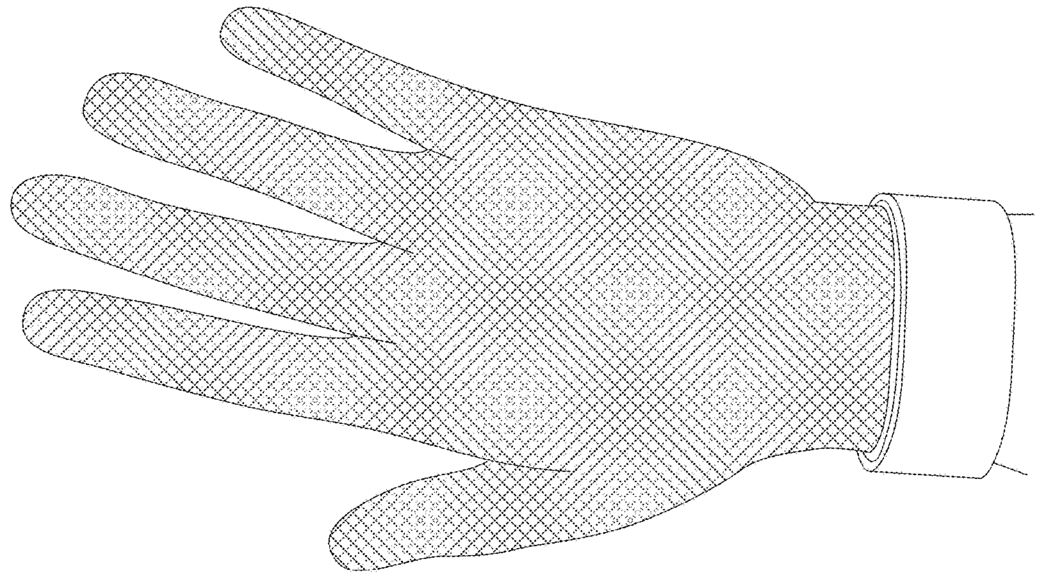

FIGS. 9A and 9B show example haptic feedback systems (e.g., hand-wearable devices) for providing feedback to a user regarding the user's interactions with a computing system (e.g., an AR environment presented by the AR system 7000 or the VR system 7010). In some embodiments, a computing system (e.g., the AR system 5000*d*) may also provide feedback to one or more users based on an action that was performed within the computing system and/or an interaction provided by the AR system (e.g., which may be based on instructions that are executed in conjunction with performing operations of an application of the computing system). Such feedback may include visual and/or audio feedback and may also include haptic feedback provided by a haptic assembly, such as one or more haptic assemblies 9062 of the device 9000 (e.g., haptic assemblies 9062-1, 9062-2, and 9062-3). For example, the haptic feedback may prevent (or, at a minimum, hinder/resist movement of) one or more fingers of a user from bending past a certain point to simulate the sensation of touching a solid coffee mug. In actuating such haptic effects, the device 9000 can change (either directly or indirectly) a pressurized state of one or more of the haptic assemblies 9062.

Each of the haptic assemblies 9062 includes a mechanism that, at a minimum, provides resistance when the respective haptic assembly 9062 is transitioned from a first pressurized state (e.g., atmospheric pressure or deflated) to a second pressurized state (e.g., inflated to a threshold pressure). Structures of haptic assemblies 9062 can be integrated into various devices configured to be in contact or proximity to a user's skin, including, but not limited to, devices such as glove worn devices, body worn clothing device, and headset devices.

As noted above, the haptic assemblies 9062 described herein can be configured to transition between a first pressurized state and a second pressurized state to provide haptic feedback to the user. Due to the ever-changing nature of artificial reality, the haptic assemblies 9062 may be required to transition between the two states hundreds, or perhaps thousands, of times during a single use. Thus, the haptic assemblies 9062 described herein are durable and designed to quickly transition from state to state. To provide some context, in the first pressurized state, the haptic assemblies 9062 do not impede free movement of a portion of the wearer's body. For example, one or more haptic assemblies 9062 incorporated into a glove are made from flexible materials that do not impede free movement of the wearer's hand and fingers (e.g., an electrostatic-zipping actuator). The haptic assemblies 9062 are configured to conform to a shape of the portion of the wearer's body when in the first pressurized state. However, once in the second pressurized state, the haptic assemblies 9062 can be configured to restrict and/or impede free movement of the portion of the wearer's body (e.g., appendages of the user's hand). For example, the respective haptic assembly 9062 (or multiple respective haptic assemblies) can restrict movement of a wearer's finger (e.g., prevent the finger from curling or extending) when the haptic assembly 9062 is in the second pressurized state. Moreover, once in the second pressurized state, the haptic assemblies 9062 may take different shapes, with some haptic assemblies 9062 configured to take a planar, rigid shape (e.g., flat and rigid), while some other haptic assemblies 9062 are configured to curve or bend, at least partially.

As a non-limiting example, the device 9000 includes a plurality of haptic devices (e.g., a pair of haptic gloves, and a haptics component of a wrist-wearable device (e.g., any of the wrist-wearable devices described with respect to FIGS. 6A and 6B)), each of which can include a garment component (e.g., a garment 9004) and one or more haptic assemblies coupled (e.g., physically coupled) to the garment component. For example, each of the haptic assemblies 9062-1, 9062-2, 9062-3, through 9062-N are physically coupled to the garment 9004 are configured to contact respective phalanges of a user's thumb and fingers. As explained above, the haptic assemblies 9062 are configured to provide haptic simulations to a wearer of the device 9000. The garment 9004 of each device 9000 can be one of various articles of clothing (e.g., gloves, socks, shirts, or pants). Thus, a user may wear multiple devices 9000 that are each configured to provide haptic stimulations to respective parts of the body where the devices 9000 are being worn.

Figure 9C:
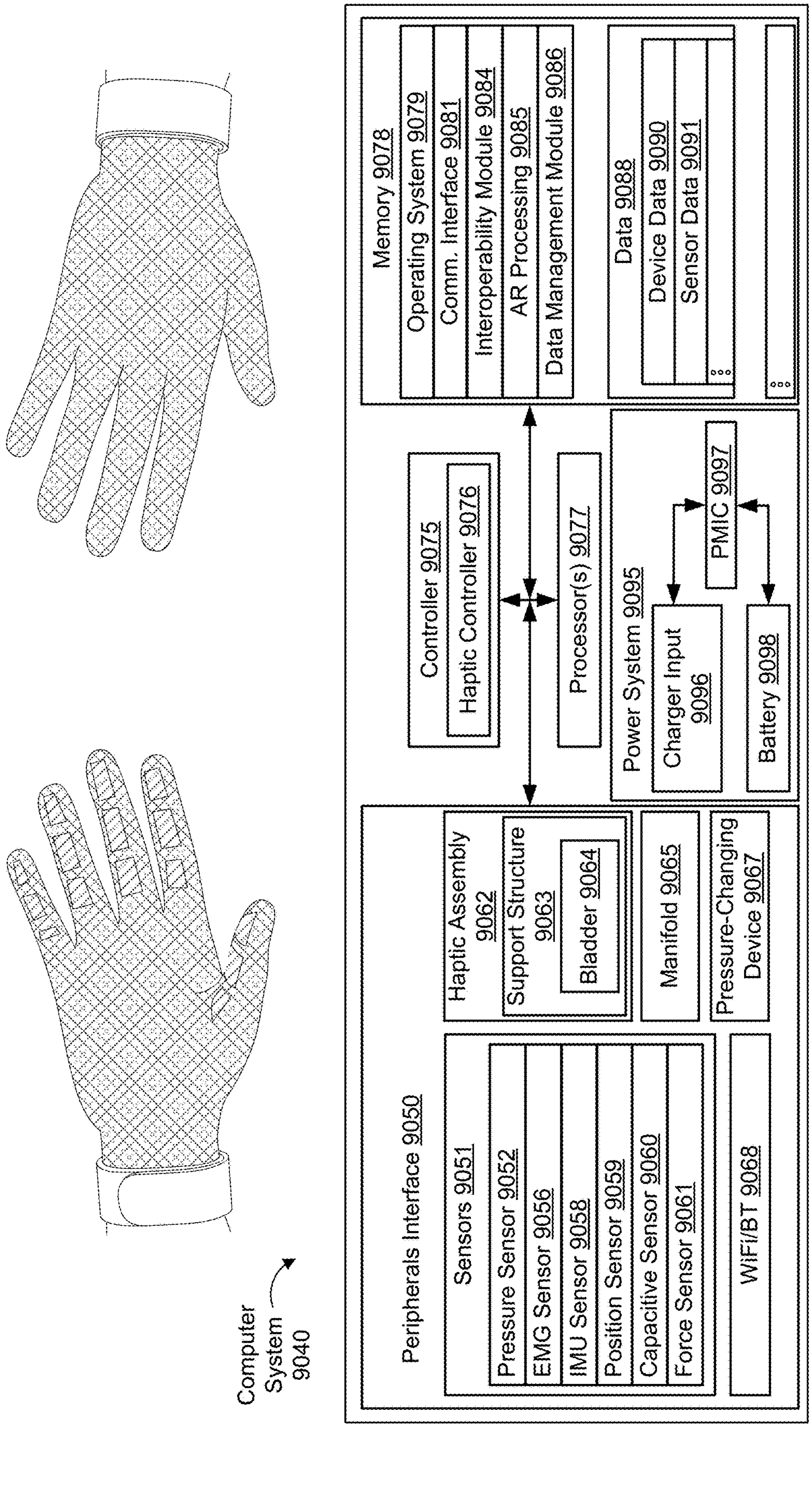

FIG. 9C shows block diagrams of a computing system 9040 of the device 9000, in accordance with some embodiments. The computing system 9040 can include one or more peripheral interfaces 9050, one or more power systems 9095, one or more controllers 9075 (including one or more haptic controllers 9076), one or more processors 9077 (as defined above, including any of the examples provided), and memory 9078, which can all be in electronic communication with each other. For example, the one or more processors 9077 can be configured to execute instructions stored in the memory 9078, which can cause a controller of the one or more controllers 9075 to cause operations to be performed at one or more peripheral devices of the peripherals interface 9050. In some embodiments, each operation described can occur based on electrical power provided by the power system 9095. The power system 9095 includes a charger input 9096, a PMIC 9097, and a battery 9098.

In some embodiments, the peripherals interface 9050 can include one or more devices configured to be part of the computing system 9040, many of which have been defined above and/or described with respect to wrist-wearable devices shown in FIGS. 6A and 6B. For example, the peripherals interface 9050 can include one or more sensors 9051. Some example sensors include: one or more pressure sensors 9052, one or more EMG sensors 9056, one or more IMU sensors 9058, one or more position sensors 9059, one or more capacitive sensors 9060, one or more force sensors 9061, and/or any other types of sensors defined above or described with respect to any other embodiments discussed herein.

In some embodiments, the peripherals interface can include one or more additional peripheral devices, including one or more Wi-Fi and/or Bluetooth devices 9068; one or more haptic assemblies 9062; one or more support structures 9063 (which can include one or more bladders 9064; one or more manifolds 9065; one or more pressure-changing devices 9067; and/or any other types of peripheral devices defined above or described with respect to any other embodiments discussed herein).

In some embodiments, each haptic assembly 9062 includes a support structure 9063, and at least one bladder 9064. The bladder 9064 (e.g., a membrane) is a sealed, inflatable pocket made from a durable and puncture resistance material, such as thermoplastic polyurethane (TPU), a flexible polymer, or the like. The bladder 9064 contains a medium (e.g., a fluid such as air, inert gas, or even a liquid) that can be added to or removed from the bladder 9064 to change a pressure (e.g., fluid pressure) inside the bladder 9064. The support structure 9063 is made from a material that is stronger and stiffer than the material of the bladder 9064. A respective support structure 9063 coupled to a respective bladder 9064 is configured to reinforce the respective bladder 9064 as the respective bladder changes shape and size due to changes in pressure (e.g., fluid pressure) inside the bladder.

The device 9000 also includes a haptic controller 9076 and a pressure-changing device 9067. In some embodiments, the haptic controller 9076 is part of the computer system 9040 (e.g., in electronic communication with one or more processors 9077 of the computer system 9040). The haptic controller 9076 is configured to control operation of the pressure-changing device 9067, and in turn operation of the device 9000. For example, the controller 9076 sends one or more signals to the pressure-changing device 9067 to activate the pressure-changing device 9067 (e.g., turn it on and off). The one or more signals may specify a desired pressure (e.g., pounds-per-square inch) to be output by the pressure-changing device 9067. Generation of the one or more signals, and in turn the pressure output by the pressure-changing device 9067, may be based on information collected by the sensors in FIGS. 5A and 5B. For example, the one or more signals may cause the pressure-changing device 9067 to increase the pressure (e.g., fluid pressure) inside a haptic assembly 9062 at a first time, based on the information collected by the sensors in FIGS. 5A and 5B (e.g., the user makes contact with an artificial coffee mug). Then, the controller may send one or more additional signals to the pressure-changing device 9067 that cause the pressure-changing device 9067 to further increase the pressure inside the haptic assembly 9062 at a second time after the first time, based on additional information collected by the sensors 9051. Further, the one or more signals may cause the pressure-changing device 9067 to inflate one or more bladders 9064 in a device 9000-A, while one or more bladders 9064 in a device 9000-B remain unchanged. Additionally, the one or more signals may cause the pressure-changing device 9067 to inflate one or more bladders 9064 in a device 9000-A to a first pressure and inflate one or more other bladders 9064 in the device 9000-A to a second pressure different from the first pressure. Depending on the number of devices 9000 serviced by the pressure-changing device 9067, and the number of bladders therein, many different inflation configurations can be achieved through the one or more signals and the examples above are not meant to be limiting.

The device 9000 may include an optional manifold 9065 between the pressure-changing device 9067 and the devices 9000. The manifold 9065 may include one or more valves (not shown) that pneumatically couple each of the haptic assemblies 9062 with the pressure-changing device 9067 via tubing. In some embodiments, the manifold 9065 is in communication with the controller 9075, and the controller 9075 controls the one or more valves of the manifold 9065 (e.g., the controller generates one or more control signals). The manifold 9065 is configured to switchably couple the pressure-changing device 9067 with one or more haptic assemblies 9062 of the same or different devices 9000 based on one or more control signals from the controller 9075. In some embodiments, instead of using the manifold 9065 to pneumatically couple the pressure-changing device 9067 with the haptic assemblies 9062, the device 9000 may include multiple pressure-changing devices 9067, where each pressure-changing device 9067 is pneumatically coupled directly with a single (or multiple) haptic assembly 9062. In some embodiments, the pressure-changing device 9067 and the optional manifold 9065 are configured as part of one or more of the devices 9000 (not illustrated) while, in other embodiments, the pressure-changing device 9067 and the optional manifold 9065 are configured as external to the device 9000. A single pressure-changing device 9067 may be shared by multiple devices 9000.

In some embodiments, the pressure-changing device 9067 is a pneumatic device, hydraulic device, a pneudraulic device, or some other device capable of adding and removing a medium (e.g., fluid, liquid, gas) from the one or more haptic assemblies 9062.

The devices shown in FIGS. 9A to 9C may be coupled via a wired connection (e.g., via busing). Alternatively, one or more of the devices shown in FIGS. 9A to 9C may be wirelessly connected (e.g., via short-range communication signals).

The memory 9078 includes instructions and data, some or all of which may be stored as non-transitory computer-readable storage media within the memory 9078. For example, the memory 9078 can include one or more operating systems 9079; one or more communication interface applications 9081; one or more interoperability modules 9084; one or more AR processing applications 9085; one or more data management modules 9086; and/or any other types of data defined above or described with respect to any other embodiments discussed herein.

The memory 9078 also includes data 9088 which can be used in conjunction with one or more of the applications discussed above. The data 9088 can include: device data 9090; sensor data 9091; and/or any other types of data defined above or described with respect to any other embodiments discussed herein.

Having thus described system-block diagrams and then example devices, attention will now be directed to certain example embodiments.

Example Embodiments

Figure 10:
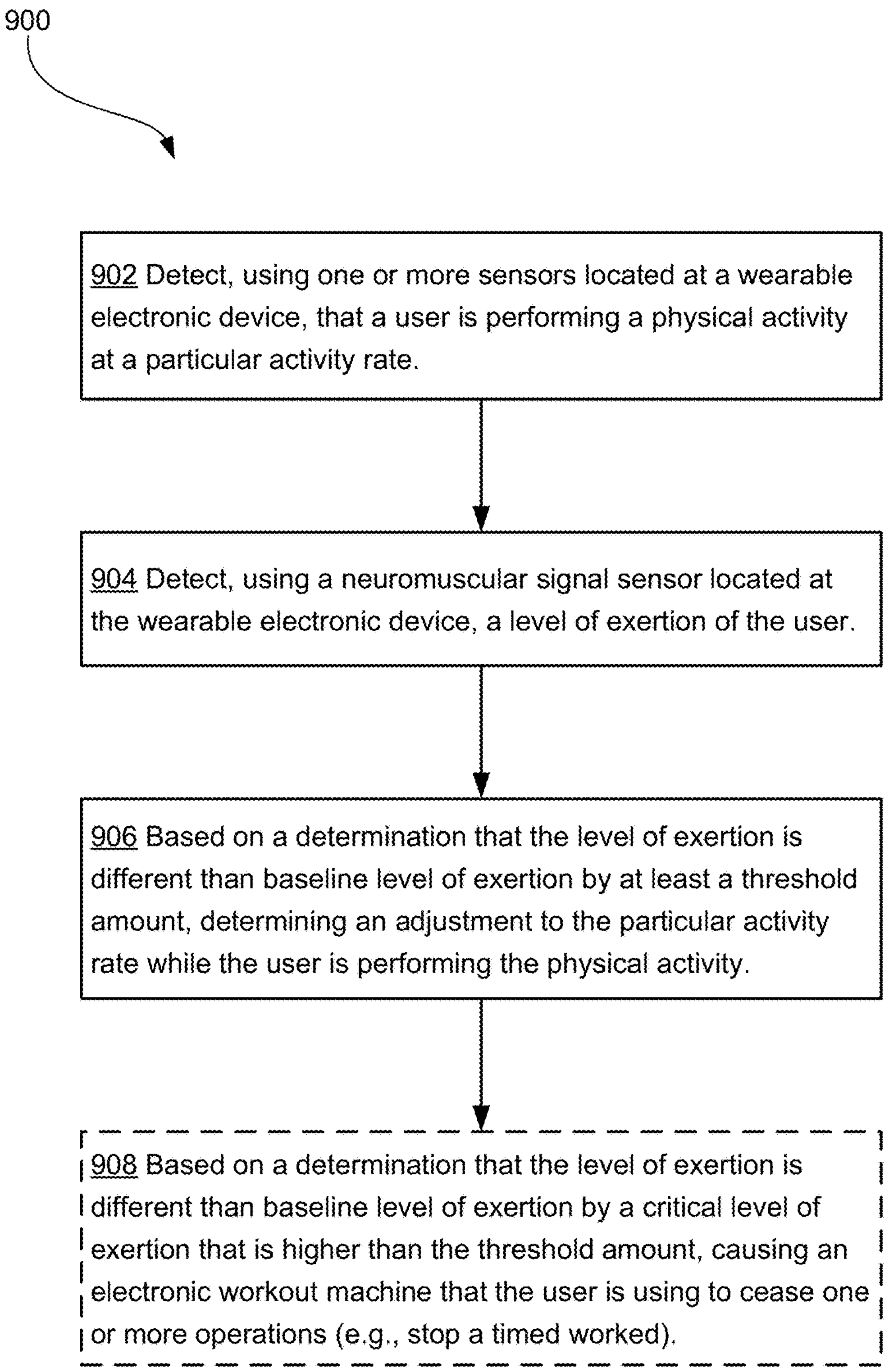
FIG. 10 illustrates a flow diagram of an example method of adaptive adjustment to a physical activity in accordance with some embodiments.

FIG. 10 shows a flow diagram of a method 900 for determining an adaptive adjustment to a physical activity being performed by a user wearing a wearable electronic device in accordance with some embodiments. The method 900 is performed at a computing system (e.g., a wearable device or intermediary device) having one or more processors and memory. In some embodiments, the memory stores one or more programs configured for execution by the one or more processors. At least some of the operations shown in FIG. 8 correspond to instructions stored in a computer memory or a computer-readable storage medium (e.g., the memory 6080 of the computer system 6060 or the wearable device 304). In some embodiments, the computing system is a wearable device, such as the wrist-wearable device 102. In some embodiments, the computing system is, or includes, an intermediary device such as a smartphone, personal computer, or video game console.

In some embodiments, some or all of the operations discussed with respect to the method 900 are performed in conjunction with detecting, using one or more sensors located at a wearable electronic device (e.g., a wrist-wearable device, an arm-wearable device, a leg-wearable device, a head-wearable device, and the like), that the user is performing a physical activity at a particular activity rate.

(A1) The method 900 includes detecting (902), using one or more sensors located at a wearable electronic device (e.g., the wrist-wearable device 102), that a user is performing a physical activity at a particular activity rate. For example, in FIG. 1A, the wrist-wearable device indicates, via the user interface 107, that the user 101 is performing bicep curls. The display 104 of the wrist-wearable device 102 is also indicating that the user 101 has a baseline level of exertion (via the exertion indicator 118). In some embodiments, the detection that the user is performing the physical activity is based on one or more neuromuscular-signal sensors (e.g., the neuromuscular-signal sensors 192), which can be the same neuromuscular-signal sensors described below with respect to other operations of the method 900. In some embodiments, the detecting is performed continuously (or periodically) while the user is performing the physical activity. In some embodiments, a first subset of the sensors are used continuously, and power is provided to other sensors based on the data detected by the first subset. For example, in FIG. 1B, the graph 193 indicates that the sensor channels 199-1 and 199-4 are being used to detect exertion of the user 101 while they are performing bicep curls.

The method 900 includes detecting (904), using a neuromuscular signal sensor (e.g., a biopotential signal, EMG sensor, which can include individual sensors channels (e.g., the sensor channels 199-1 and 199-4)) located at, and/or otherwise in communication with, the wearable electronic device, a level of exertion of the user.

The method 900 includes, based on (906) a determination that the level of exertion is different than baseline level of exertion by at least a threshold amount (e.g., a peak performance threshold value based on historical user data), determining an adjustment to the particular activity rate while the user is performing the physical activity (e.g., by adjusting a number of repetitions to be performed and/or a duration for performing the physical activity). For example, in FIG. 1C, the display 104 of the wrist-wearable device 102 includes user interface elements indicating that the user 101 has lower than normal exertion and suggests that the user perform more repetitions during the next set of the physical activity.

(A2) In some embodiments of A1, the method 900 includes, based on (908) a determination that the level of exertion is different than baseline level of exertion by a second level of exertion that is higher than the threshold amount, causing an electronic workout machine that the user is utilizing to cease one or more operations (e.g., stop a timed workout). For example, in FIG. 3H, the user interface element 364 indicates that the electronic workout machine 306 is being stopped based on the user having a level of exertion above a second level of exertion.

(A3) In some embodiments of A1 or A2, the method 900 includes, before determining that the level of exertion is different than the baseline level of exertion by at least the threshold amount: (i) detecting, using the neuromuscular-signal sensor, another level of exertion, separately from the detecting of the level of exertion, and (ii) based on determining that the other level of exertion is different than the baseline level of exertion by at least another threshold amount, causing a notification to be provided to the user. For example, in FIG. 3G, based on determining that the user's level of exertion is above a threshold level of exertion, the user interface presents a notification 350 that the user is performing the physical activity with a high level of exertion, and includes a selectable button 351 which allows the user to adjust the activity rate at the electronic workout machine 306.

In some embodiments, the other threshold amount is different than the baseline level of exertion by a lesser magnitude than the difference between the level of exertion and the baseline level of exertion. In some embodiments, the other threshold amount indicates that the user's level of exertion has been exceeding the baseline level of exertion for a shorter time period than is indicated by the level of exertion.

In some embodiments, the notification includes information about the level of exertion and/or adjustment information (e.g., "Detecting abnormally high muscle exertion"). In some embodiments, the notification is an audio notification provided via a speaker of the wearable electronic device. In some embodiments, the notification is presented via a display at the wearable electronic device. In some embodiments, the notification is presented at a head-worn device, distinct from the wearable electronic device. In some embodiments, the notification is presented at a workout device associated with the physical activity.

(A4) In some embodiments of A2 or A3, the notification is caused to be provided at an electronic workout device (e.g., an electronic fitness device), and the notification includes a selectable user interface element (e.g., including one or more selectable user interface elements to reduce the resistance, speed, number of repetitions, performance goal). In response to the user selecting the selectable user interface element, the electronic workout device is caused (e.g., by the wearable electronic device via electronic communication signals) to adjust the activity rate (e.g., via an actuation component, in real-time, on-the-fly, iteratively over discrete intervals). In some embodiments, the electronic workout device is in electronic communication with one or more of the user's wearable electronic devices.

(A5) In some embodiments of any of A2-A4, the method 900 includes, after determining that the other level of exertion is different than the baseline level of exertion by at least the other threshold amount, and before determining that the level of exertion is different than the baseline level of exertion by at least the threshold amount: (i) detecting, using the neuromuscular-signal sensor of the one or more sensors located at the wearable electronic device, yet another level of exertion, separately from the detecting of the level of exertion and the detecting of the other level of exertion, and (ii) based on determining that the additional level of exertion is different than the baseline level of exertion by yet another threshold amount, determining another adjustment to the particular activity rate, distinct from the adjustment. For example, in FIGS. 1F-1G, the wrist-wearable device 102 is presenting additional user interface elements, different than those shown in FIGS. 1C-1D, indicating that the user 101 is still performing the physical activity with a lower-than-normal level of exertion for the physical activity, and suggests another adjustment to the physical activity.

In some embodiments, the adjustment decreases the activity rate, and the other adjustment stops the physical activity from being performed.

(A6) In some embodiments of A5, (i) the other adjustment to the particular activity rate is a decrease in the activity rate, and (ii) the adjustment to the particular activity rate is a cessation of the physical activity (e.g., stopping the electronic workout machine 306 in FIG. 3H).

(A7) In some embodiments of any of A1-A6: (i) the user is performing the physical activity at an electronic workout device, and (ii) the determining that the level of exertion is different than the baseline level of exertion is further based on data from the electronic workout device (e.g., the electronic workout machine 306 in FIGS. 3A-3I). In some embodiments, the electronic workout device monitors, determines, senses, and/or controls, at least in part, one or more physiological indications of the user, which can be received by the wearable electronic device and/or another electronic device in communication with the wearable electronic device.

(A8) In some embodiments of A7, the data from the electronic workout device is generated by one or more of (i) a PPG sensing device, (ii) an electrocardiogram (ECG) sensing device, and (iii) a gyroscope sensor. In some embodiments, the wrist-wearable device can determine that sensors at the electronic workout device are more accurate for detecting a particular aspect of a physical activity being performed by a user, and can determine that the respective sensors of the electronic workout device should be used instead of the corresponding sensor of the wrist-wearable device.

(A9) In some embodiments of any of A1-A8: (i) the one or more sensors at the wearable electronic device includes an inertial measurement unit (IMU) sensor, and (ii) the determination that the level of exertion is different than the baseline level of exertion is further based on data from the IMU sensor. In some embodiments, the IMU sensor detects a difference in movement of the user's body, wherein the difference in movement corresponds to the physical activity being performed. For example, an IMU sensor can determine that a user is swinging back and forth as they are performing a set of bicep curls, or arching their back while they are performing a repetition of bench press, and indications of such movements can be used to determine a respective level of exertion.

(A10) In some embodiments of A9, the determination that the level of exertion is different than the baseline level of exertion further includes: (i) applying a first weighting to data from the neuromuscular-signal sensor, and (ii) applying a second weighting to the data from the IMU sensor. In some embodiments, the first weighting is based on whether the neuromuscular-signal sensor is detecting a primary muscle group for the physical activity being performed. For example, the neuromuscular-signal sensor channels 199-1 and 199-4 in FIG. 1B may correspond to one or more primary muscle groups of the bicep curls that the user 101 is performing, whereas the neuromuscular-signal sensor channels 199-2 and 199-4 in FIG. 3C may not correspond to any primary muscle groups of the row workout that the user is performing. And therefore, the neuromuscular-signal sensor channels 199-1 and 199-4 in FIG. 1B have a higher weighting, compared to the IMU sensors 194 than the neuromuscular-signal sensor channels 199-2 and 199-4 in FIG. 3C.

(A11) In some embodiments of A10, the first weighting and the second weighting are based on a calibration performed by the user before performing the physical activity at the activity rate. For example, the user can receive an indication to perform one or more motions of a respective activity before performing the physical activity (e.g., simulating the motion of a bicep curl by flexing an arm). In some embodiments, the calibration is performed without the user performing any gestures related to the actual physical activity (e.g., one or more of a soft, medium, and hard squeeze of the user's palm). For example, to calibrate the neuromuscular-signal sensors for the bicep curls shown in FIGS. 1A-1M, the wrist-wearable device 102 may instruct the user to perform bicep flexes with various amounts of intensity. In some embodiments, a notification is provided to the user that calibration is recommend, upon identification of the user performing a particular activity and without further instructions from the user, based on a set of predefined criteria. In some embodiments, the indication is provided to the user to calibrate one or more sensors of the wrist-wearable device based on an amount of time since the sensors were last calibrated. For example, the selectable button 214 in FIG. 2A indicates that re-calibration is recommended at the wrist-wearable device 102, based on there having been five weeks since the wrist-wearable device 102 was previously calibrated.

(A12) In some embodiments of any of A10-A11, the first weighting and the second weighting are based on a type of physical activity being performed. For example, a first weighting can be applied to the neuromuscular-signal sensor for a bench press lifting workout, and a different first weighting can be applied to the neuromuscular-signal sensor for a rowing workout, where the IMU sensor can be capable of a different relative accuracy. In some embodiments, the wrist-wearable device provides one or more indications to the user related to the accuracy of the wrist-wearable device for detecting particular aspects of a physical activity that the user is performing. For example, the repetition indicator 116 and the exertion indicator 118 of the wrist-wearable device 102 indicate the accuracy of the wrist-wearable device 102 for detecting the respective aspects of the physical activity being performed in each sequence.

(A13) In some embodiments of A12, the first weighting is higher than the second weighting in accordance with a determination that the neuromuscular-signal sensor is configured to sense (e.g., is located at) a primary muscle group associated with the physical activity (e.g., a muscle group that is actively performing a function of the physical activity). In some embodiments, a determination of which muscle group of a plurality of muscle groups are involved in a given physical activity corresponds to a neuromuscular-signal sensor channel having the highest level of activity during at least a portion of the physical activity (e.g., the sensor channel 199-1 in FIG. 1B can have the highest level of activity based on the sensor channel 199-1 being used to detect activity bicep muscles of the user 101). In some situations, there can be a plurality of sub-activities associated with a physical activity (e.g., pushing a barbell up and letting the barbell go back down).

(A14) In some embodiments of any of A1-A13, (i) the activity rate is a first activity rate, (ii) the level of exertion is lower than the baseline level of exertion by the threshold amount, and (iii) automatically (e.g., without further instruction from the user) increasing the first activity rate (e.g., the number of repetitions, a resistance associated with the physical activity, an activity time for the physical activity) to a second activity rate that is higher than the first activity rate. For example, if the electronic workout machine 306 detects that the user 301 is performing the rowing activity with a lower-than-normal level of exertion, the electronic workout machine 306 can be configured to automatically increase a level of resistance during performance of the rowing exercise.

(A15) In some embodiments of any of A1-A14: (i) the level of exertion is higher than the baseline level of exertion by the threshold amount, (ii) the adjusting causes an electronic workout device to stop operations (e.g., adjusting the physical activity rate to zero) causing the physical activity. In some embodiments, the stopping is automatic, without further instructions from the user.

(A16) In some embodiments of any of A1-A15, the user is wearing a head-wearable electronic device (e.g., the head-wearable device 304 shown in FIGS. 3A-3H). The head-wearable electronic device is presenting a user interface to the user, the user interface corresponding to an interactive workout (e.g., presenting timing instructions or repetition instructions corresponding to the physical activity being performed). For example, the user interface 310 includes various user interface elements related to the user's configuration of the physical activity to be performed. Based on the determination that the level of exertion is different than the baseline level of exertion by the threshold amount, the adjustment to the physical activity includes causing an adjustment to the user interface presented by the head-wearable electronic device. In some embodiments, a notification is provided to the user via the user interface that includes adjustment information, exertion information, recommendations, and/or adjustment mechanisms.

(A17) In some embodiments of any of A1-A16, the determination that the level of exertion is different than the baseline level of exertion by the threshold amount is further based on a number of identified repetitions of the physical activity that the user has performed at the activity rate. For example, the threshold amount can change to account for how tired the user should be based on the number of repetitions they have performed of the physical activity. In some embodiments, the baseline level is based on the number of repetitions and/or historical information about user repetitions for the physical activity and corresponding levels of exertion. For example, the levels of exertion detected in FIGS. 2A-2E can be compared to elevated levels of exertion based on the fact that the user has already performed another physical activity (e.g., bicep curls) as shown in FIGS. 1A-1M.

(A18) In some embodiments of any of A1-A17, the determination that the level of exertion is different than the baseline level of exertion by the threshold amount is further based on a number of identified repetitions that the user has performed of another physical activity, distinct from the physical activity currently being performed by the user. For example, the threshold amount for a jogging activity can be different if the user performed a lifting activity before performing the jogging activity. As another example, the level of exertion for comparing the exertion of the user 101 in FIGS. 2A-2E can be different based on the user 101 having performed one or more sets of bicep curls within a threshold amount of time before performing one or more repetitions of bench press.

(A19) In some embodiments of any of A1-A18, the threshold amount (and/or the baseline level) is based on a plurality of contextual criterion associated with the user. In some embodiments, the threshold amount (and/or the baseline level) is determined based on inputting one or more of the plurality of contextual criterion into a machine-learning model. In some embodiments, data from two or more neuromuscular-signal channels are used as feature vectors to train the machine-learning model. In some embodiments, one feature vector is EMG data, and another feature vector is IMU data. In some embodiments, one or more additional feature vectors are generated based on a combination of two or more different types of sensors. For example, the machine-learning model can include one or more feature vectors based on a combination of the neuromuscular-signal sensor channels 199-1 and 199-4 based on the user's performance of bicep curls in FIGS. 1A-1M.

(A20) In some embodiments of any of A1-A19, the neuromuscular-signal sensor corresponds to one of a plurality of neuromuscular-signal sensor channels (e.g., two to ten neuromuscular-signal sensor channels that can each include one or more electrodes for detecting neuromuscular-signal signals). Before detecting the level of exertion of the user, the neuromuscular-signal sensor is selected from the plurality of neuromuscular-signal sensor channels based on a determination of a type of activity being performed by the user (e.g., as a power-saving technique).

(A21) In some embodiments of any of A1-A20, the adjustment to the particular activity rate includes providing an indication to the user to stop performing the physical activity until the user's level of exertion has decreased toward a resting baseline level of exertion. In some embodiments of A20, the method 900 further includes, after the indication is provided to the user to stop performing the physical activity, detecting, using data from the neuromuscular-signal sensor, another level of exertion by the user. In some embodiments of A20, the method 900 includes, based on a determination that the other level of exertion is closer to the resting baseline level of exertion, causing an indication to be provided to the user to continue performing the physical activity. For example, after the user completes the first set of bicep curls shown in FIG. 1B, an indication can be provided to the user 101 that their level of exertion has gone down to a baseline level, and a corresponding indication can be provided indicating that they can perform another set of bicep curls based on having the baseline (e.g., resting) level of exertion.

(A22) In some embodiments of A21, the determination that the other level of exertion is closer to the resting baseline level of exertion incudes determining a signal-to-noise ratio of data detected by the neuromuscular-signal sensor. For example, the determination can include comparing data from the neuromuscular-signal sensor corresponding to the new level of exertion to a noise floor, the noise floor representing a sum of all of the noise sources and unwanted signals within a measurement system.

(A23) In some embodiments of any of A1-A22, the method 900 further includes, after detecting the level of exertion by the user: (i) detecting, using data from the neuromuscular-signal sensor, an involuntary movement of the user. In some embodiments, the system first determines, using the neuromuscular-signal sensor located at the wearable electronic device, a baseline level of muscle behaviors of the user, the baseline level of muscle behaviors including gestures capable of being recognized by a trained artificial-intelligence model (e.g., a machine-learning model, a neural network, a generative model).

Figure 11:
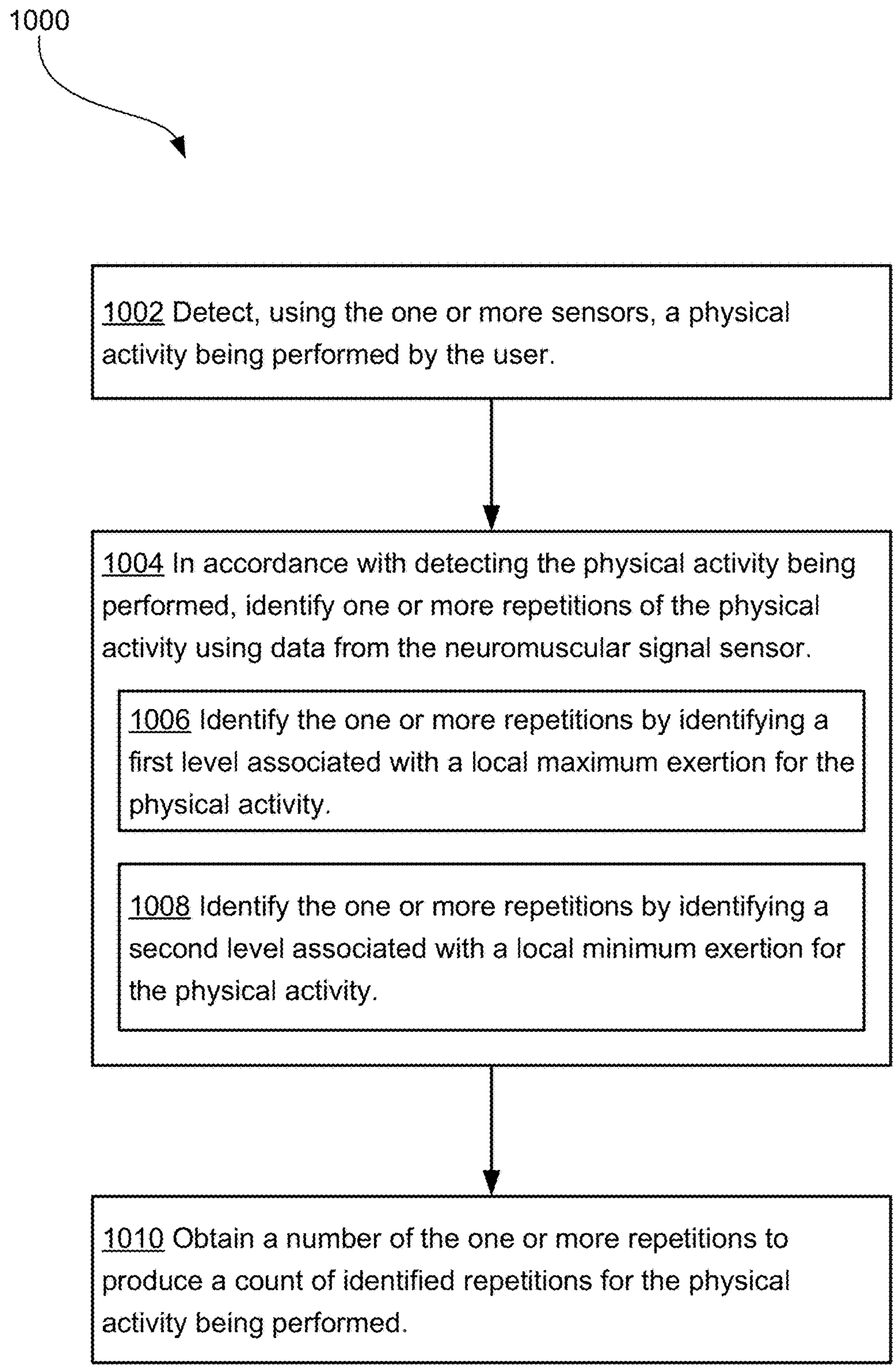
FIG. 11 illustrates a flow diagram of an example method of determining repetitions of a physical activity in accordance with some embodiments.

FIG. 11 shows a flow diagram of a method 1000 for determining repetitions of a physical activity being performed by a user, in accordance with some embodiments. The method 1000 is performed at a computing system (e.g., a wearable device or intermediary device) having one or more processors and memory (e.g., the processor(s) 8077 and the memory 8078 of the HIPD 8000 in the system 8040). In some embodiments, the memory stores one or more programs configured for execution by the one or more processors. At least some of the operations shown in FIG. 11 correspond to instructions stored in a computer memory or a computer-readable storage medium (e.g., the memory 8078 of the HIPD 8000 or the wearable devices 6000 and 7000). In some embodiments, the computing system is a wearable device, such as the wrist-wearable device 102. In some embodiments, the computing system is, or includes, an intermediary device such as a smartphone, personal computer, or video game console. In some embodiments, the method 1000 is performed at a wearable electronic device having one or more sensors, including a neuromuscular-signal sensor (e.g., a biopotential signal sensor, an EMG sensor, a PPG sensor).

(B1) The method 1000 includes detecting (1002), using the one or more sensors, a physical activity being performed by the user. For example, in FIG. 2A, the user interface element 208 includes an activity indicator indicating that the user is performing bench press.

The method 1000 includes, in accordance with (1004) detecting the physical activity being performed, identifying one or more repetitions (e.g., one repetition, five repetitions, a set of repetitions) of the physical activity using data from the neuromuscular signal sensor. For example, in FIG. 2C, the repetition indicator 116 indicates that the user 101 has performed seven repetitions of bench press.

The identifying of the one or more repetitions includes identifying: (i) a first level (1006) associated with a local maximum exertion for the physical activity, or (ii) a second level (1008) associated with a local minimum exertion for the physical activity. For example, in FIG. 1B, the wrist-wearable device 102 detects a local minimum exertion corresponding to the user's physical activity at time t0, and a local maximum of the user's physical activity at time t1.

The method 1000 includes obtaining (1010) a number of the one or more repetitions to produce a count of identified repetitions for the physical activity being performed. In some embodiments, the neuromuscular-signal sensor is separate from but in communication with the wearable electronic device. In some embodiments, the local maximum is different than an absolute maximum (e.g., a peak exertion) associated with the physical activity. For example, the level of exertion detected by the neuromuscular-signal sensor 199-4 can be lower for the points of time t0-t3 in FIG. 1B than for the points of time t4-t7 in FIG. 1E, but the wrist-wearable device can still detect a local maximum during the period of time between t0 and t3.

(B2) In some embodiments of B1, obtaining the number of the one or more repetitions includes identifying a number of times that the neuromuscular-signal sensor has detected (i) a period of exertion corresponding to the first level, and (ii) another period exertion corresponding to the second level, while the user is performing the physical activity. For example, the number of repetitions shown by the repetition indicator 116 in FIG. 1C can be based on the number of times that the local minimum and local maximum shown in FIG. 1B are detected during a set of the activity performed by the user 101.

(B3) In some embodiments of B1 or B2, the method 1000 further includes: (i) detecting, via an IMU sensor, a movement corresponding to a repetition, and (ii) based on failing to detect at least one of the first level associated with the local maximum exertion for the activity, and the local minimum exertion for the activity, forgoing including the repetition in the one or more repetitions. That is, the repetition is not included in the repetition count as failing to have proper neuromuscular levels. In this way, the neuromuscular-signal sensor is used to distinguish between repetitions of a physical activity (e.g., bicep curls) and similar movements (e.g., wiping sweat from the forehead). For example, in FIGS. 1L-1M, the user first performs a wiping gesture with a towel that has a similar movement signature to a repetition of bicep curls, but no repetition is counted based on the movement not including the local minimum and the local maximum for the activity.

(B4) In some embodiments of any of B1-B3, (i) the neuromuscular-signal sensor corresponds to one of a plurality of neuromuscular-signal sensor channels, and (ii) the neuromuscular-signal sensor is selected to detect the physical activity being performed based on identifying a type of physical activity being performed. In some embodiments, the plurality of neuromuscular-signal sensor channels includes one or more channels that are not continuously activated. For example, when the user detects the type of physical activity being performed, the wearable electronic device causes one or more, but less than all, of the neuromuscular-signal sensor channels to be activated. For example, FIG. 1B shows the sensors channels 199-1 and 199-4 being activated for a first activity being performed by the user 101, and FIG. 2B shows the sensor channels 199-5 and 199-6 being activated for performance of the user's second activity.

(B5) In some embodiments of any of B1-B4, the method 1000 further includes, based on determining that the user has ceased to perform the physical activity for at least a threshold amount of time: (i) storing the count of the identified repetitions of the physical activity (e.g., at the wrist-wearable device), and (ii) after storing the count, starting a different count for subsequent identified repetitions of the physical activity. For example, when it is detected that the user has stopped performing the activity, the number of identified repetitions are stored as a set performed by the user and counting starts for a new set. In some embodiments, determining that the user has ceased to perform the physical activity includes detecting the user's exertion level being below a threshold level for at least a threshold amount of time (e.g., the user interface element 230 in FIG. 2C indicates that the user 101 has completed one set of bench press).

(B6) In some embodiments of B5, determining that the user has ceased to perform the physical activity for at least the threshold amount of time includes determining that a level of relaxation of the user is within a preset threshold of a baseline level of relaxation (e.g., a resting state). In some embodiments, the baseline level corresponds to the user performing a low-intensity physical activity (e.g., a cooldown workout, a walk). In some embodiments, the baseline level of exertion corresponds levels of exertion detected by less than all of the neuromuscular-signal sensor channels of the wearable electronic device.

(B7) In some embodiments of B5 or B6, the method 1000 further includes, after the storing, based on detecting that the user is performing the physical activity: (i) identifying a third level associated with another local maximum exertion for the physical activity, and (ii) identifying a fourth level associated with another local minimum exertion for the physical activity. For example, detect repetitions for a second set and determine exertion differences between the sets. For example, the set of bicep curls corresponding to the points of time t4-t7 can have a higher level of exertion than the set of bicep curls corresponding to the points of time t0-t3, and therefore the time t0-t3 can include a first level of exertion corresponding to a local maximum exertion that is different than a third level of exertion corresponding to a local maximum exertion for the time t4-t7.

(B8) In some embodiments of any of B1-B7: (i) the number of repetitions is presented to the user concurrently with the user performing the physical activity, and (ii) based on determining that the user has performed a threshold number of identified repetitions, providing an indication to the user. For example, the user can configure the wrist-wearable device to indicate that the user has performed a tenth repetition of a set of a particular activity, where the user intended to perform that many repetitions.

(B9) In some embodiments of any of B1-B8, identifying the repetition of the physical activity being performed includes aggregating the data from the neuromuscular-signal sensor with data from an IMU sensor. In some embodiments, a sensor fusion algorithm is used in conjunction with aggregating the data from the neuromuscular-signal sensor and the IMU sensor.

(B10) In some embodiments of B9, the data from the neuromuscular-signal sensor is pre-processed (e.g., reduced, weighted by channel) before being aggregated with the data from the IMU sensor. In some embodiments, the pre-processing of the neuromuscular-signal sensor data includes selecting one or more of a plurality of neuromuscular-signal sensor channels, which can each correspond to one or more neuromuscular-signal sensors corresponding to at least the neuromuscular-signal sensor and/or a plurality of neuromuscular-signal sensors. In some embodiments, distinct weightings are applied to respective channels of the plurality of neuromuscular-signal sensor channels. In some embodiments, the pre-processing includes amplifying a respective signal from one or more of the neuromuscular-signal sensors associated with a respective neuromuscular-signal sensor channel.

(B11) In some embodiments of any of B9-B10: (i) the aggregation includes applying a first weighting to the data from the neuromuscular-signal sensor, and a second weighting to the data from the IMU sensor, and the first weighting is based on whether the wearable electronic device is configured to sense (e.g., is located at) a primary muscle group of the user corresponding to the physical activity.

(B12) In some embodiments of B11, the aggregation includes applying a first set of weightings at a first time of a duration associated with the user performing a repetition of the physical activity, the first set of weightings including a respective first weighting for data from the neuromuscular-signal sensor and a respective second weighting for data from the IMU sensor. In some embodiments, the aggregation includes applying a second set of weightings, distinct from the first set of weightings, at a second time, distinct from the first time, of the duration associated with the user performing the repetition of the physical activity, the second set of weightings including another respective first weighting for data from the neuromuscular-signal sensor and another respective second weighting for data from the IMU sensor. In some embodiments, the same concept of applying different weightings to respective sensors of wearable electronic devices is used for different neuromuscular-signal sensor channels of the wearable electronic device (e.g., applying a first weighting to a first channel, applying a second weighting to a second channel, and/or reducing power to a third channel).

(B13) In some embodiments of any of B9-B12: (i) the aggregation is performed using a machine-learning model, and (ii) the machine-learning model is trained based on data collected from the user of the wearable electronic device. For example, the detection that the user 101 is performing bicep curls in FIG. 1A can be based on data from previous instances of the user 101 performing bicep curls and/or other distinct physical activities.

(B14) In some embodiments of any of B9-B13, the aggregation includes: (i) based on previous measurements of a series of measurements, determining an estimated value for a future measurement of the series of measurements, (ii) determining a probability distribution of predicted sensor data for each sensor of the plurality of sensors used for the aggregation based on the estimated value for the future measurement, and (iii) adjusting a respective weighting applied to each respective sensor of the plurality of sensors based on a correspondence between data from the respective sensor and the probability distribution of predicted sensor data. For example, the method can diminish the weight of data from sensors that are less likely to be outputting accurate data based on the estimated value of future measurements. For example, a respective sensor of the plurality of sensors may not be located at a portion of the user's skin that is experience a high-fidelity of neuromuscular activities.

(B15) In some embodiments of any of B1-B14, the method 1000 further includes dynamically adjusting the first level or the second level based on detecting a change to a level of exertion of the user performing the physical activity. In some embodiments, dynamically adjusting includes adjusting the levels during performance of the physical activity (e.g., before the user ceases to perform the activity).

(B16) In some embodiments of any of B1-B15, identifying the repetition of the physical activity includes comparing the first and/or second levels with historical data, wherein the historical data includes measured values from respective sensors of other wearable electronic devices that were worn by other users and/or the same user. In some embodiments, some or all of the training data is collected from a source other than a wearable electronic device, and/or includes prophetic data that is used to improve efficiency of detection of an aspect of a physical activity. In some embodiments, the training data includes sensor data that does not correspond to a recognizable gesture performed by the user.

(B17) In some embodiments of B16, the historical data is selected for comparison based on an identification of one or more primary muscle groups corresponding to a type of the physical activity being performed.

(B18) In some embodiments of any of B1-B17, the method 1000 further includes: (i) determining a level of accuracy of detection of the identified one or more repetitions based on data from the one or more sensors, and (ii) based on the level of accuracy, providing an indication to the user to adjust a position of the wearable electronic device. In some embodiments, determining the level of accuracy includes determining a signal-to-noise ratio (SNR) for the repetition data. For example, the repetition indicator 116 displayed by the wrist-wearable device 102 indicates respective levels of accuracy of the wrist-wearable device 102 for detecting physical activities that the user 101 is performing at different respective points in time.

(B19) In some embodiments of any of B1-B18, the method 1000 further includes determining a level of accuracy of the identified one or more repetitions based on data from the one or more sensors. In some embodiments, based on the level of accuracy, providing an indication to the user that a higher level of accuracy is achieved by activating a device with one or more sensors at another location of the user's body, wherein the other location of the user's body corresponds to a primary muscle group for the physical activity. For example, based on detecting that the user 401 is performing a jogging activity in FIG. 4A, the head-wearable device 304 can provide an indication to the user that the jogging activity would be detected with a higher level of accuracy if the user activated one or more sensors of the ankle-wearable device 406.

(B20) In some embodiments of any of B1-B19, detecting the physical activity being performed includes detecting one or more user movements. And the method 1000 further includes: (i) determining whether the one or more user movements comprise an involuntary user movement, and (ii) in accordance with a determination that the one or more user movements comprise the involuntary user movement, providing a notification including information about the involuntary user movement. In some embodiments, determining whether the one or more user movements comprise the involuntary user movement includes using a machine-learning model (e.g., providing the one or more user movements to the machine-learning model for analysis). For example, the alert corresponding to the alert gesture 372 performed in FIG. 3I can be initiated automatically, without the alert gesture 372 having been performed by the user 301, based on the wrist-wearable device 102 detecting an involuntary gesture performed by the user 301 during performance of the rowing activity.

(B21) In some embodiments of B20, the method 1000 further includes: (i) identifying a health condition corresponding to the involuntary user movement, and (ii) in response to identifying the health condition, providing a notification to remote electronic device with information about the health condition.

Figure 12:
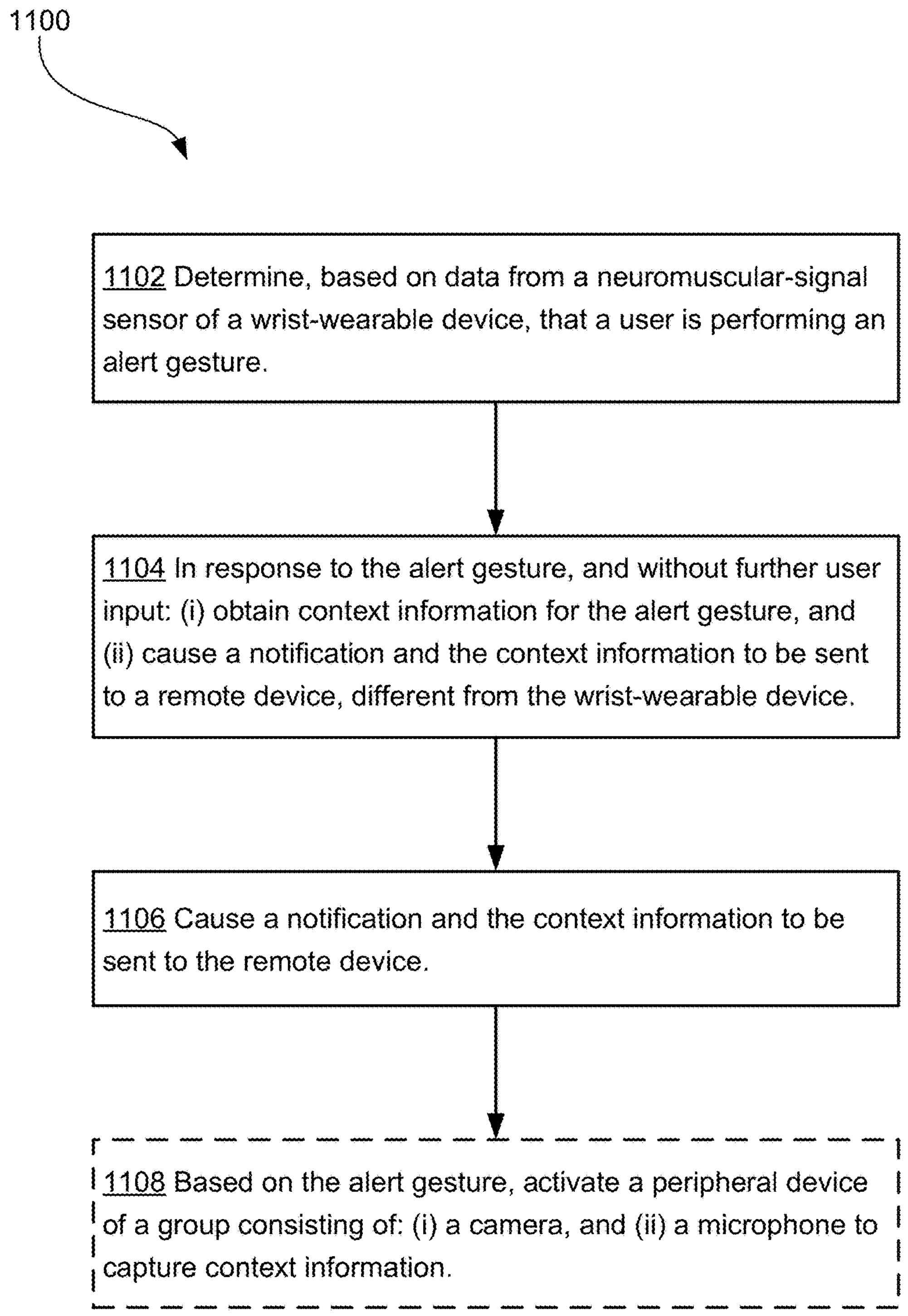
FIG. 12 illustrates a flow diagram of an example method of providing an alert to a remote device in accordance with some embodiments.

FIG. 12 shows a flow diagram of a method 1100 for providing an alert to a remote device, in accordance with some embodiments. The method 1100 is performed at a computing system (e.g., a wearable device or intermediary device) having one or more processors and memory. In some embodiments, the memory stores one or more programs configured for execution by the one or more processors. At least some of the operations shown in FIG. 10 correspond to instructions stored in a computer memory or a computer-readable storage medium (e.g., the memory 8078 of the HIPD 8000 or the wearable devices 6000 and 7000). In some embodiments, the computing system is a wearable device, such as the wrist-wearable device 102. In some embodiments, the computing system is, or includes, an intermediary device such as a smartphone, personal computer, or video game console. In some embodiments, the method 1100 is performed at a wearable electronic device that is in communication with a neuromuscular-signal sensor (e.g., a biopotential signal sensor, an EMG sensor).

(C1) The method 1100 includes determining (1102), based on data from the neuromuscular-signal sensor, that a user is performing an alert gesture (e.g., the alert gesture 252 performed in FIG. 2E).

The method 1100 includes, in response to (1104) the alert gesture, and without further user input: (i) obtaining context information (e.g., contextual data sensed by one or more electronic devices associated with and/or in proximity to the user) for the alert gesture (e.g., the location where the user 301 is performing the physical activity when the user 301 performs the alert gesture 372 in FIG. 3I), and (ii) causing a notification and the context information to be sent to the remote device. In some embodiments, the notification is intended for a remote user. In some embodiments, the notification is intended for a system (e.g., an alarm system). In some embodiments, the wearable electronic device is configured to create a wireless communication connection (e.g., cellular, internet, satellite) with another electronic device (e.g., the electronic workout machine 306, which can be configured to alert staff of a gym facility where the user 301 is performing the physical activity).

The method 1100 includes causing (1106) a notification and the context information to be sent to the remote device. For example, a remote server can be notified that the user 301 has performed the alert gesture 372 in FIG. 3I, and can optionally provide a notification to one or more additional notifications to one or more additional remote servers and/or other electronic devices (e.g., personal electronic devices of one or more other users that are in vicinity to the user that has performed the alert gesture).

(C2) In some embodiments of C1, the method 1100 further includes (1108) based on the alert gesture, activating a peripheral device of a group consisting of (i) a camera (e.g., a video camera of a mobile electronic device) and (ii) a microphone to capture context information. In some embodiments, the camera and/or microphone are components of the wearable electronic device. In some embodiments, the camera and/or microphone are components of a head-worn device that is different from the wearable device (e.g., data and/or other information collected by the head-wearable device 304 can be provided as context information based on the alert gesture 372 being detected by the wrist-wearable device 102 in FIG. 3I). In some embodiments, the camera and/or microphone are components of a smartphone or smartwatch of the user.

(C3) In some embodiments of C2, the peripheral device is not worn by the user (e.g., surveillance cameras in a room that the user is in when they perform the alert gesture). For example, one or more facility cameras can be in electronic communication with the electronic workout machine 306 while the user is performing the alert gesture 372 in FIG. 3I, and data from one or more of the facility cameras can be provided as context information with the information about the alert gesture 372.

(C4) In some embodiments of any of C1-C3, the context information includes data from one or more sensors distinct from the neuromuscular-signal sensor (e.g., GPS sensors, imaging sensors, audio sensors, accelerometer(s)). For example, audio sensors can be activated and/or data can be provided from the audio sensors when the user 401 performs the alert gesture 434 in FIG. 4D. In some embodiments, additional context information can be provided based on first contextual information provided in conjunction with a respective alert. For example, based on determining that a natural disaster is occurring via imaging data provided in first contextual information provided with an alert gesture, additional data can be provided to determine, for example, the user's proximity to the natural disaster, and/or an intensity of the natural disaster.

(C5) In some embodiments of any of C1-C4, the context information includes data from an imaging sensor corresponding to a camera that is in electronic communication with the wearable electronic device (e.g., wireless or wired communication).

(C6) In some embodiments of C5, the context information includes aggregated data from the imaging sensor and one or more additional sensors, the one or more additional sensors being different than the neuromuscular-signal sensor and the imaging sensor.

(C7) In some embodiments of any of C1-C6, the context information includes information about a vital condition of the user (e.g., heartrate, pulse, oxygen levels).

(C8) In some embodiments of any of C1-C7, the notification is automatically broadcast to one or more other electronic devices in proximity of the user.

(C9) In some embodiment of any of C1-C8, the one or more other electronic devices includes a device corresponding to local authorities (e.g., law enforcement, the fish and game club, first responders, security staff determined to be within a threshold distance of the user based on a location provided in the context information).

(C10) In some embodiments of any of C1-C9, the context information for the alert gesture includes a type of hazard that is occurring in a vicinity of (e.g., in a shared space as, or in proximity to) the user.

(C11) In some embodiments of any of C1-C10, the notification is provided to a remote server, and the method 1100 includes causing instructions to be provided to the user based on information from the remote server sent in response to the notification. In some embodiments, the provided information includes routing information. In some embodiments, the provided information includes instructions to attempt to mitigate a hazard. In some embodiments, the provided information includes information for local authorities.

(C12) In some embodiments of C11, the method 1100 includes providing, without further instructions from the user, the instructions to the user via a map application at one or more of the wrist-wearable device and another communicatively coupled device (e.g., smart phone, head-wearable device).

(C13) In some embodiments of C11 or C12, the instructions provided to the user include one or more navigational user interface elements presented at a head-wearable device (e.g., via an AR and/or VR presentation system). For example, the navigational user interface elements 440 shown in FIG. 4E indicate a path to the user for avoiding the natural disaster (e.g., the tornado) that is detected via the contextual information that is provided in conjunction with the alert gesture 434.

(C14) In some embodiments of C13, the navigational user interface elements indicate a path for the user to a safe location (e.g., the nearest establishment that provides customer access, or a building meeting one or more security criteria for a particular natural disaster event). In some embodiments, the navigational user interface elements are presented in an AR interface via the head-wearable device (e.g., such that the one or more navigational user interface elements are configured and arranged to appear on a ground in front of the user).

(C15) In some embodiments of any of C1-C14, at least a portion of the alert gesture is performed via a tracked eye movement of the user detected by an eye-tracking module of a head-wearable device worn by the user, the eye-tracking module configured to measure the location of a pupil of the eye.

(C16) In some embodiments of any of C1-C15, the context information for the alert gesture includes information about eye movement and/or a point of focus (e.g., an eye-tracking lookup table, information from a holographic illuminator configured to detect reflections from an eye). In some embodiments, the information can include a plurality of reflections, wherein one subset of the plurality of reflections is from the pupil of the eye, and another subset of the reflections is from a sclera of the eye and/or another part of the eye.

(C17) In some embodiments of C16, the method 1100 includes determining a location of a hazardous condition based on the information about the eye movement and/or the point of focus of the head-wearable device and/or one or more cameras of an electronic device that is being worn by the user.

(C18) In some embodiments of any of C1-C17, an audio notification is provided by the wrist-wearable device (e.g., alert signal, alarm, and/or confirmation of detection of the gesture) in conjunction with the notification being provided to the other electronic device.

(C19) In some embodiments of any of C1-C18: (i) the alert gesture corresponds to one of a predefined set of operations, (ii) each operation of the predefined set of operations corresponds to a respective level of an emergency that the user is experiencing, and (iii) the context information includes an indication of the respective level of the emergency. For example, a user can perform a first gesture to indicate a potential danger and a second gesture to indicate imminent danger.

(C20) In some embodiments of any of C1-C19, the context information for the alert gesture includes a determination whether a level of neuromuscular signals corresponds to an elevated level of exertion of the user (e.g., compared to a baseline level of exertion corresponding to a resting state).

(C21) In some embodiments of any of C1-C20, the context information includes information about one or more user movements performed by the user. And the method further includes: (i) determining whether the one or more user movements comprise an involuntary user movement, and (ii) in accordance with a determination that the one or more user movements comprise the involuntary user movement, including information about the involuntary user movement within the notification (e.g., sent to another electronic device, another user, different device of the same user; audible/visual alert; broadcasting on a Wi-Fi signal).

(C22) In some embodiment of any of C1-C21, no further user input is required after the health condition is identified (e.g., the operations are automatic). For example, if the contextual information indicates that the user has performed an involuntary gesture (e.g., via an AI model, which can optionally be instantiated and stored by the wrist-wearable device), the wrist-wearable device can automatically receive an alert corresponding to an alert gesture, even if the user has not performed the alert gesture.

Figure 13:
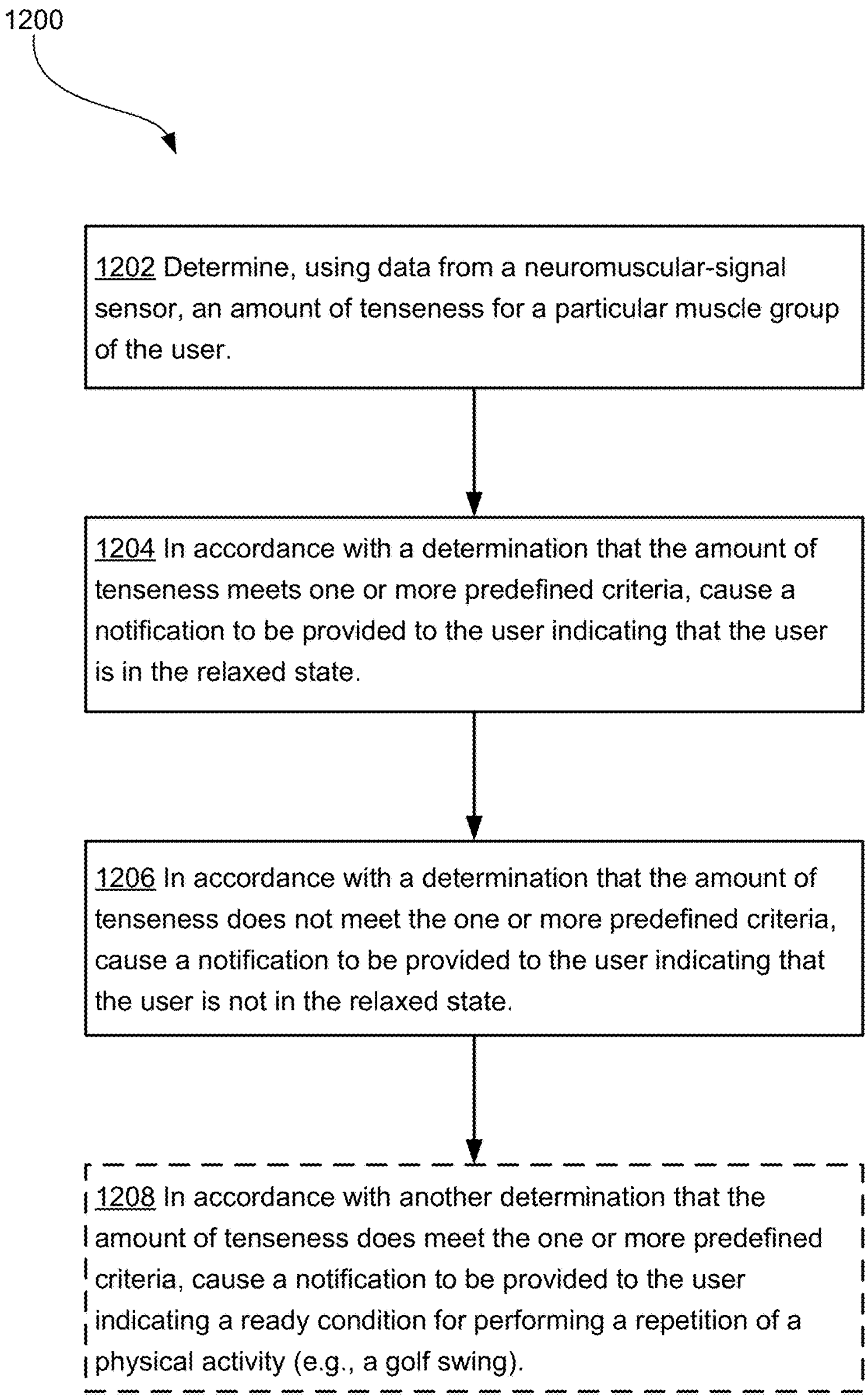
FIG. 13 illustrates a flow diagram of an example method of detecting a state of relaxation of a user in accordance with some embodiments.

FIG. 13 shows a flow diagram of a method 1200 for detecting a state of relaxation of a user, in accordance with some embodiments. The method 1200 is performed at a computing system (e.g., a wearable device or intermediary device) having one or more processors and memory. In some embodiments, the memory stores one or more programs configured for execution by the one or more processors. At least some of the operations shown in FIG. 13 correspond to instructions stored in a computer memory or a computer-readable storage medium (e.g., the memory 8078 of the HIPD 8000 or the systems 6000 and 7000). In some embodiments, the computing system is a wearable device, such as the wrist-wearable device 102. In some embodiments, the computing system is, or includes, an intermediary device such as a smartphone, personal computer, or video game console. In some embodiments, the method of 1200 is performed in conjunction with a user wearing a wrist-wearable device (e.g., during performance of a physical activity).

(D1) The method 1200 includes (1202) determining, using data from a neuromuscular-signal sensor, an amount of tenseness for a particular muscle group of the user.

The method 1200 includes, in accordance with (1204) a determination that the amount of tenseness meets one or more predefined criteria, cause a notification to be provided to the user indicating that the user is in the relaxed state.

The method 1200 includes, in accordance with (1206) a determination that the amount of tenseness does not meet the one or more predefined criteria, cause a notification to be provided to the user indicating that the user is not in the relaxed state.

(D2) In some embodiments of D1, the method 1200 includes in accordance with (1208) another determination that the amount of tenseness does meet the one or more predefined criteria, cause a notification to be provided to the user indicating to the user to wait to perform a repetition of a physical activity (e.g., a golf swing) until a baseline level of exertion has been detected.

(D3) In some embodiments of any of D1-D2, determining the amount of tenseness is based on obtaining a request from the user or another user. In some embodiments, the amount of tenseness is determined in response to a user request. In some embodiments, the request is a user input, a request that is automatically generated as part of a workout or health program, or a request that is automatically generated based on biofeedback from the user.

(D4) In some embodiments of any of D1-D3: (i) the user is performing a meditation activity, (ii) a timer is associated with the meditation activity, and (iii) based on the determination that the amount of tenseness does not meet the one or more predefined criteria, forgoing starting the timer associated with the meditation activity. For example, while a user is performing a meditation activity and wearing a wrist-wearable device, indications can be sensed at the wrist-wearable device corresponding to the user's respective level of exertion (e.g., tenseness). This is based on the wrist-wearable device detecting a threshold level of exertion that is above a baseline level.

(D5) In some embodiments of D4: (i) the meditation activity is facilitated by a head-wearable device configured to present an AR environment to the user, (ii) the timer is presented by the head-wearable device while the user is performing the meditation activity (e.g., intermittently, at a predefined interval, and/or when the neuromuscular-signal sensor detects a change in the level of tenseness of the user).

(D6) In some embodiments of any of D1-D5, the method 1200 includes, prior to determining the amount of tenseness of the particular muscle group: (i) determining that the user is performing a physical activity, and (ii) determining that the user has ceased the physical activity. In some embodiments, the amount of tenseness for the particular muscle group of the user is determined in accordance with a determination that the user has ceased the physical activity. For example, the wrist-wearable device 102 in FIGS. 1C-1D can determine an amount of tenseness (or conversely, relaxation) of the user 101 based on determining that they have ceased performing bicep curls (e.g., because the user has completed a set of the physical activity).

(D7) In some embodiments of D6, the method 1200 further includes, in accordance with the determination that the amount of tenseness meets the one or more predefined criteria, notifying the user that they may resume the physical activity. In some embodiments, the user is notified to resume the physical activity after the user has relaxed for at least a preset amount of time. For example, a user may be performing a round of golf, and an indication can be provided to the user based on a determination that they have attained a particular level of relaxation (e.g., a lack of tenseness).

(E1) In accordance with some embodiments, a wrist-wearable device is provided that includes (i) a display, (ii) one or more processors, and (iii) memory that includes instructions that, when executed by the wrist-wearable device, cause performance of any of the methods of A1-A23, B1-B21, C1-C22 and C1-D7.

(F1) In accordance with some embodiments, a wrist-wearable device is provided that includes a means for performing any of the methods of A1-A23, B1-B21, C1-C22 and C1-D7.

(G1) In accordance with some embodiments, a capsule device removable from a wrist-wearable device, the capsule device includes (i) a display, (ii) one or more processors, and (iii) memory that includes instructions that, when executed by the wrist-wearable device, cause performance of any of the methods of A1-A23, B1-B21, C1-C22 and C1-D7.

(H1) In accordance with some embodiments, a non-transitory computer-readable storage medium, comprising instructions that, when executed by a computing device, cause the computing device to perform or cause performance of any of the methods of A1-A23, B1-B21, C1-C22 and C1-D7.

(I1) In accordance with some embodiments, a system comprising a wrist-wearable device and a connected device that is in communication with the wrist-wearable device, the system configured to perform or cause performance of any of the methods of A1-A23, B1-B21, C1-C22 and C1-D7.

It will be understood that, although the terms "first," "second," etc., may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described to best explain principles of operation and practical applications, to thereby enable others skilled in the art.

What is claimed is:

1. A method for determining an adaptive adjustment to a physical activity being performed by a user wearing a wearable electronic device, comprising:

determining, based on signals from a neuromuscular-signal sensor of the wearable electronic device, a baseline level of exertion for the user while the user is performing a first type of physical activity;

after determining the baseline level of exertion and in conjunction with detecting, using one or more sensors located at the wearable electronic device, that the user is performing the first type of physical activity at a particular activity rate:

detecting, using the neuromuscular-signal sensor located at the wearable electronic device, a level of exertion of the user; and based on a determination that the level of exertion is different than the baseline level of exertion by at least a threshold amount, determining an adjustment to the particular activity rate while the user is performing the physical activity, wherein the adjustment to the particular activity rate is determined for an electronic workout machine so as to adjust the level of exertion of the user toward the baseline level of exertion.

2. The method of claim 1, further comprising:

before determining that the level of exertion is different than the baseline level of exertion by at least the threshold amount:

detecting, using the neuromuscular-signal sensor, another level of exertion, separately from the detecting of the level of exertion; and based on determining that the other level of exertion is different than the baseline level of exertion by at least another threshold amount, causing a notification to be provided to the user.

3. The method of claim 2, wherein:

the notification is caused to be provided at the electronic workout machine;

the notification includes a selectable user interface element; and in response to the user selecting the selectable user interface element, the electronic workout machine is caused to adjust the activity rate toward the baseline level of exertion.

4. The method of claim 2, further comprising:

after determining that the other level of exertion is different than the baseline level of exertion by at least the other threshold amount, and before determining that the level of exertion is different than the baseline level of exertion by at least the threshold amount:

detecting, using the neuromuscular-signal sensor of the one or more sensors located at the wearable electronic device, yet another level of exertion, separately from the detecting of the level of exertion and the detecting of the other level of exertion; and based on determining that the yet another level of exertion is different than the baseline level of exertion by yet another threshold amount, determining another adjustment to the particular activity rate, distinct from the adjustment.

5. The method of claim 1, wherein:

the one or more sensors at the wearable electronic device includes an inertial measurement unit (IMU) sensor; and the determination that the level of exertion is different than the baseline level of exertion is further based on data from the IMU sensor.

6. The method of claim 5, wherein the determination that the level of exertion is different than the baseline level of exertion further comprises:

applying a first weighting to data from the neuromuscular-signal sensor; and applying a second weighting to the data from the IMU sensor.

7. The method of claim 6, wherein the first weighting and the second weighting are based on a calibration performed by the user before performing the physical activity at the activity rate.

8. The method of claim 6, wherein the first weighting and the second weighting are based on a type of physical activity being performed.

9. The method of claim 8, wherein:

the first weighting is higher than the second weighting in accordance with a determination that the neuromuscular-signal sensor is configured to sense a primary muscle group associated with the physical activity.

10. The method of claim 1, wherein:

the user is wearing a head-wearable electronic device;

the head-wearable electronic device is presenting a user interface to the user, the user interface corresponding to an interactive workout; and based on the determination that the level of exertion is different than the baseline level of exertion by the threshold amount, the adjustment to the physical activity includes causing an adjustment to the user interface presented by the head-wearable electronic device.

11. A wrist-wearable device comprising:

a display;

one or more processors; and memory comprising instructions that, when executed by the wrist-wearable device, cause performance of operations for:

determining, based on signals from a neuromuscular-signal sensor of the wrist-wearable electronic device, a baseline level of exertion for a user while the user is performing a first type of physical activity; and after determining the baseline level of exertion and in conjunction with detecting, using one or more sensors located at the wrist-wearable device, that the user is performing the first type of physical activity at a particular activity rate:

detecting, using the neuromuscular-signal sensor located at the wrist-wearable device, a level of exertion of the user; and based on a determination that the level of exertion is different than the baseline level of exertion by at least a threshold amount, determining an adjustment to the particular activity rate while the user is performing the physical activity, wherein the adjustment to the particular activity rate is determined for an electronic workout machine so as to adjust the level of exertion of the user toward the baseline level of exertion.

12. A non-transitory computer-readable storage medium, comprising instructions that, when executed by a computing device, cause the computing device to perform operations for:

determining, based on signals from a neuromuscular-signal sensor of a wearable electronic device, a baseline level of exertion for a user while the user is performing a first type of physical activity; and after determining the baseline level of exertion and in conjunction with detecting, using one or more sensors located at the wearable electronic device, that the user is performing the first type of physical activity at a particular activity rate:

detecting, using the neuromuscular-signal sensor located at the wearable electronic device, a level of exertion of the user; and based on a determination that the level of exertion is different than the baseline level of exertion by at least a threshold amount, determining an adjustment to the particular activity rate while the user is performing the physical activity, wherein the adjustment to the particular activity rate is determined for an electronic workout machine so as to adjust the level of exertion of the user toward the baseline level of exertion.

13. The wrist-wearable device of claim 11, wherein the instructions further cause performance of operations for:

before determining that the level of exertion is different than the baseline level of exertion by at least the threshold amount:

detecting, using the neuromuscular-signal sensor, another level of exertion, separately from the detecting of the level of exertion; and based on determining that the other level of exertion is different than the baseline level of exertion by at least another threshold amount, causing a notification to be provided to the user.

14. The wrist-wearable device of claim 13, wherein:

the notification is caused to be provided at the electronic workout machine;

the notification includes a selectable user interface element; and in response to the user selecting the selectable user interface element, the electronic workout machine is caused to adjust the activity rate toward the baseline level of exertion.

15. The wrist-wearable device of claim 13, wherein the instructions further cause performance of operations for:

after determining that the other level of exertion is different than the baseline level of exertion by at least the other threshold amount, and before determining that the level of exertion is different than the baseline level of exertion by at least the threshold amount:

detecting, using the neuromuscular-signal sensor of the one or more sensors located at the wrist-wearable electronic device, yet another level of exertion, separately from the detecting of the level of exertion and the detecting of the other level of exertion; and based on determining that the yet another level of exertion is different than the baseline level of exertion by yet another threshold amount, determining another adjustment to the particular activity rate, distinct from the adjustment.

16. The wrist-wearable device of claim 11, wherein:

the user is wearing a head-wearable electronic device;

the head-wearable electronic device is presenting a user interface to the user, the user interface corresponding to an interactive workout; and based on the determination that the level of exertion is different than the baseline level of exertion by the threshold amount, the adjustment to the particular activity rate includes causing an adjustment to the user interface presented by the head-wearable electronic device.

17. The non-transitory computer-readable storage medium of claim 12, wherein the instructions further cause performance of operations for:

before determining that the level of exertion is different than the baseline level of exertion by at least the threshold amount:

detecting, using the neuromuscular-signal sensor, another level of exertion, separately from the detecting of the level of exertion; and based on determining that the other level of exertion is different than the baseline level of exertion by at least another threshold amount, causing a notification to be provided to the user.

18. The non-transitory computer-readable storage medium of claim 17, wherein:

the notification is caused to be provided at the electronic workout machine;

the notification includes a selectable user interface element; and in response to the user selecting the selectable user interface element, the electronic workout machine is caused to adjust the activity rate toward the baseline level of exertion.

19. The non-transitory computer-readable storage medium of claim 17, wherein the instructions further cause performance of operations for:

after determining that the other level of exertion is different than the baseline level of exertion by at least the other threshold amount, and before determining that the level of exertion is different than the baseline level of exertion by at least the threshold amount:

detecting, using the neuromuscular-signal sensor of the one or more sensors located at the wearable electronic device, yet another level of exertion, separately from the detecting of the level of exertion and the detecting of the other level of exertion; and based on determining that the yet another level of exertion is different than the baseline level of exertion by yet another threshold amount, determining another adjustment to the particular activity rate, distinct from the adjustment.

20. The non-transitory computer-readable storage medium of claim 12 wherein:

the user is wearing a head-wearable electronic device;

the head-wearable electronic device is presenting a user interface to the user, the user interface corresponding to an interactive workout; and based on the determination that the level of exertion is different than the baseline level of exertion by the threshold amount, the adjustment to the particular activity rate includes causing an adjustment to the user interface presented by the head-wearable electronic device.

* * * * *